(12) United States Patent
Fraser et al.

(10) Patent No.: US 8,869,529 B2
(45) Date of Patent: Oct. 28, 2014

(54) STIRLING ENGINE SYSTEMS, APPARATUS AND METHODS

(75) Inventors: Paul Fraser, Richland, WA (US); Terry Smith, Kennewick, WA (US); Rocco Luongo, Richland, WA (US); Justin Thurgood, Pasco, WA (US); Trent Wetherbee, Richland, WA (US); Raphael Milleret, Pasco, WA (US); Allen Peterson, Kennewick, WA (US); John Edward Augenblick, Richland, WA (US); Scott McCallum, Pasco, WA (US); Ian Williford, Richland, WA (US); Ray Erbeznik, Kennewick, WA (US); Ben Gyori, West Richland, WA (US); Patrick Fox, Richland, WA (US); Harry McVicker, Kennewick, WA (US); Tina Dale, Kennewick, WA (US)

(73) Assignee: Qnergy Inc, En-Harod Ihud (IL)

( * ) Notice: Subject to any disclaimer, the term of this patent is extended or adjusted under 35 U.S.C. 154(b) by 0 days.

(21) Appl. No.: 13/422,353

(22) Filed: Mar. 16, 2012

(65) Prior Publication Data
US 2012/0312017 A1 Dec. 13, 2012

Related U.S. Application Data

(63) Continuation of application No. 12/578,554, filed on Oct. 13, 2009, now Pat. No. 8,151,568.

(60) Provisional application No. 61/104,915, filed on Oct. 13, 2008, provisional application No. 61/196,042, filed on Oct. 13, 2008.

(51) Int. Cl.
| | |
|---|---|
| *F03G 6/00* | (2006.01) |
| *F03G 7/00* | (2006.01) |
| *F01B 29/10* | (2006.01) |
| *F02G 1/04* | (2006.01) |
| *F24J 2/00* | (2014.01) |
| *F24J 2/10* | (2006.01) |
| *F03G 6/06* | (2006.01) |

(52) U.S. Cl.
CPC *F03G 6/068* (2013.01); *Y02E 10/46* (2013.01)
USPC ........... 60/641.15; 60/517; 126/701; 126/689

(58) Field of Classification Search
USPC ...................... 60/641.8–641.15; 126/569–713
See application file for complete search history.

(56) References Cited

U.S. PATENT DOCUMENTS

| | | | |
|---|---|---|---|
| 3,479,817 A | 11/1969 | Minto | |
| 3,636,706 A | 1/1972 | Minto | |

(Continued)

FOREIGN PATENT DOCUMENTS

EP 163801 A * 12/1985

OTHER PUBLICATIONS

Schlaich Bergermann und Partner GbR, "Euro Disch—Stirling: System Description," Stuttgart, Jun. 2011 (9 pgs.).

(Continued)

*Primary Examiner* — Christopher Jetton
(74) *Attorney, Agent, or Firm* — Mark S. Cohen; Pearl Cohen Zedek Latzer Baratz LLP

(57) ABSTRACT

Systems, methods, and apparatus relating to the use of Stirling engine technology to convert heat, such as from solar radiation, to mechanical work or electricity. Apparatus, systems, components, and methods relating to energy converting apparatus are described herein. In one aspect, the invention relates to the field alignment of panels and the assembly of a concentrator. In another aspect, a passive balancer is used in combination with a ring frame and other moving masses to reduce engine forces and vibration on the structure of the energy converting apparatus while maintaining properly constrained alignment of various suspended masses. In yet another aspect, the invention relates to various over-insolation control and management strategy to prevent overheating of the energy converting apparatus or components and subsystems thereof.

10 Claims, 48 Drawing Sheets

(56) References Cited

U.S. PATENT DOCUMENTS

| | | | |
|---|---|---|---|
| 3,750,393 A | 8/1973 | Minto | |
| 3,905,352 A * | 9/1975 | Jahn | 126/578 |
| 3,951,128 A | 4/1976 | Schoenfelder | |
| 4,111,184 A | 9/1978 | Fletcher et al. | 126/577 |
| 4,158,354 A | 6/1979 | Carden | |
| 4,281,900 A | 8/1981 | Lewis, Jr. | 359/853 |
| 4,289,118 A * | 9/1981 | Stark | 126/577 |
| 4,291,755 A | 9/1981 | Minto | |
| 4,334,521 A | 6/1982 | Jacoby | 126/574 |
| 4,403,643 A | 9/1983 | Minto | |
| 4,408,595 A | 10/1983 | Broyles et al. | 126/570 |
| 4,416,255 A | 11/1983 | Secamiglio et al. | |
| 4,421,102 A | 12/1983 | Posnansky et al. | |
| 4,457,297 A | 7/1984 | Sobczak et al. | |
| 4,463,749 A | 8/1984 | Sobczak et al. | 126/605 |
| 4,475,538 A | 10/1984 | Percival et al. | 126/648 |
| 4,502,466 A | 3/1985 | Grahn | |
| 4,535,961 A | 8/1985 | Sobczak et al. | |
| 4,553,392 A | 11/1985 | Chagnot et al. | |
| 4,566,432 A | 1/1986 | Sobczak et al. | |
| 4,583,171 A | 4/1986 | Hara et al. | |
| 4,583,520 A | 4/1986 | Dietrich et al. | 126/606 |
| 4,586,487 A * | 5/1986 | Argoud et al. | 126/571 |
| 4,602,614 A | 7/1986 | Percival et al. | |
| 4,707,990 A | 11/1987 | Meijer | 60/641.15 |
| 4,718,249 A | 1/1988 | Hanson | |
| 4,856,280 A | 8/1989 | Chagnot | |
| 4,873,826 A | 10/1989 | Dhar | |
| 4,881,372 A * | 11/1989 | Naito | 60/521 |
| 4,967,558 A | 11/1990 | Emigh et al. | |
| 5,069,272 A | 12/1991 | Chagnot | |
| 5,074,283 A | 12/1991 | Beatty et al. | |
| 5,076,058 A | 12/1991 | Emigh et al. | |
| D330,248 S | 10/1992 | Chagnot et al. | |
| 5,182,912 A | 2/1993 | Parker et al. | |
| 5,183,098 A | 2/1993 | Chagnot | |
| 5,228,293 A | 7/1993 | Vitale | |
| 5,241,824 A | 9/1993 | Parker et al. | |
| 5,263,281 A | 11/1993 | Osborn | |
| 5,285,842 A | 2/1994 | Chagnot | |
| 5,315,190 A | 5/1994 | Nasar | |
| 5,337,562 A | 8/1994 | Kleinwachter et al. | |
| 5,404,723 A | 4/1995 | Parker et al. | |
| 5,522,214 A | 6/1996 | Beckett et al. | |
| 5,642,618 A | 7/1997 | Penswick | |
| 5,642,622 A | 7/1997 | Berchowitz et al. | |
| 5,647,217 A | 7/1997 | Penswick et al. | |
| 5,654,596 A | 8/1997 | Nasar et al. | |
| 5,685,505 A | 11/1997 | Meckler | |
| 5,743,091 A | 4/1998 | Penswick et al. | |
| 5,884,481 A | 3/1999 | Johansson et al. | |
| 5,895,033 A | 4/1999 | Ross et al. | |
| 5,918,463 A | 7/1999 | Penswick et al. | |
| 5,920,133 A | 7/1999 | Penswick et al. | |
| 5,932,029 A | 8/1999 | Stone et al. | |
| 5,994,681 A | 11/1999 | Lloyd | |
| 6,036,323 A | 3/2000 | Meijer | |
| 6,039,109 A | 3/2000 | Chagnot et al. | |
| 6,050,092 A | 4/2000 | Genstler et al. | |
| 6,094,912 A | 8/2000 | Williford | |
| 6,442,937 B1 | 9/2002 | Stone et al. | 60/641.11 |
| 6,470,679 B1 | 10/2002 | Ertle | |
| 6,513,326 B1 | 2/2003 | Maceda et al. | |
| 6,688,303 B2 | 2/2004 | Davenport et al. | |
| 6,701,708 B2 | 3/2004 | Gross et al. | |
| 6,735,946 B1 | 5/2004 | Otting et al. | 60/641.11 |
| 6,809,486 B2 | 10/2004 | Qiu et al. | |
| 6,818,818 B2 | 11/2004 | Bareis | |
| 6,871,495 B2 | 3/2005 | Lynch et al. | |
| 6,930,414 B2 | 8/2005 | Qiu | |
| 6,931,848 B2 | 8/2005 | Maceda et al. | |
| 6,933,629 B2 | 8/2005 | Qiu et al. | |
| 6,952,921 B2 | 10/2005 | Qiu | |
| 6,979,911 B2 | 12/2005 | Otting et al. | |
| 6,983,593 B2 * | 1/2006 | Gregory et al. | 60/517 |
| 7,026,722 B1 | 4/2006 | Otting et al. | |
| 7,084,518 B2 | 8/2006 | Otting et al. | 290/1 R |
| 7,088,094 B2 | 8/2006 | VunKannon, Jr. | |
| 7,089,735 B1 | 8/2006 | Qiu et al. | |
| 7,134,279 B2 | 11/2006 | White et al. | |
| 7,137,251 B2 | 11/2006 | Qiu et al. | |
| 7,200,994 B2 | 4/2007 | Chertok | |
| 7,219,712 B2 | 5/2007 | Qiu et al. | |
| 7,297,865 B2 | 11/2007 | Terao et al. | |
| 7,325,401 B1 | 2/2008 | Kesseli et al. | |
| 7,352,088 B2 | 4/2008 | Qiu | |
| 7,511,459 B2 | 3/2009 | Holliday | |
| 2002/0043545 A1 | 4/2002 | Tang | |
| 2005/0236150 A1 | 10/2005 | Chagnot et al. | |
| 2006/0015404 A1 | 1/2006 | Tran | |
| 2006/0021343 A1 | 2/2006 | Maceda et al. | |
| 2006/0048510 A1 | 3/2006 | White et al. | |
| 2006/0119103 A1 | 6/2006 | Otting et al. | |
| 2006/0179834 A1 | 8/2006 | Qiu | |
| 2006/0181157 A1 | 8/2006 | Qiu | |
| 2006/0267415 A1 | 11/2006 | Qiu | |
| 2006/0283186 A1 | 12/2006 | McConaghy | |
| 2007/0193266 A1 | 8/2007 | McConaghy | |
| 2008/0018179 A1 | 1/2008 | Qiu | |
| 2010/0038976 A1 | 2/2010 | Qiu | |

OTHER PUBLICATIONS

Mancini, "Solar-Electric Dish Stirling System Development," URL:http://mac6.ma.psu.edu/stirling/reports/DE98001305. pdf, Dec. 1, 1997 (9 pgs.).

International Search Report for PCT/US2009/060562, mailed Dec. 1, 2011 (5 pages).

Written Opinion of the ISR for PCT/US2009/060562, mailed Dec. 1, 2011 (8 pages).

* cited by examiner

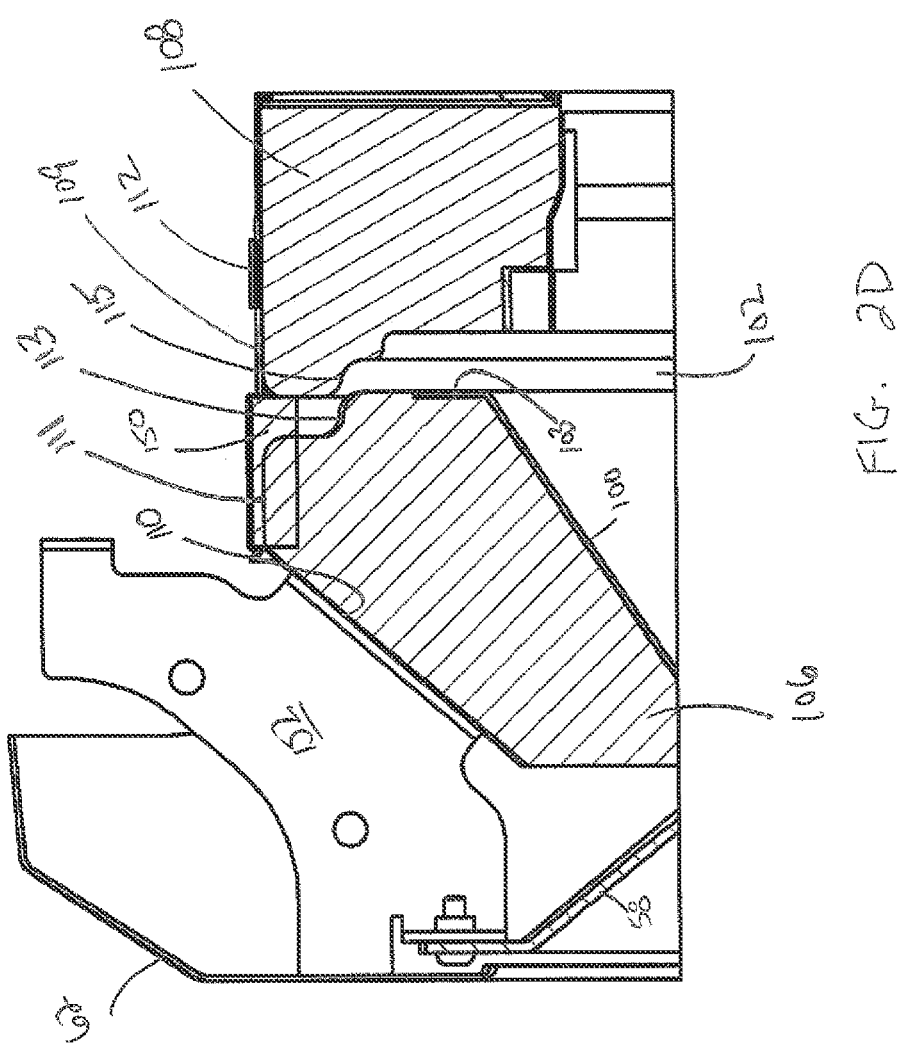

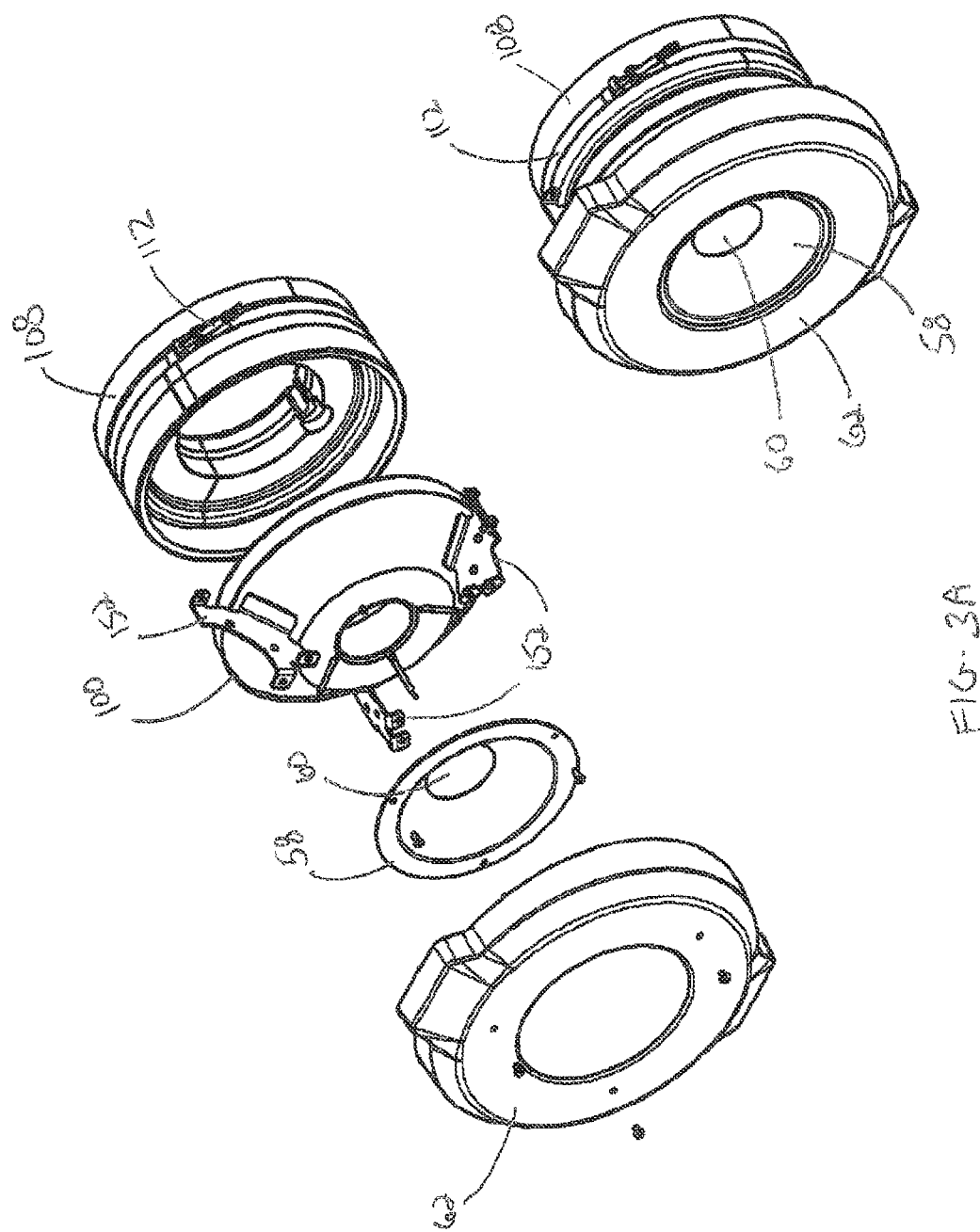

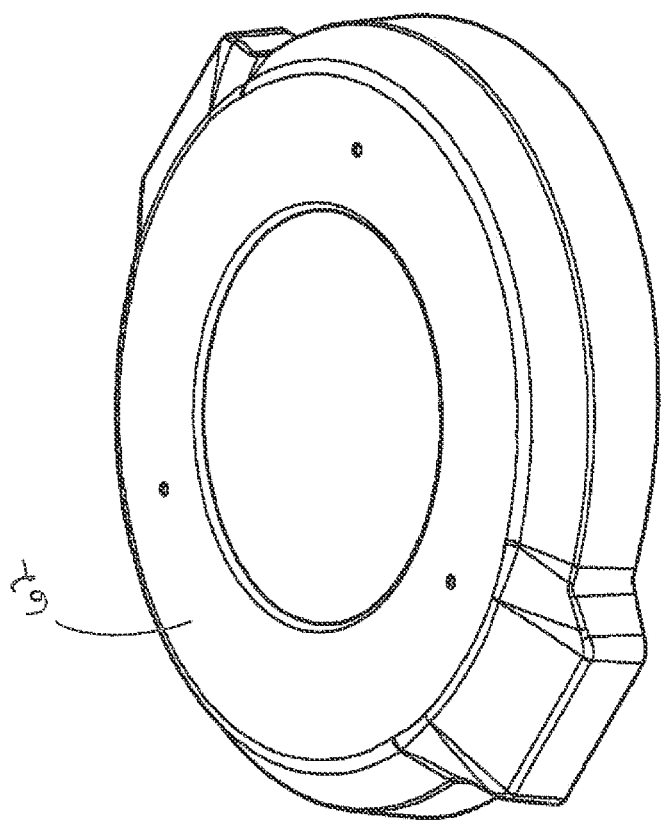

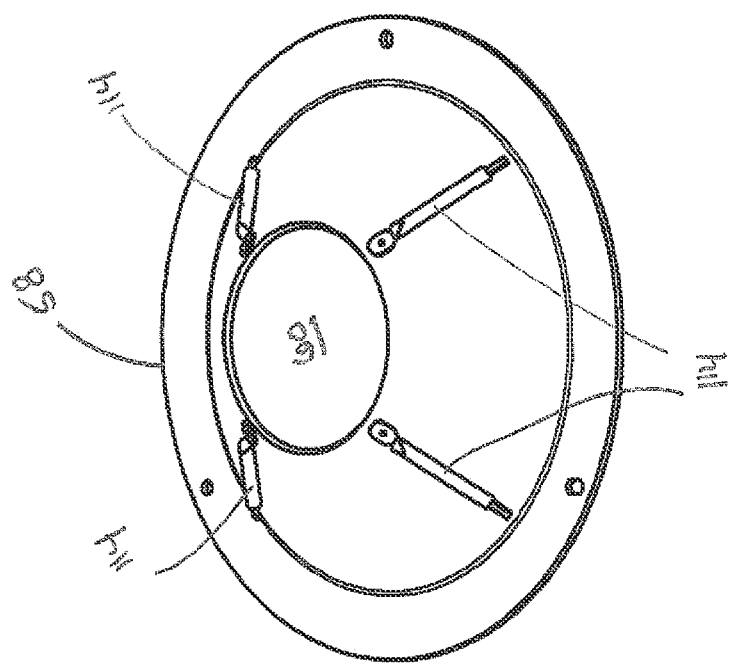

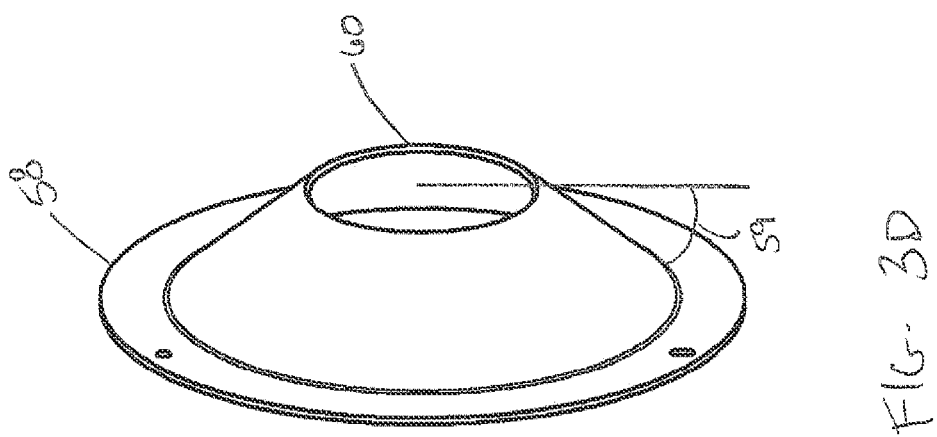

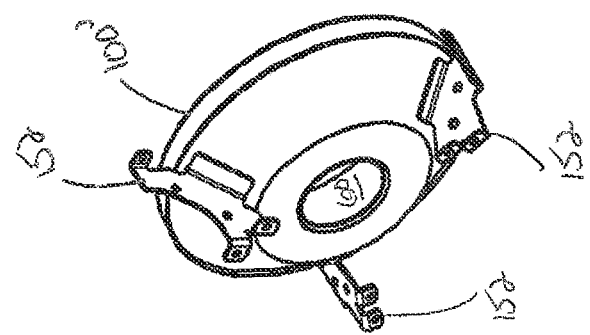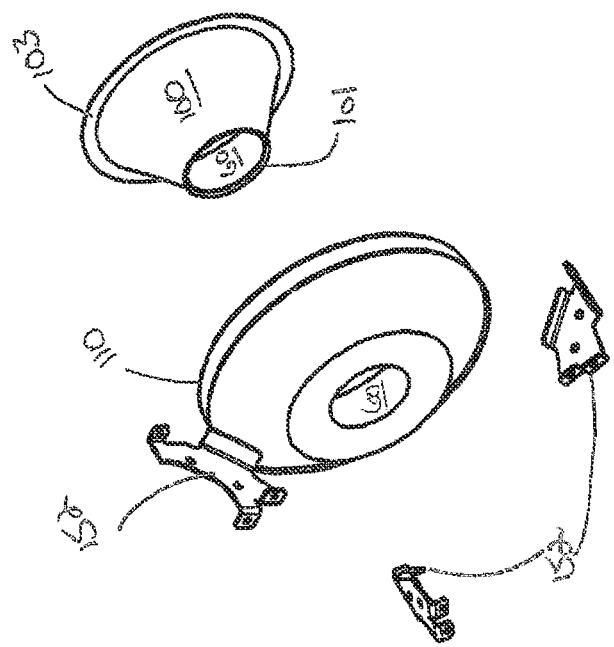
FIG. 3E

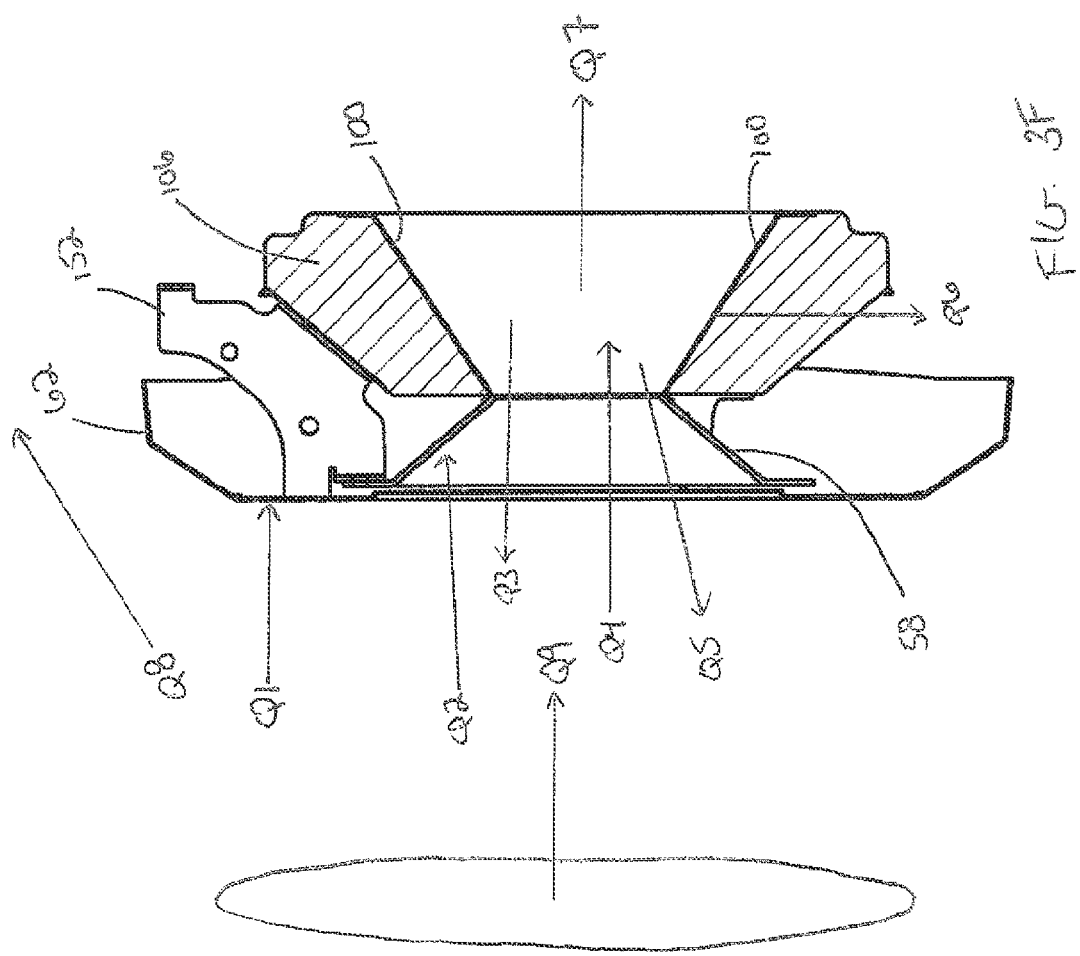

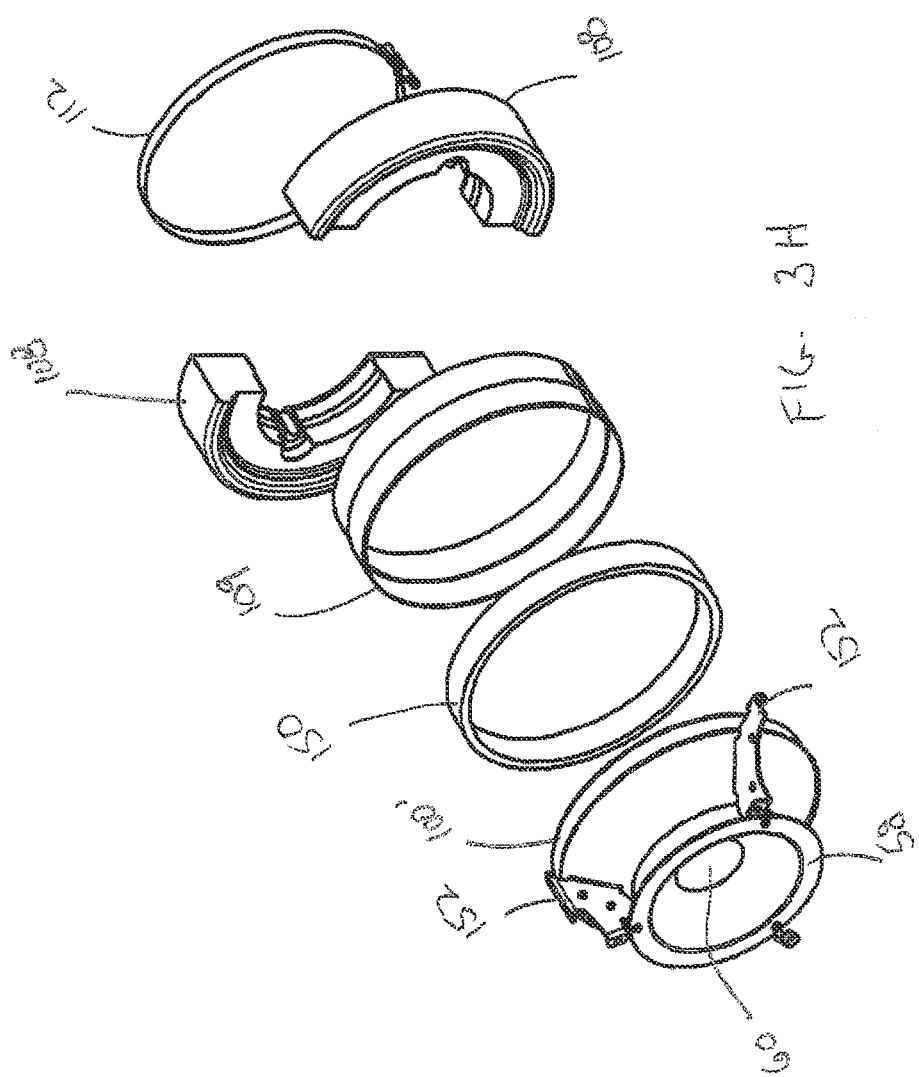

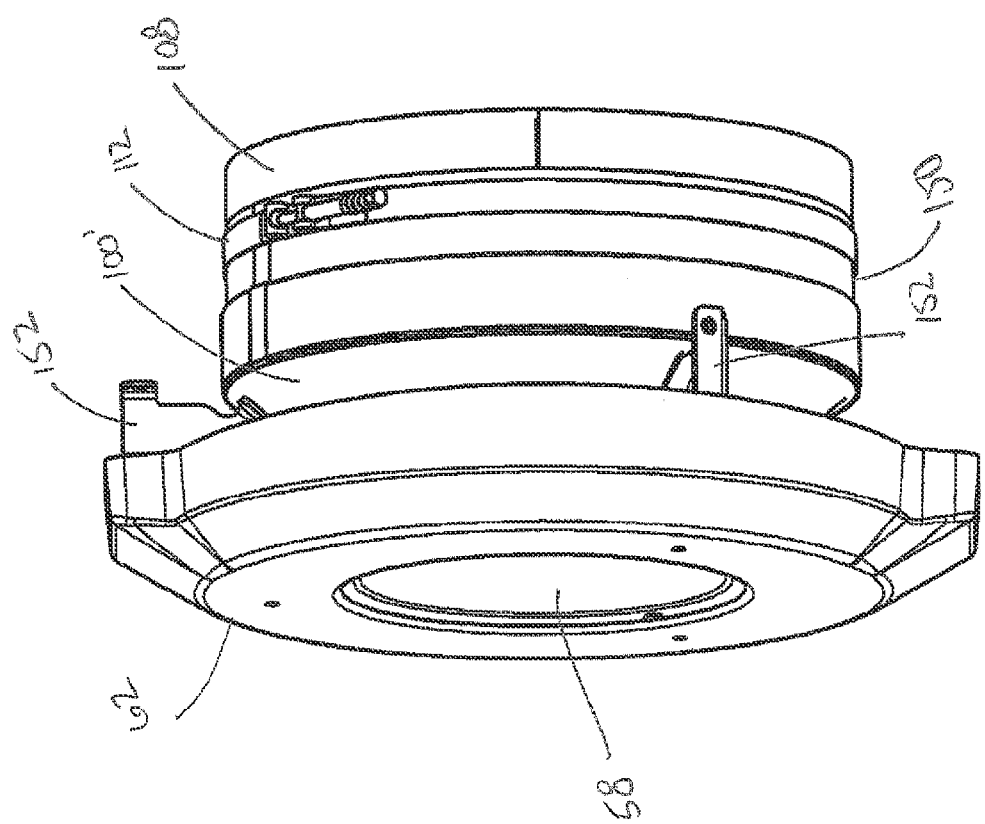

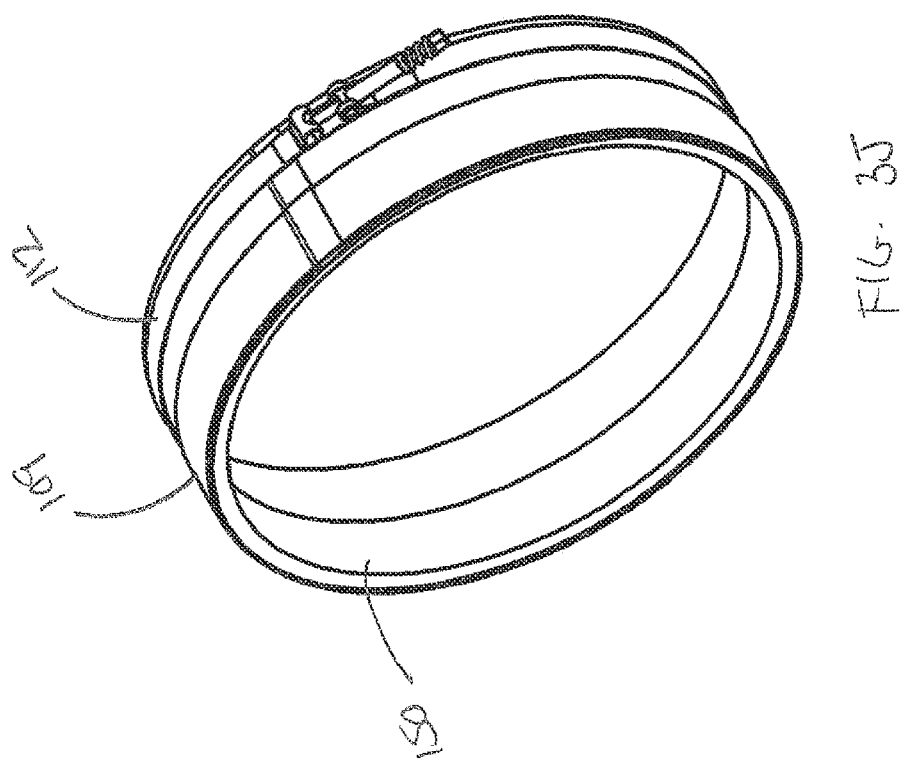

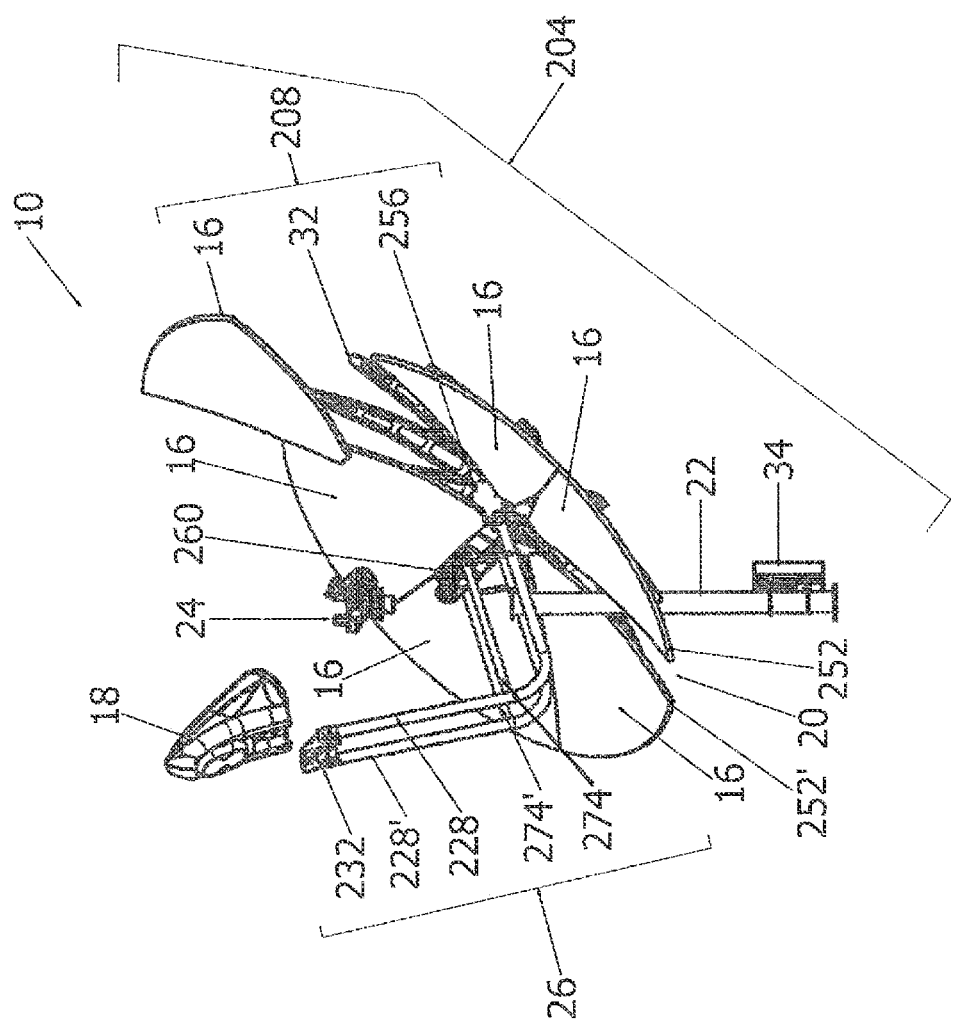

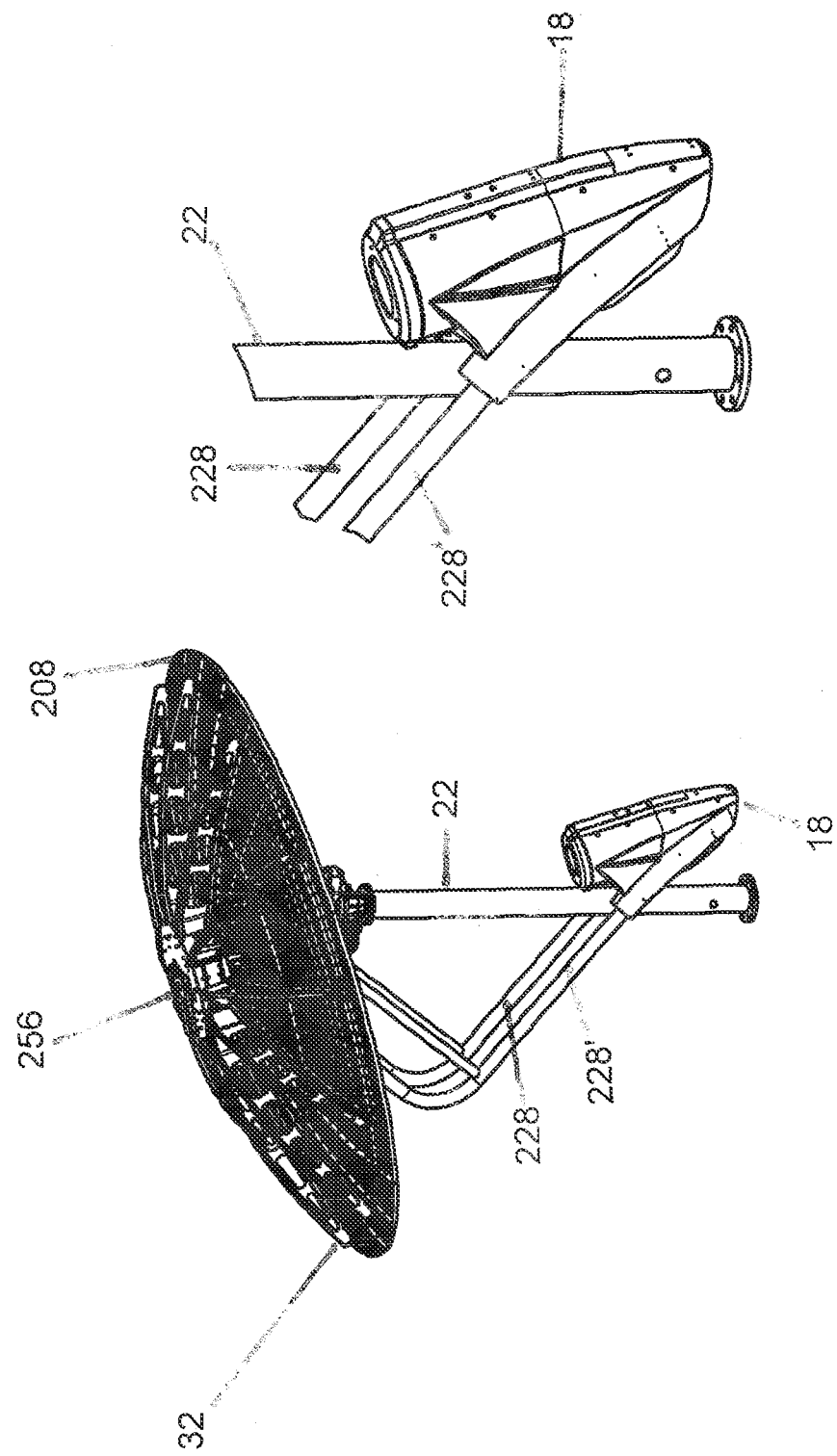

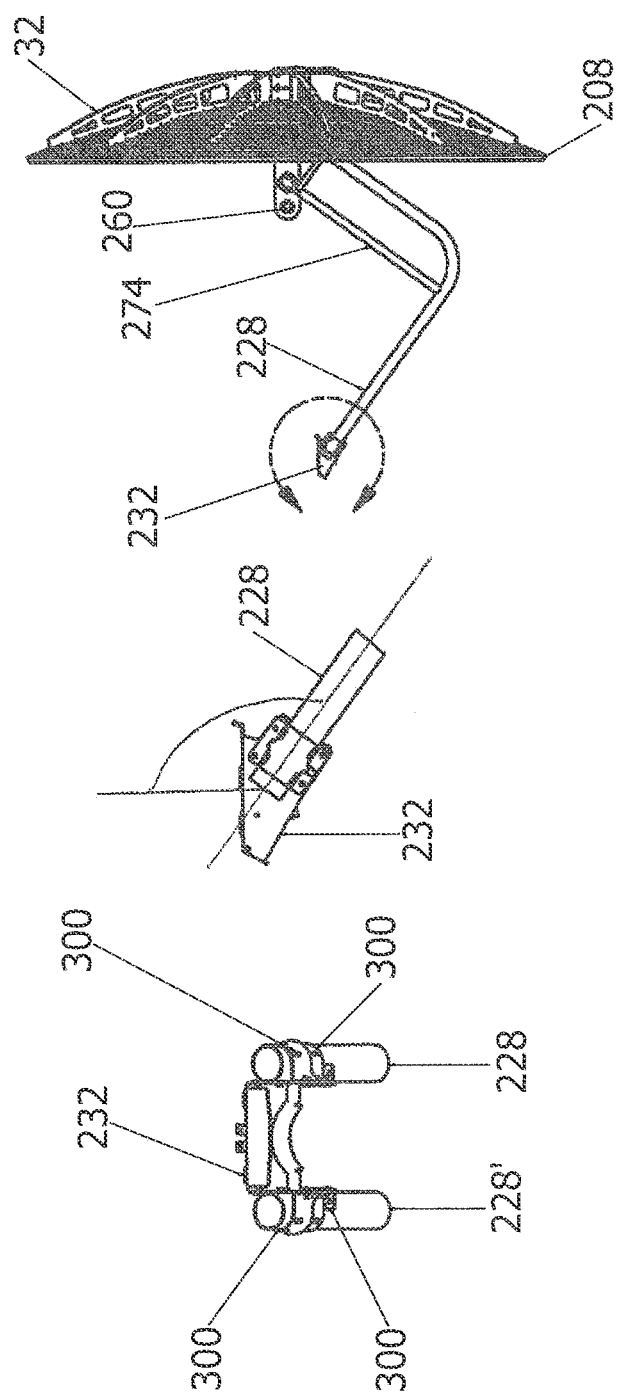

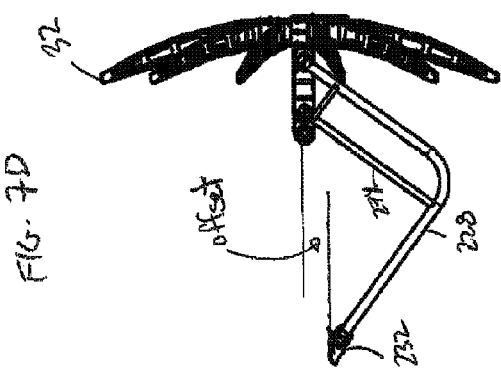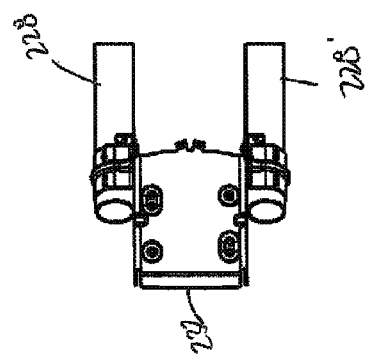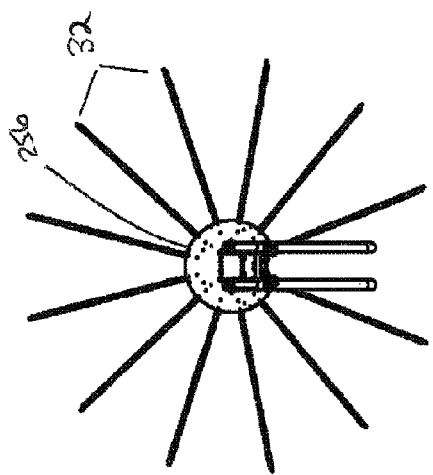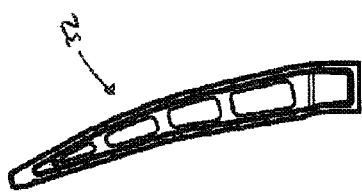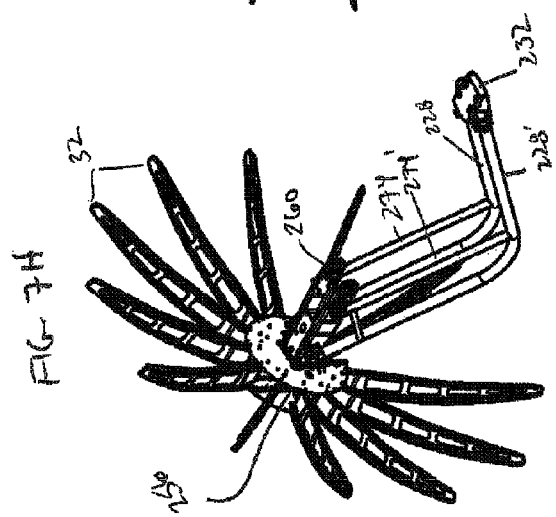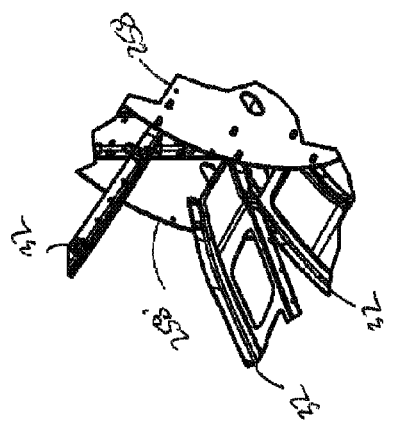

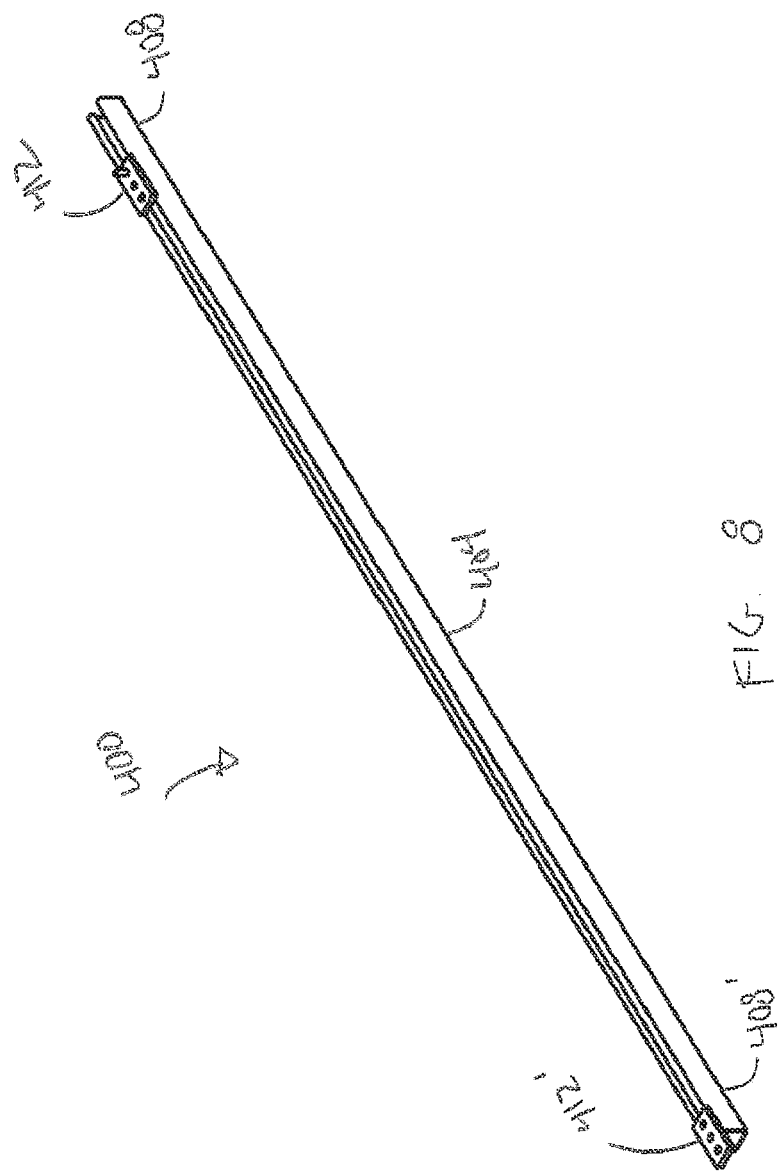

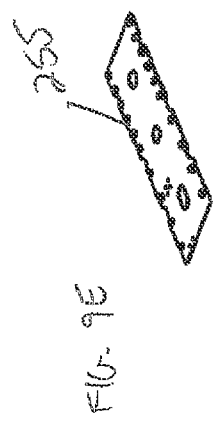
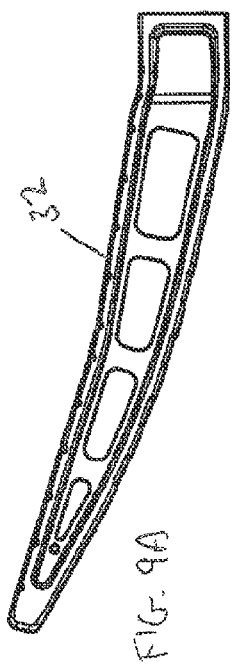
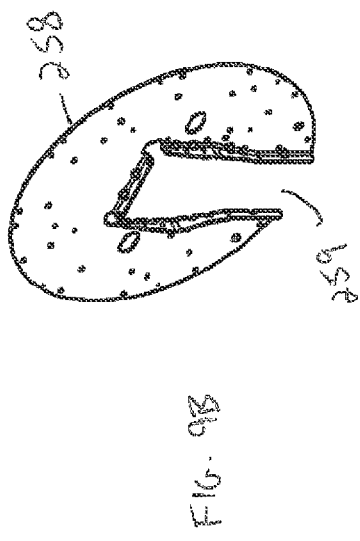
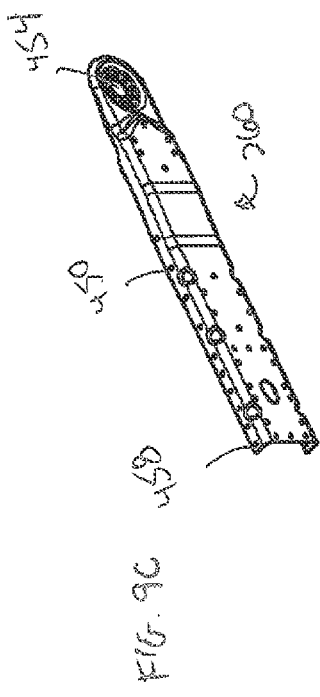

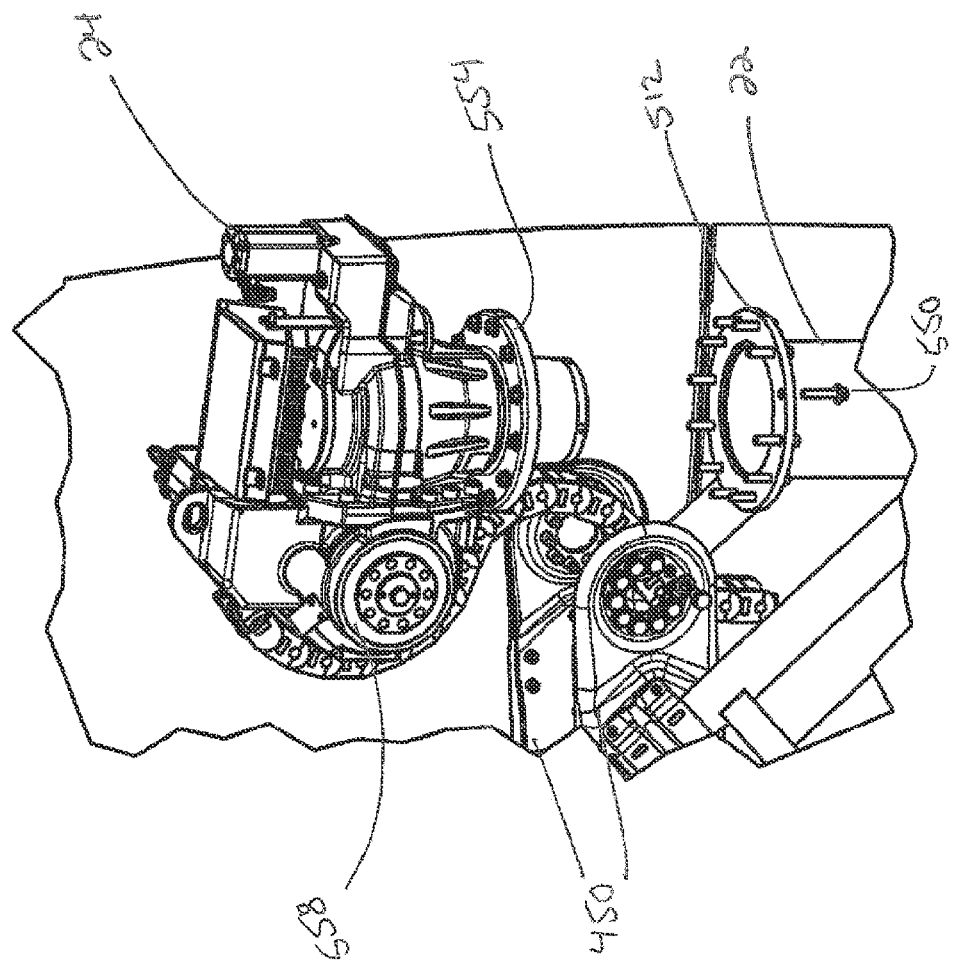

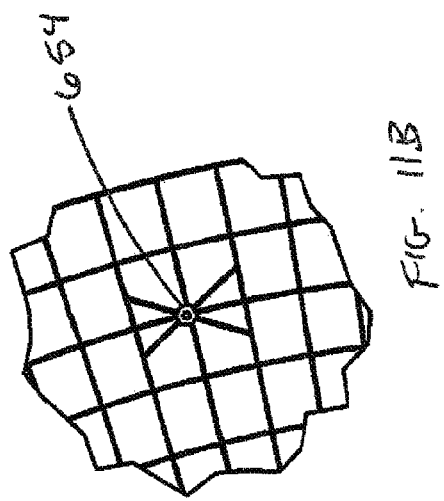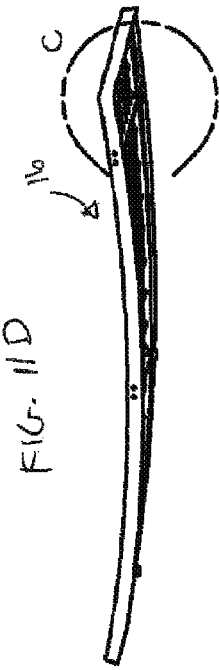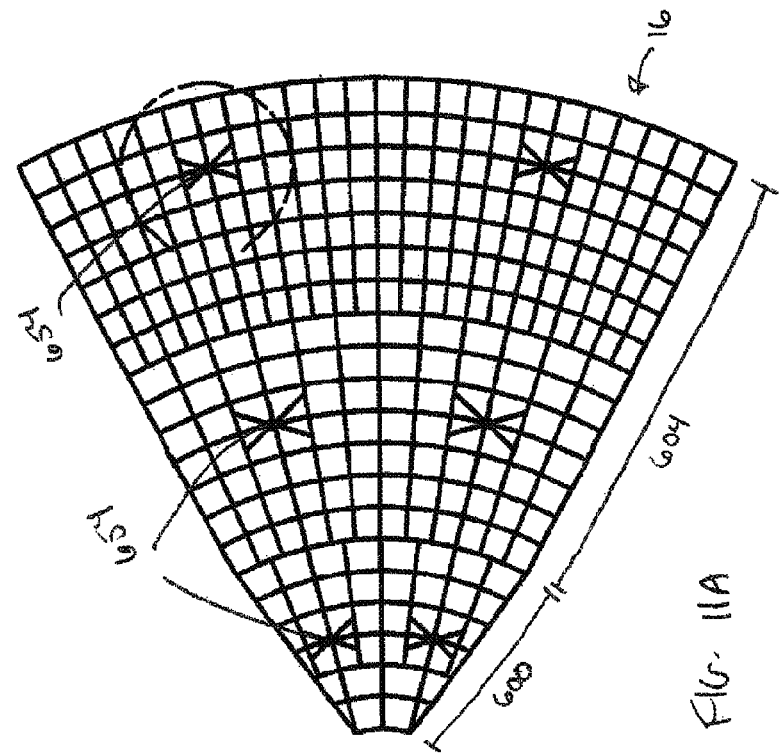

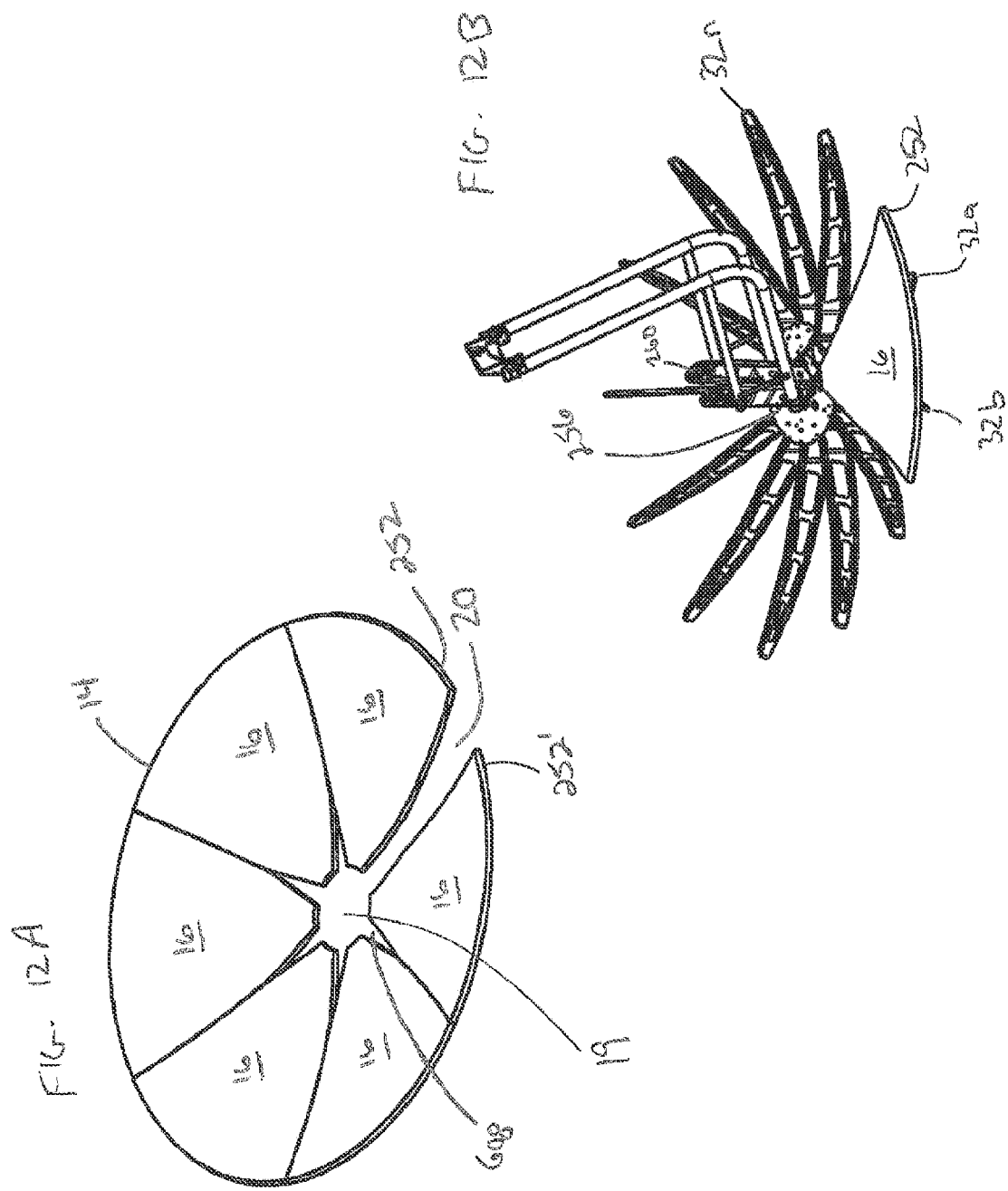

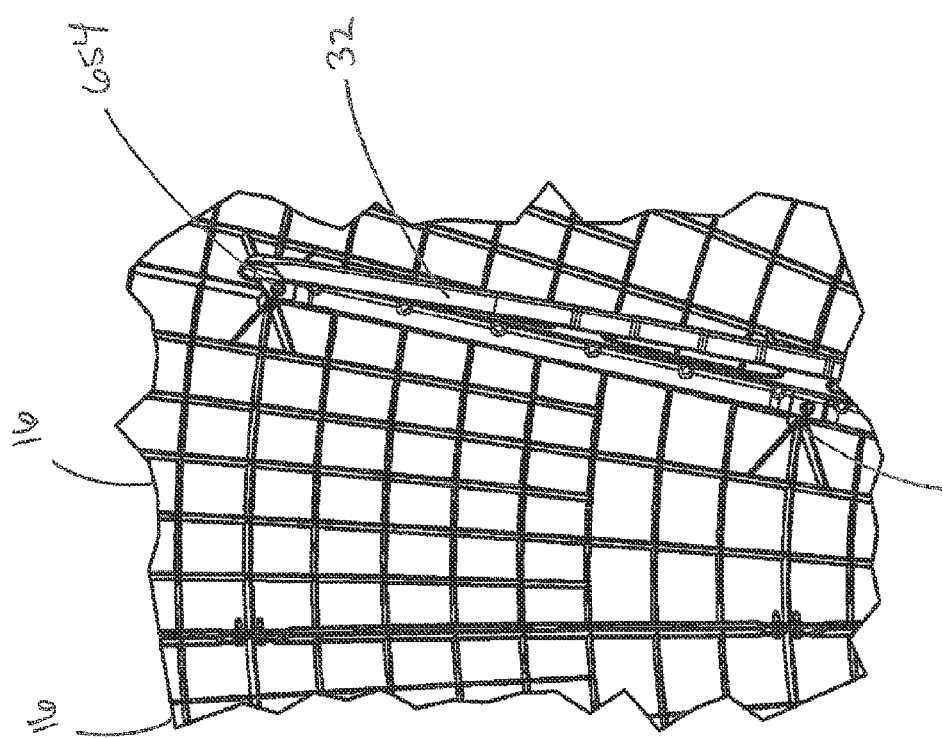

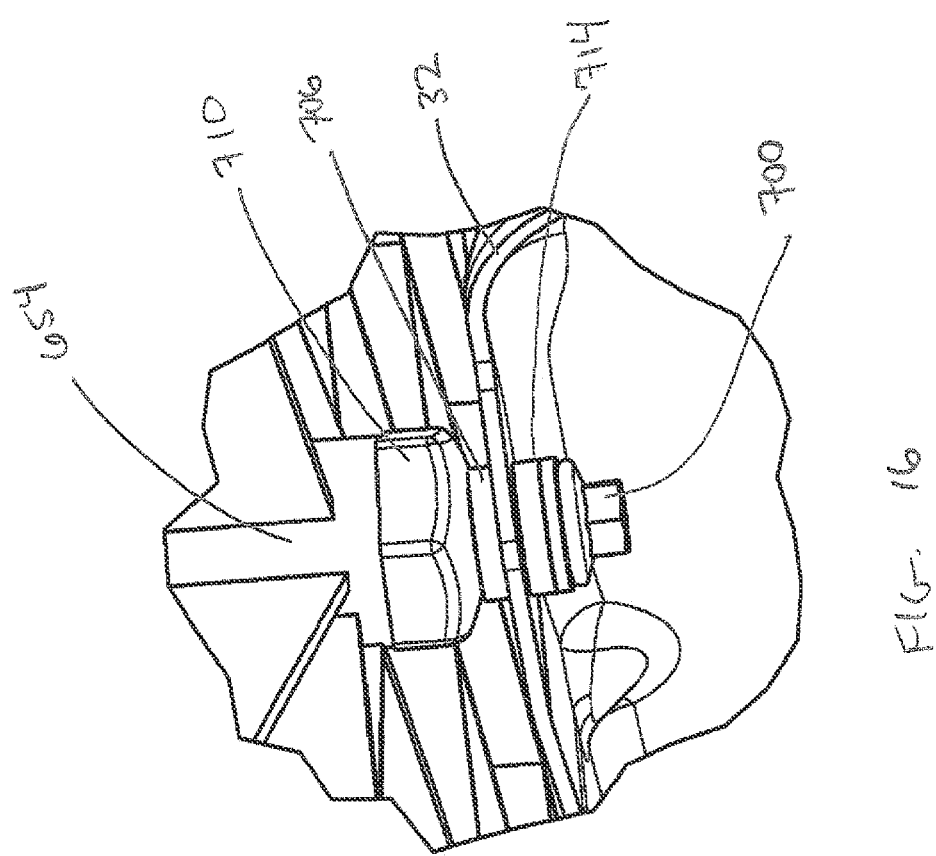

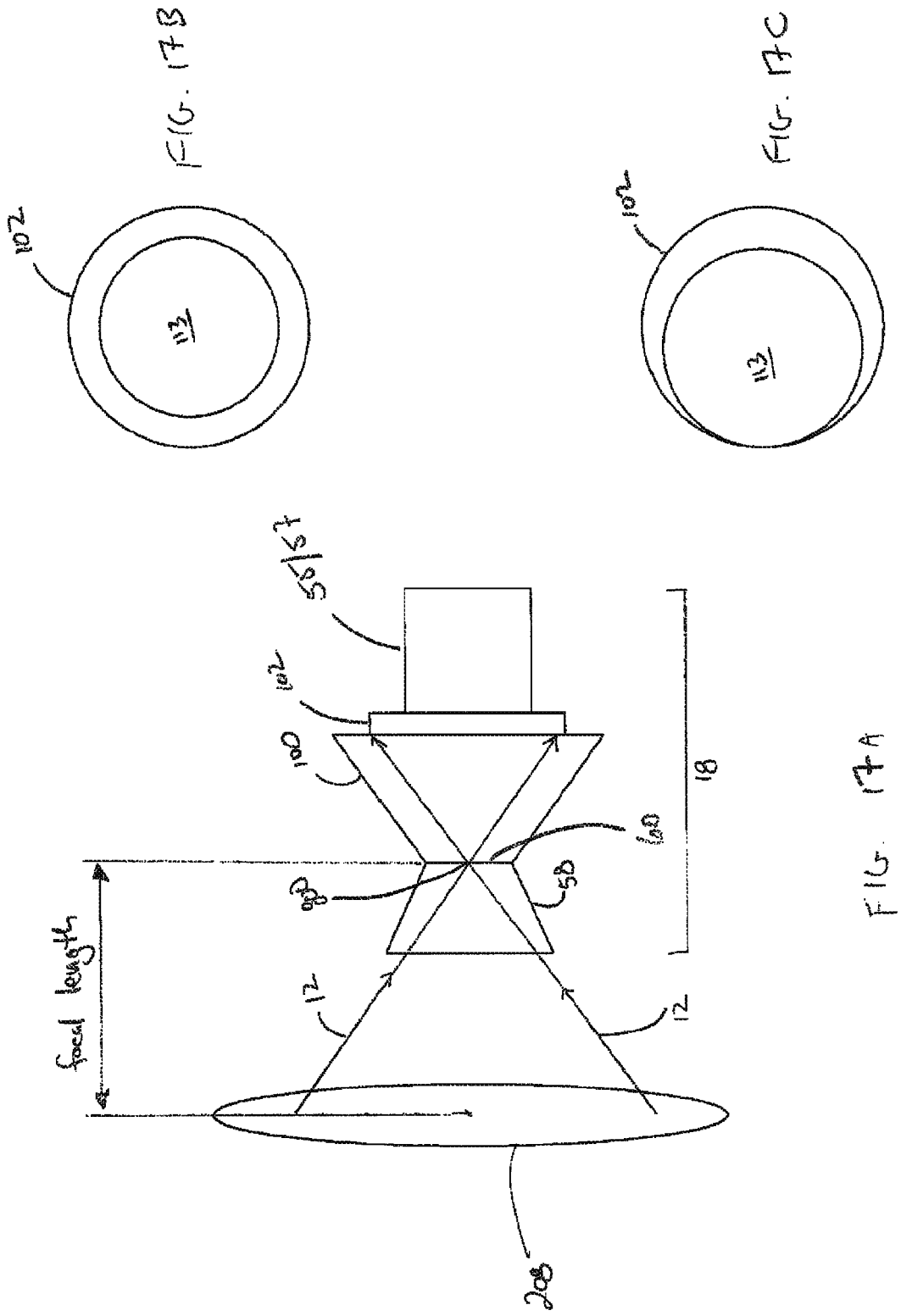

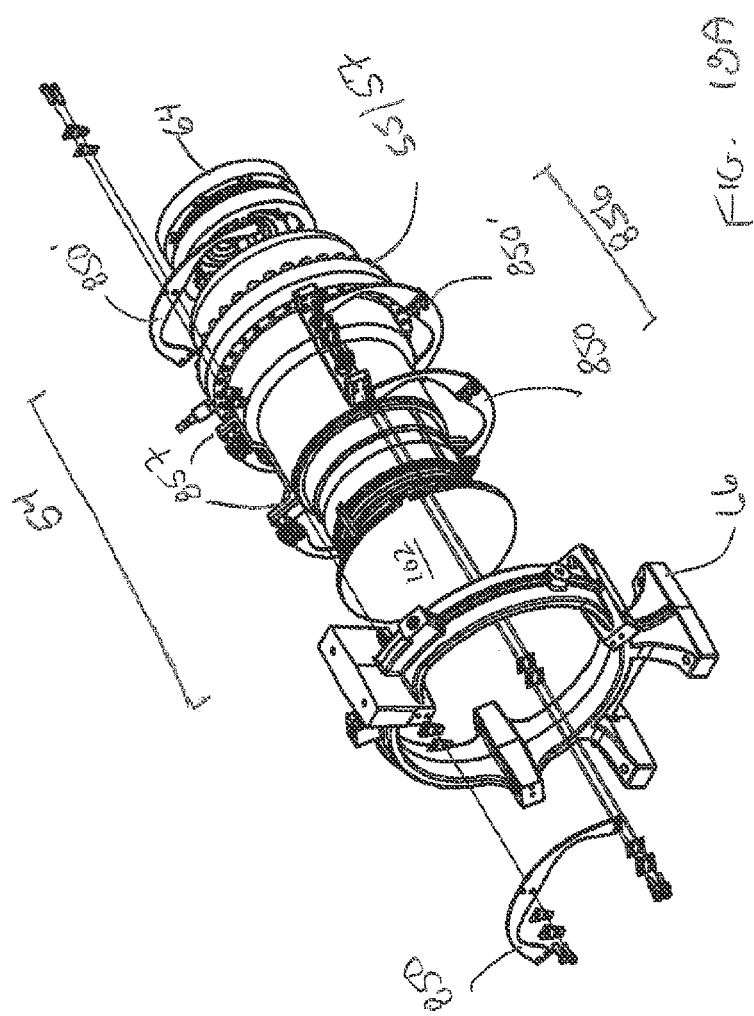

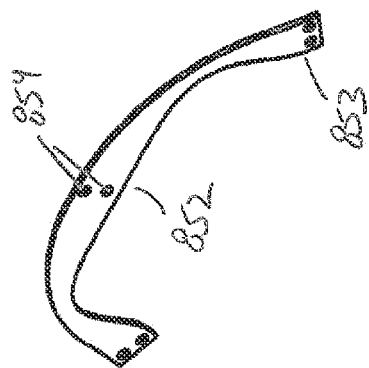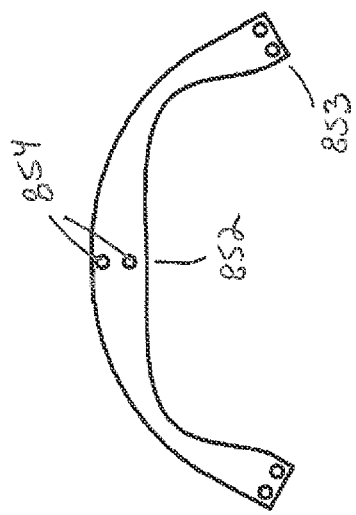
FIG. 18B

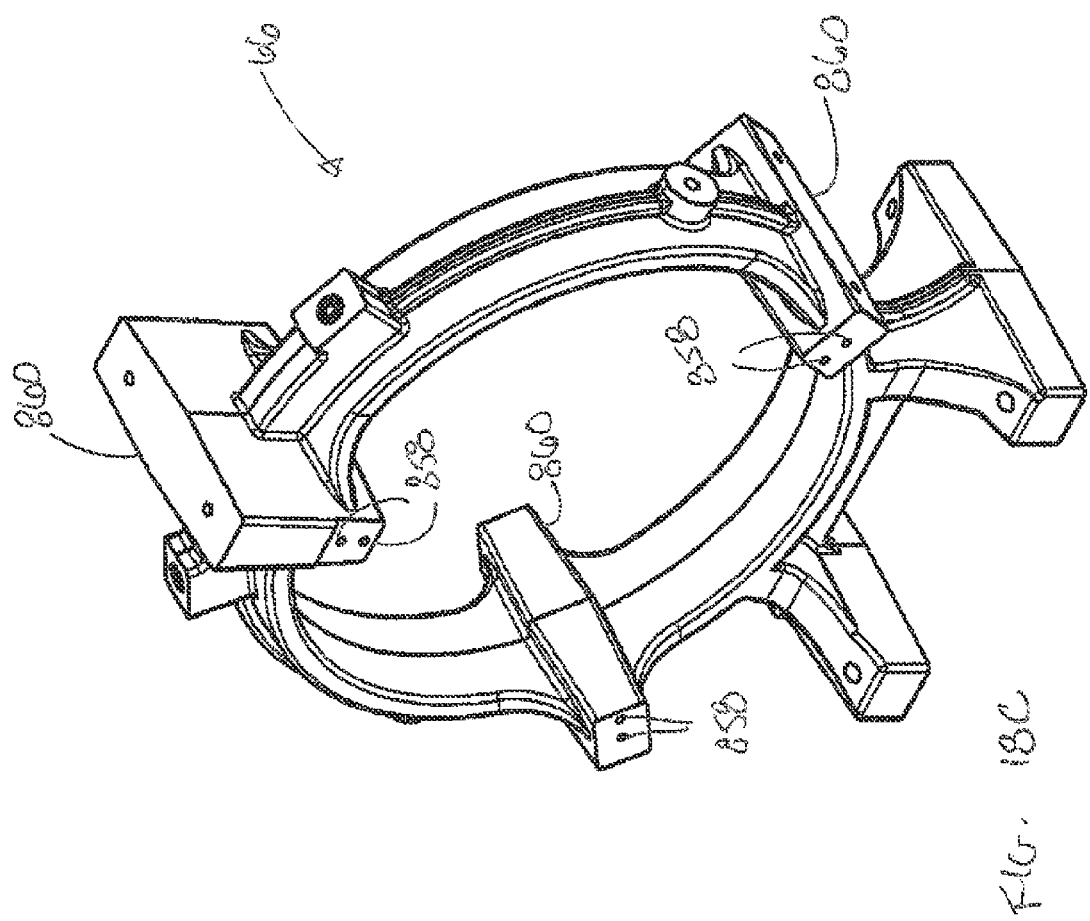

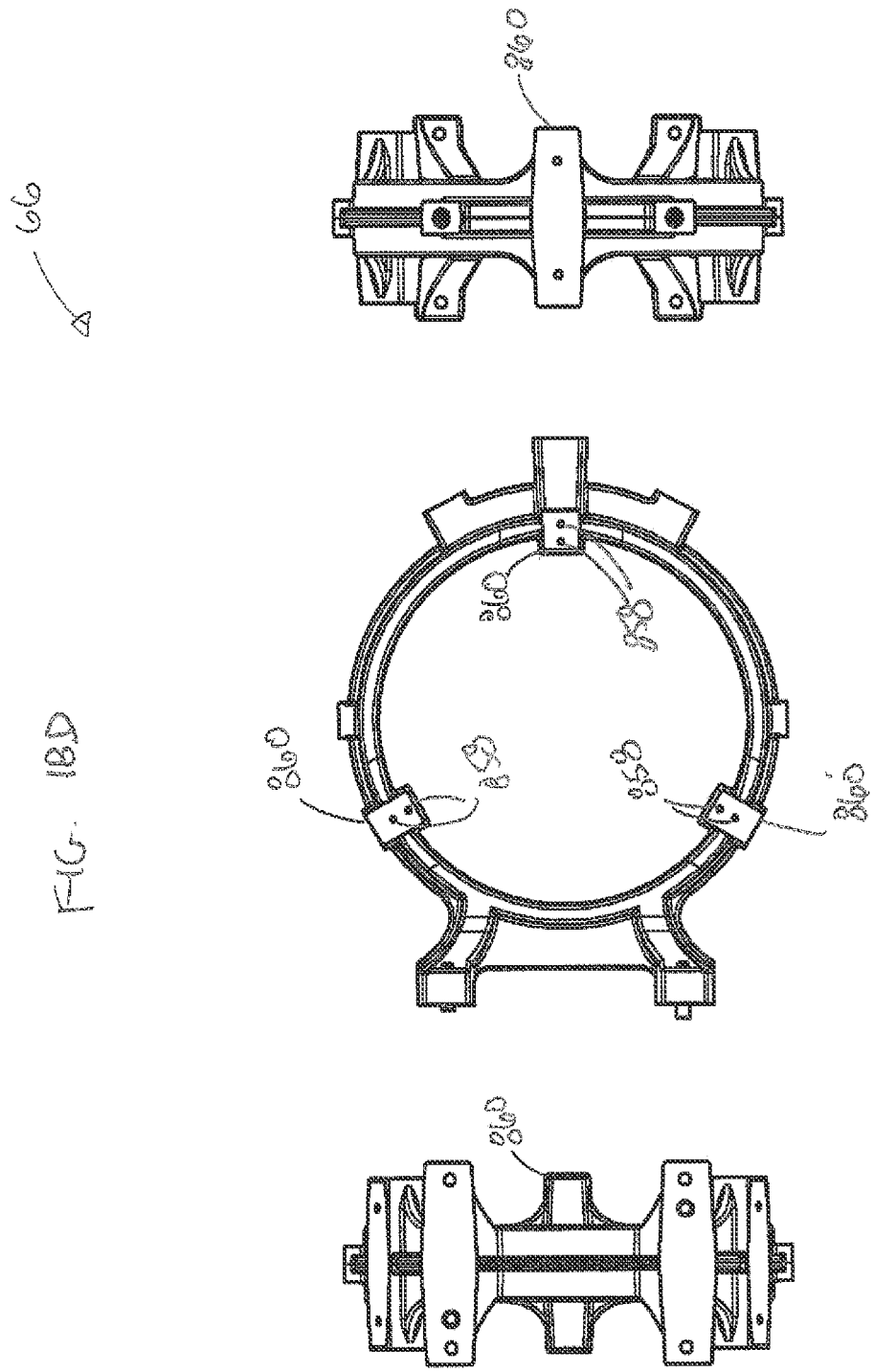

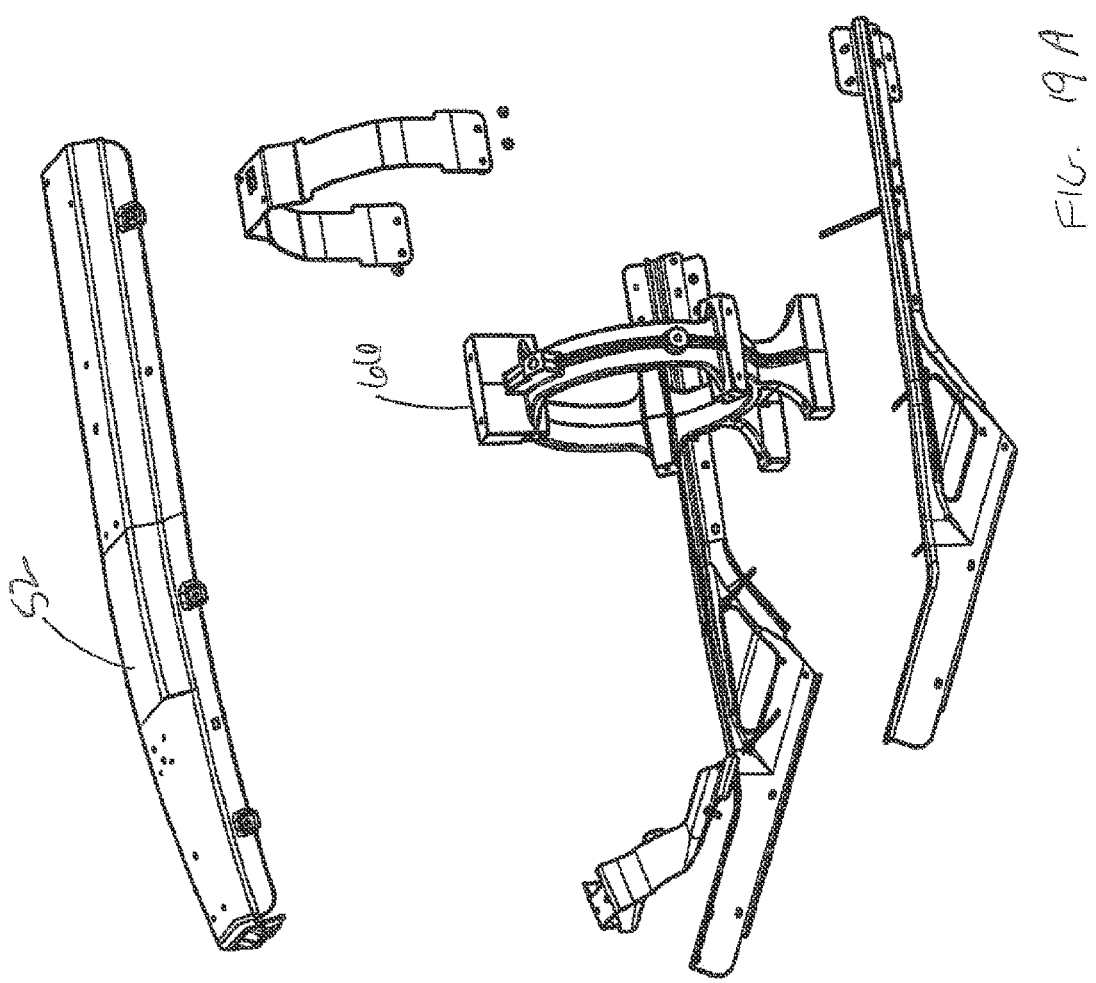

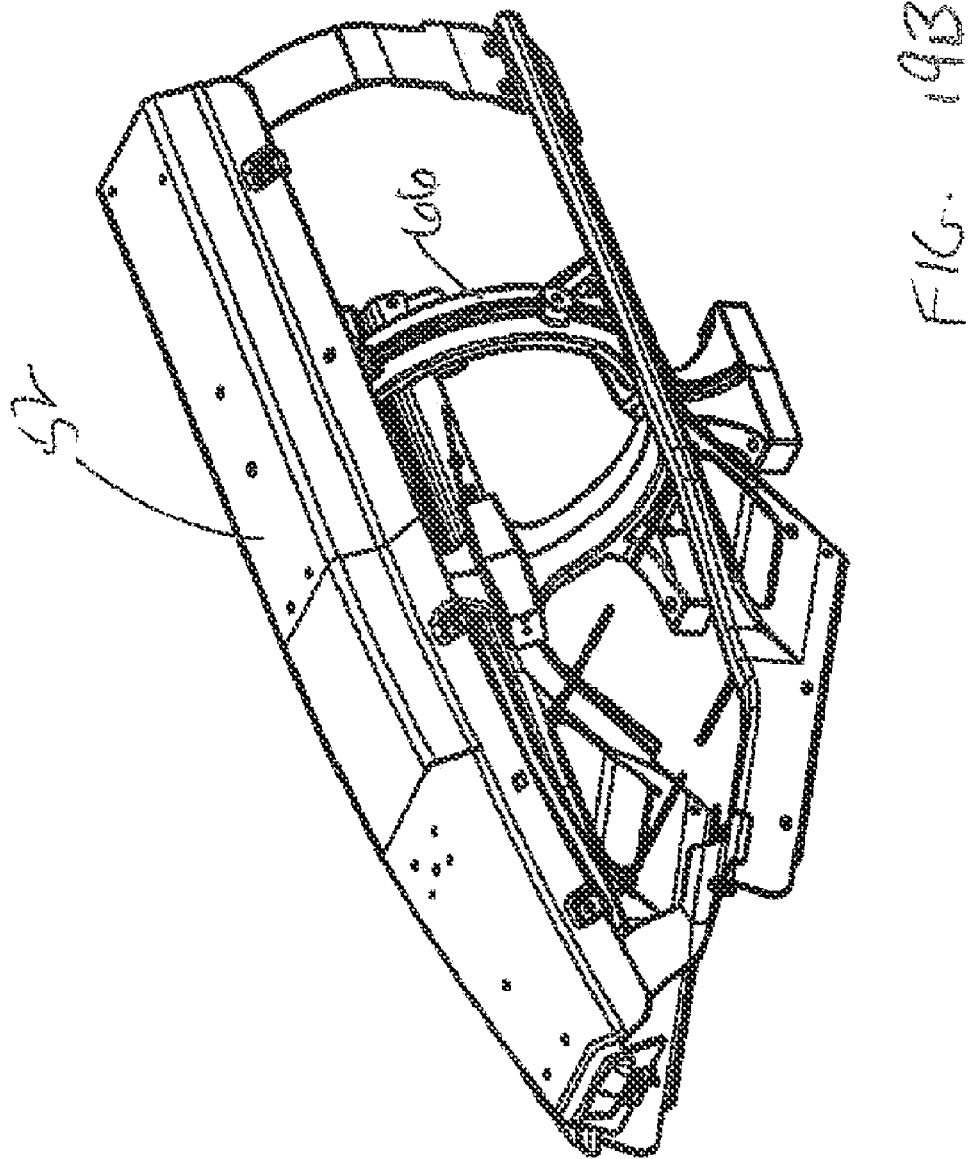

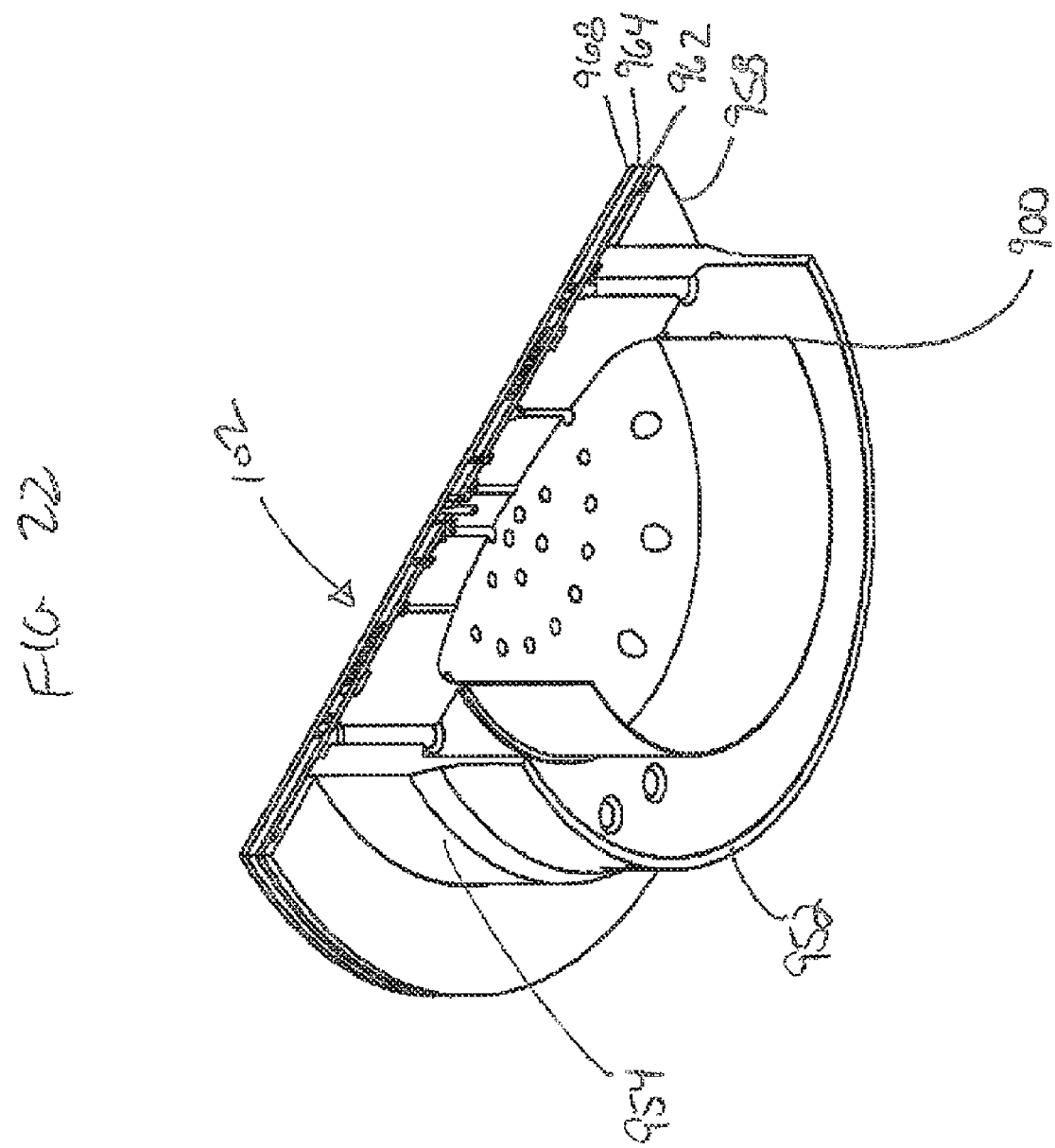

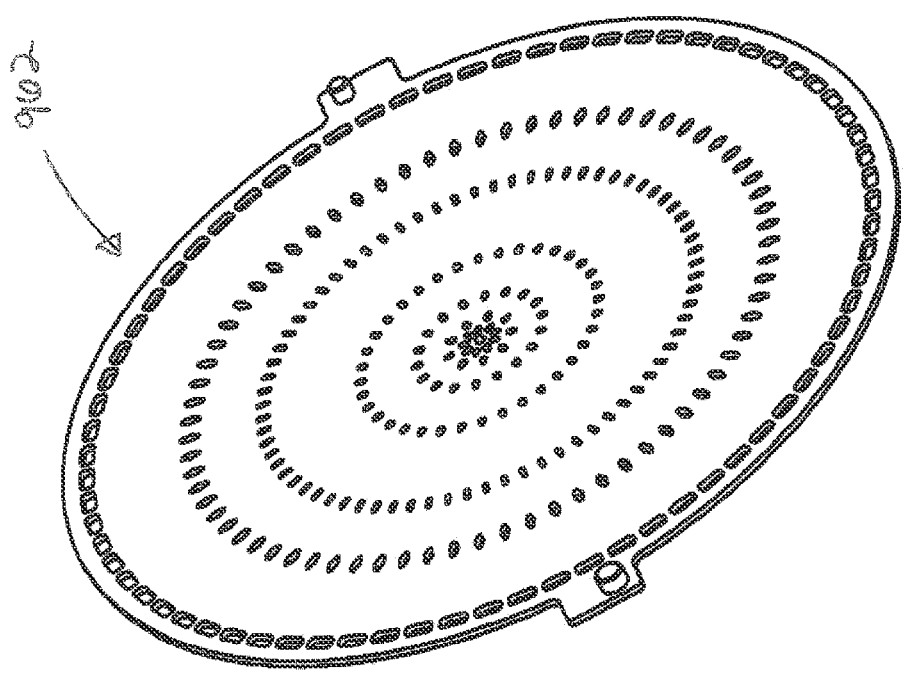

STIRLING ENGINE SYSTEMS, APPARATUS AND METHODS

CROSS REFERENCE TO RELATED APPLICATIONS

This application is a continuation of U.S. application Ser. No. 12/578,554, filed on Oct. 13, 2009, which claims priority to and the benefit of U.S. Provisional Application No. 61/104,915, filed Oct. 13, 2008, and U.S. Provisional Application No. 61/196,042, filed Oct. 13, 2008, the entire disclosures of each of which are hereby incorporated by reference herein for all purposes.

FIELD OF THE INVENTION

The invention relates generally to the field of energy converting devices such as Stirling engines. Specifically, the invention relates to devices, systems, subsystems, components and methods that facilitate the collection and conversion of solar and other types of energy.

BACKGROUND OF THE INVENTION

Current photovoltaic-based systems are expensive to produce and take from one to twenty years to generate the amount of power required for their own production. Accordingly, a need exists for other energy converting technologies that are competitive with or otherwise superior to photovoltaic-based approaches.

SUMMARY OF THE INVENTION

The present invention provides energy converting apparatuses such as Stirling machines or engines and related components, methods, apparatuses, and systems with advantageous assembly, heat exchange, manufacturing, fast mirror alignment, over insolation control, vibration control, ring frames, receiver assembly, assembly tools, thermal zone isolation, face plates, and other properties and features. As a result, there are many novel apparatuses and methods disclosed herein that relate to heat exchange, device protection, vibration control, and other features to adapt the Stirling cycle to solar power generation.

In one embodiment, the invention relates to a mechanical assembly that includes a solar energy collector, typically a reflective surface or an array of mirrors, and an energy converting apparatus. In one embodiment, the energy converting apparatus includes a Stirling cycle engine. A free-piston Stirling engine embodiment can be configured such that both the collector and the energy converting apparatus are elevated relative to the ground on a pier to enable better solar energy collection and engine positioning.

One embodiment provides a system for converting solar energy into electricity. The system can include: a solar energy concentrator including a non-planar front surface including plurality of panels defining the non-planar front surface, each panel including a plurality of edges; a boom; and an energy converting apparatus. The energy converting apparatus can include an incident solar energy receiving surface aligned to receive solar energy reflected from the solar energy concentrator; a ring frame including a plurality of supporting members and a top substantially circular region including an outer circumference and an inner circumference and including a plurality of attachment mounts; and an engine disposed within an engine housing suspended within the inner circumference and substantially perpendicular to the top substantially circular region, the boom connecting and aligning the energy converting apparatus and the solar energy concentrator. In some embodiments, the concentrator has a focal point positioned at a point offset relative to the incident solar energy receiving surface.

In some embodiments, the system includes a temperature sensor positioned to detect temperature changes in the incident solar energy receiving surface. In some embodiments, the system includes a drive unit connected to the solar energy concentrator and the temperature sensor, the drive unit programmed to misalign the concentrator with a source of solar energy and reduce an amount of solar energy impinging on the incident solar energy receiving surface when the temperature measured by the temperature sensor exceeds a predetermined threshold.

In some embodiments, each panel includes a non-planar surface, wherein the non-planar surface includes a first portion including a first edge and a second edge, the first and second edges being radially oriented with respect to the center of the concave reflector when the panel is positioned in the concave reflector; wherein the non-planar surface comprises a second portion including a third edge and a fourth edge, the third and fourth edges are radially oriented with respect to a second center that is nonconcentric with the center of the concave reflector when the panel is positioned in the concave reflector; and wherein when assembled in the concave reflector, the concave reflector includes a slot, running to the circumference of the reflector from substantially the center of the reflector, the slot having parallel edges.

In some embodiments, n panels comprise the plurality of panels, wherein n is an integer greater than two, the panels arranged such that a non-planar concave dish is formed from the arrangement of the n panels, the non-planar concave dish defining a star shaped hole and the slot formed from a plurality of edges of the n panels, the n panels are substantially identical in shape.

In some embodiments, the concave dish is oversized to provide excess solar energy relative to a relative maximum amount of solar energy that the energy converting apparatus can tolerate before overheating.

In some embodiments, each of the plurality of attachment mounts are substantially perpendicular to the top substantially circular region.

In some embodiments, the system includes an elongate slew plate connected to the outer circumference of the substantially circular region, the elongate slew plate defining an attachment point for a cover, the cover sized to substantially surround the energy converting apparatus while leaving the incident solar energy receiving surface exposed to receive solar energy.

In some embodiments, the system includes a vibration transmission reduction system for reducing the transmission of vibrations between the engine housing and a frame. The system can include: a plurality of isolation springs, each isolation spring forms a circular mount within which is positioned the engine housing, the circular mount is attached to the frame; and a passive balancer attached to the engine housing. In some embodiments, the plurality of isolation springs are arranged to form a cylindrical mounting structure having a longitudinal axis. In some embodiments, the engine and the passive balancer are aligned along the longitudinal axis or an axis parallel to the longitudinal axis. In some embodiments, the axial spring stiffness of the isolation springs is selected in response to the gravity load so as to ensure the engine housing remains in a predetermined axial tolerance band. In some embodiments, the predetermined axial tolerance band range from about 0 mm to about 0.6 mm.

In some embodiments, the circular mount is attached to the ring frame. In some embodiments, the frame is a ring frame including a plurality of supporting members and a top substantially circular region, wherein the isolation springs are flexures, wherein the engine housing and passive balancer are suspended by the flexures.

In some embodiments, the concentrator includes a chassis, and the chassis includes a first mating surface and a second mating surface, both mating surfaces sandwiching a plurality of elongate members which radiate outward from a common center, each of the plurality of panels attached to at least one elongate member. In some embodiments, the system includes a biaxial drive assembly supported by a pier and connected to the chassis. In some embodiments, the biaxial drive assembly is configured for causing rotation of the concentrator about two orthogonal axes. The biaxial drive assembly can include: a first drive unit having a first axis of rotation; and a second drive unit having a second axis of rotation and offset from the first drive unit, the second drive unit is positioned separate from first drive unit such that the first and second axes of rotation are orthogonal but do not intersect. In some embodiments, the first and second drives cause the chassis to move, the first drive unit causes rotation of the chassis about a vertical axis of rotation of the first drive unit; the second drive unit causes rotation of the chassis about a horizontal axis of rotation of the second drive unit, and when the second drive unit has caused a rotation of the chassis about the horizontal axis of the second drive unit so as to cause the directional axis of the chassis to be vertical, the directional axis of the chassis is parallel to but non-coincident with vertical axis of rotation of the first drive unit. In some embodiments, the first axis is an azimuth axis that is offset from the second axis, the second axis is an elevation axis. In some embodiments, wherein the azimuth axis is normal to level ground and configured to move an object based on compass direction. In some embodiments, at least two of the plurality of edges define a slot.

One embodiment provides a panel for use in a substantially concave reflector. The panel can include a non-planar surface, wherein the non-planar surface has a first portion including a first edge and a second edge, the first and second edges being radially oriented with respect to the center of the concave reflector when the panel is positioned in the concave reflector, wherein the non-planar surface has a second portion including a third edge and a fourth edge, the third and fourth edges not radially oriented with respect to the center of the concave reflector when the panel is positioned in the concave reflector; and wherein when assembled in the concave reflector, the concave reflector includes a slot, running to the circumference of the reflector from substantially the center of the reflector, the slot having parallel edges. In some embodiments, the panel further includes a rear surface and wherein the rear surface includes a plurality of attachment bosses, each attachment boss capable of being attached to an elongate member of the conclave reflector to thereby form the concave reflector having a predetermined focal point. In some embodiments, a substantially circular region defining a first hole and a plurality of triangular shaped regions defining a plurality of holes are formed when the concave reflector is assembled. In some embodiments, the slot defines a first area substantially equal to a second area defined the first hole and plurality of holes. In some embodiments, the panel includes a structural substrate, a top surface including a reflective surface, and a bottom surface including a plurality of attachment bosses, the attachment bosses disposed such that the panel can be attached to at least one elongate member. In some embodiments, the reflective surface includes a plurality of tiles. In some embodiments, the elongate member includes a rib.

One embodiment provides a panel for use in a substantially concave reflector. The panel can include a non-planar surface, the surface defining a sector of the concave reflector, the non-planar surface including a first edge and a second edge, the first edge and second edge radially oriented relative to a first center; the non-planar surface including a third edge and a fourth edge, the third edge and the fourth edge radially oriented relative to a second center. In some embodiments, the orientation of each of the edges is such that when a plurality of the panels are arranged to form a concave reflector a slot is defined in the concave reflector.

One embodiment provides a kit for forming a concave reflector. The kit can include: a plurality of elongate members; and a plurality of panels. Each panel can include: a non-planar surface, wherein the non-planar surface includes a first portion including a first edge and a second edge, the first and second edges being radially oriented with respect to the center of the concave reflector when the panel is positioned in the concave reflector, wherein the non-planar surface includes a second portion including a third edge and a fourth edge, the third and fourth edges are radially oriented with respect to a second center that is nonconcentric with the center of the concave reflector when the panel is positioned in the concave reflector; and wherein when assembled in the concave reflector, the concave reflector includes a slot, running to the circumference of the reflector from substantially the center of the reflector, the slot having parallel edges.

One embodiment provides a solar energy concentrator. The concentrator can include n panel segments, wherein n is an integer greater than two, the panel segments arranged such that a non-planar concave dish is formed from the arrangement of the n panel segments, the non-planar concave dish defining a star shaped hole and a slot formed from a plurality of edges of the n panel segments.

One embodiment provides an alignment tool for use in assembling a concave reflector, where the concave reflector can include a hub plate, the hub plate including a first alignment point, and a plurality of elongate members, each of the plurality of elongate members including a hub end for attachment to the hub and a distal end, the distal end including a second alignment point. The alignment tool can include an elongate body portion including a first end and a second end; a first attachment unit located at the first end of the elongate body portion; and a second attachment unit located at the second end of the elongate body portion, wherein the first attachment unit is for attaching the alignment tool to the first alignment point on the hub plate, and the second attachment unit for attaching the alignment tool to the second alignment point of the elongate member to thereby align each elongate member with respect to the hub plate prior to fixation of the elongate member to the hub plate.

One embodiment provides a method of assembling a reflector unit including: a hub plate, the hub plate including a first alignment point; a plurality of elongate members, each of the plurality of elongate members including a hub end for attachment to the hub plate and a distal end, the distal end including a second alignment point; and a plurality of panels. The method of assembly uses an alignment tool which includes an elongate body portion including a first end and a second end; a first attachment unit located at the first end of the elongate body portion; and a second attachment unit located at the second end of the elongate body portion. The method can include the steps of: attaching an elongate member to the hub plate; attaching the first attachment unit of the alignment tool to one first alignment point on the hub plate; attaching the second attachment unit of the alignment tool to the second alignment point of the elongate member; aligning the elongate member with respect to the hub plate; fixing elongate member to the hub plate; repeating each step for each elongate member of the plurality of elongate members; once the elongate members have been affixed to the hub plate, affixing each of the plurality of panels to the elongate members.

One embodiment provides a method of assembling a collector having a central axis for use with an energy converting apparatus. The method can include the steps of sandwiching a plurality of elongate members between a first substantially planar mating surface and a second substantially planar mating surface, each elongate, member including two substantially collinear pins located on either side of a first end of each elongate member, each mating surface defining a plurality holes, each hole sized to receive one of the pins; and securing the substantially planar mating surfaces such that the collinear pins are positioned within corresponding holes in each respective mating surface such that the mating surfaces are perpendicular to the central axis and a second end of each of the structural members radiates outward away from the central axis. In some embodiments, the method can include the step of attaching a plurality of panel segments to the plurality of elongate members. In some embodiments, each panel segment includes attachment bosses on a first side and a reflective surface on a second side. In some embodiments, the method can include the step of aligning all of the panel segments to form a collector focus point at a location above the collector. In some embodiments, the alignment step is performed by sequentially tightening a plurality of fastener elements positioned to attach the panels to the elongate members by a prescribed amount.

One embodiment provides a drive assembly for causing rotation about two orthogonal axes. The drive assembly can include: a first drive unit having a first axis of rotation; and a second drive unit having a second axis of rotation, wherein the second drive unit is positioned separate from first drive unit such that the first and second axes of rotation are orthogonal but do not intersect. In some embodiments, the first and second drives cause a body having a directional axis to rotate, the first drive unit causes rotation of the body about a vertical axis of rotation of the first drive unit; the second drive unit causes rotation of the body about a horizontal axis of rotation of the second drive unit, wherein when the second drive unit has caused a rotation of the body about the horizontal axis of the second drive unit so as to cause the directional axis of the body to be vertical, the directional axis of the body is parallel to but non-coincident with vertical axis of rotation of the first drive unit. In some embodiments, the first axis is an azimuth axis that is offset from the second axis, the second axis is an elevation axis. In some embodiments, the azimuth axis is normal to level ground and configured to move an object based on compass direction. In some embodiments, the elevation axis is configured to move an object through a plurality of elevations. In some embodiments, the elevation axis is arranged relative to the azimuth such that a top surface of the first drive unit is defines a hole through which cabling can be routed. In some embodiments, the first drive unit has a first origin and a first coordinate system and wherein the second drive unit has a second origin and a second coordinate system such that the first origin and the second origin are offset relative to each other.

One embodiment provides a pier assembly for supporting a two axis rotatable object. The pier assembly can include: a base; a hollow elongate member extending from the base; and a drive assembly for causing rotation of the object about two orthogonal axes. The drive assembly can include: a first drive unit having a first axis of rotation; and a second drive unit having a second axis of rotation, wherein the second drive unit is positioned separate from first drive unit such that the first and second axes of rotation are orthogonal and offset relative to each other such that each axis does not intersect the other. In some embodiments, the first drive unit includes a surface defining a hole that connects to the hollow elongate member. In some embodiments, the hole is sized to receive a wire or cable.

One embodiment provides a vibration transmission reduction system for reducing the transmission of vibrations between an engine housing and a frame. The system can include: a plurality of isolation springs, each isolation spring forms a circular mount within which is positioned the engine housing, the circular mount is attached to the frame; and a passive balancer attached to the engine housing. In some embodiments, the plurality of isolation springs are arranged to form a cylindrical mounting structure having a longitudinal axis. In some embodiments, the system can include a heater head, engine, and passive balancer arranged along a common longitudinal axis, the engine disposed within the engine housing. In some embodiments, the axial spring stiffness of the isolation springs is selected in response to the gravity load so as to ensure the engine housing remains in a predetermined axial tolerance band. In some embodiments, the predetermined axial tolerance band ranges from about 0 mm to about 0.6 mm. In some embodiments, the frame is a ring frame including a plurality of supporting members and a top substantially circular region. In some embodiments, the circular mount is attached to the ring frame. In some embodiments, the frame is a ring frame including a plurality of supporting members and a top substantially circular region, wherein the isolation springs are flexures, wherein the engine housing, heater head and passive balancer are suspended by the flexures. In some embodiments, the engine housing, heater head and passive balancer are suspended by the ring frame and maintained in collinear alignment using the circular mount.

One embodiment provides a method for reducing overinsolation of a heat exchanger. The method can include the steps of: providing a heat exchanger having a surface area for absorbing solar radiation; concentrating solar radiation on the surface area of the heat exchanger such that the concentrated solar radiation impinges on a portion of the entire surface area of the heat exchanger; and moving the concentrated solar radiation about the surface area of the heat exchanger. In some embodiments, the step of moving the concentrated solar radiation includes moving the concentrated solar radiation in a pattern. In some embodiments, the pattern is substantially circular. In some embodiments, the solar radiation is moved about the surface at about 1 to about 30 revolutions per minute. In some embodiments, the step of moving the concentrated solar radiation includes randomized movement of the concentrated solar radiation. In some embodiments, concentrated light impinges on less than about 100% of the entire surface area of the heat exchanger. In some embodiments, the method can include the step of reducing the portion of the surface area onto which concentrated solar radiation impinges when the temperature of the heat exchanger reaches a predetermined limit, thereby reducing thermal input. In some embodiments, the method can include the step of providing a solar concentrator or components thereof. In some embodiments, the method can include the step of providing a Stirling engine. In some embodiments, the Stirling engine is configured to be in thermal communication with the heat exchanger. In some embodiments, the heat exchanger is in thermal communication with an energy converting apparatus, the energy converting apparatus selected from the group consisting of a chemical energy conversion device, a thermal energy storage device, a gas turbine, a multi-cylinder engine, a multi-piston engine, a steam turbine, a steam power tower, a fuel cell, and a water-based energy generation systems.

One embodiment provides a method for extending the use-life of a solar heat exchanger. The method can include the steps of: providing a solar concentrator; providing a heat exchanger; providing an aperture between the heat exchanger and the solar concentrator: directing a concentrated beam of the solar radiation from the solar concentrator, through the aperture; and when the temperature of the heat exchanger reaches a predetermined limit, reducing the amount of solar radiation which passes through the aperture, thereby reducing the amount of solar radiation impinging on the heat exchanger. In some embodiments, the solar concentrator is a reflective dish. In some embodiments, the step of reducing the amount of solar radiation includes misaligning the solar concentrator and the aperture.

One embodiment provides a method for reducing over-insolation of a heat exchanger. The method can include the steps of: providing a solar concentrator; providing a Stirling engine; providing a heat exchanger having a surface area, the heat exchanger being in thermal communication with the Stirling engine; providing an aperture between the heat exchanger and the solar concentrator; aligning the solar concentrator and the aperture such that a fraction of the solar radiation from the solar concentrator passes through the aperture, wherein the fraction of solar radiation impinges on a portion of the surface area of the heat exchanger; and moving the solar radiation about the surface area of the heat exchanger. In some embodiments, the method includes the step of reducing the portion of the surface area onto which concentrated solar radiation impinges when the temperature of the heat exchanger reaches a predetermined limit, thereby reducing thermal input. In some embodiments, the method includes the step of moving the concentrated solar radiation such that substantially no concentrated solar radiation impinges on the heat exchanger when a predetermined maximum temperature, power, pressure, swept volume, resistance, current, or position, is reached.

One embodiment provides a method for using an over-sized solar concentrator. The method can include the steps of: providing an over-sized solar concentrator; providing a heat exchanger; providing an aperture between the heat exchanger and the over-sized solar concentrator; during non-peak solar conditions, directing substantially all of the solar radiation from the solar concentrator through the aperture; and during peak solar conditions, reducing the amount of solar radiation which passes through the aperture and moving the solar radiation about the surface area of the heat exchanger, thereby reducing thermal input. In some embodiments, the over-sized solar concentrator is capable of producing about 3 kW$_e$ when solar insolation is about 850 W/m$^2$. In some embodiments, the over-sized concentrator is capable of producing about 10W$_e$ when solar insolation is about 100 W/m$^2$. In some embodiments, the method includes the step of providing a Stirling engine. In some embodiments, the Stirling engine is configured to be in thermal communication with the heat exchanger. In some embodiments, the over-sized solar concentrator is capable of concentrating more solar radiation than can be thermally processed by the heat exchanger or Stirling engine.

One embodiment provides an apparatus which can include: a Stirling engine; a heat exchanger in communication with the Stirling engine; a solar concentrator for concentrating solar energy onto the heat exchanger; and an aperture between the solar concentrator and the heat exchanger for controlling the amount of solar energy which reaches the heat exchanger. In some embodiments, the solar concentrator is a dish. In some embodiments, the dish has a reflective surface. In some embodiments, the apparatus includes a housing for shielding the Stirling engine from the concentrated solar energy. In some embodiments, at least a portion of the housing is configured to reduce thermal or solar absorbance. In some embodiments, a thermal spray is applied to the housing.

One embodiment provides a method for extending the use-life of a solar heat exchanger. The method can include the steps of: providing a solar concentrator; providing a heat exchanger; providing an electromagnetic radiation path between the heat exchanger and the solar concentrator; directing most of the solar radiation from the solar concentrator along the electromagnetic radiation path; and reducing the amount of solar radiation impinging on the heat exchanger in response to sensor feedback. In some embodiments, the method includes the step of reducing the rate at which the heat exchanger heats. In some embodiments, the method includes the step of moving the concentrated solar radiation about the surface area of the heat exchanger.

One embodiment provides a method for using an over-sized solar concentrator. The method can include the steps of: providing an over-sized solar concentrator; providing a heat exchanger; providing an electromagnetic radiation path between the heat exchanger and the over-sized solar concentrator; during non-peak solar conditions, directing most of the solar radiation from the solar concentrator through the electromagnetic radiation path; and during peak solar conditions, reducing the amount of solar radiation which passes through the electromagnetic radiation path and moving the solar radiation about the surface area of the heat exchanger, thereby reducing thermal input, spreading hot spots, reducing the rate at which the heat exchanger heats, and/or maintaining coolant temperature.

One embodiment provides a method for improving performance of an energy converter system. The method can include the steps of: providing a heat exchanger having a surface area for absorbing thermal energy; concentrating thermal energy on a portion of the surface area of the heat exchanger, and moving the concentrated thermal energy about the surface area of the heat exchanger, thereby reducing thermal input, spreading hot spots, reducing the rate at which the heat exchanger heats, and/or maintaining coolant temperature.

In general, various details and dimensions relating to an energy converting apparatus system are provided below. Although in one preferred embodiment the systems described below relate to a 3 kilowatt energy converting apparatus whereby solar energy is converted to electrical power, the embodiments and dimensions thereof described herein are not intended to be limiting, but are provided to be illustrative examples.

BRIEF DESCRIPTION OF THE DRAWINGS

The objects and features of the invention can be better understood with reference to the drawings described below, and the claims. The drawings are not necessarily to scale, emphasis instead generally being placed upon illustrating the principles of the invention. In the drawings, like numerals are used to indicate like parts throughout the various views. The drawings associated with the disclosure are addressed on an individual basis within the disclosure as they are introduced.

FIGS. 2C to 2F are schematic diagrams depicting receiver assemblies and components for the same, in accordance with an illustrative embodiment of the invention.

FIGS. 3A to 3J are various schematic diagrams illustrating exemplary receiver assemblies and components for the same, in accordance with an illustrative embodiment of the invention.

FIG. 4 is a schematic diagram illustrating a system, in accordance with an illustrative embodiment of the invention.

FIGS. 5A and 5B are schematic diagrams depicting a system in a stow position, in accordance with an illustrative embodiment of the invention.

FIG. 8 is a schematic diagram illustrating an alignment tool, in accordance with an illustrative embodiment of the invention.

FIGS. 9A to 9F are schematic diagrams illustrating exemplary chassis components, in accordance with an illustrative embodiment of the invention.

FIG. 10 is a schematic diagram illustrating a drive unit, in accordance with an illustrative embodiment of the invention.

FIGS. 11A to 11D are schematic diagrams illustrating a panel segment, in accordance with an illustrative embodiment of the invention.

FIGS. 12A to 12B are schematic diagrams illustrating a collector dish and collector dish assembly, respectively, in accordance with an illustrative embodiment of the invention.

FIG. 14 is a schematic diagram illustrating the underside of a panel segment, in accordance with an illustrative embodiment of the invention.

FIG. 16 is a schematic diagram illustrating a panel arm attached to a panel segment, in accordance with an illustrative embodiment of the invention.

FIGS. 17A to 17C are schematic diagrams illustrating solar energy passing through a receiver assembly and impinging on a heater head, in accordance with an illustrative embodiment of the invention.

FIG. 18A is a schematic diagram of a circular mounting ring, flexure springs, a heater head and other components of an energy converting apparatus, in accordance with an illustrative embodiment of the invention.

FIG. 18B is a schematic diagram of a flexure spring used to reduce engine vibrations, in accordance with an illustrative embodiment of the invention.

FIGS. 18C to 18D are schematic diagrams of a ring frame, in accordance with an illustrative embodiment of the invention.

FIGS. 19A to 19C are schematic diagrams depicting a frame and apparatus assembly, in accordance with an illustrative embodiment of the invention.

FIGS. 21A to 21C are schematic diagrams depicting a top view, a bottom view, and a cross-sectional view of an assembled heater head, in accordance with an illustrative embodiment of the invention.

FIG. 23 is a schematic diagram depicting a channel plate, in accordance with an illustrative embodiment of the invention.

FIG. 24 is a schematic diagram depicting a flow distributor plate, in accordance with an illustrative embodiment of the invention.

DETAILED DESCRIPTION

Figure 1A:
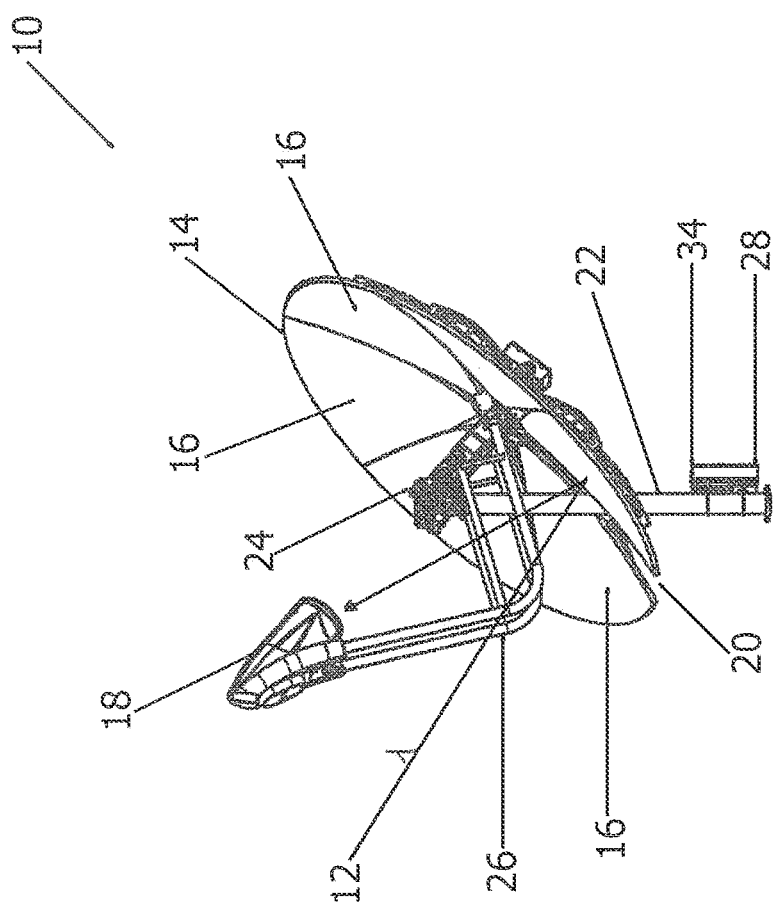
FIGS. 1A and 1B are schematic diagrams illustrating a system for converting solar energy into electricity, mechanical work, thermal energy, or chemical energy, in accordance with an illustrative embodiment of the invention.

The following description refers to the accompanying drawings that illustrate certain embodiments of the present invention. Other embodiments are possible and modifications may be made to the embodiments without departing from the spirit and scope of the invention. Therefore, the following detailed description is not meant to limit the present invention, rather the scope of the present invention is defined by the claims.

The use of sections or headings in the application is not meant to limit the invention each section and heading can apply to any aspect, embodiment, or feature of the invention.

It should be understood that the order of the steps of the methods of the invention is immaterial so long as the invention remains operable. Moreover, two or more steps may be conducted simultaneously or in a different order than recited herein unless otherwise specified.

Where a range or list of values is provided, each intervening value between the upper and lower limits of that range or list of values is individually contemplated and is encompassed within the invention as if each value were specifically enumerated herein. In addition, smaller ranges between and including the upper and lower limits of a given range are contemplated and encompassed within the invention. The listing of exemplary values or ranges is not a disclaimer of other values or ranges between and including the upper and lower limits of a given range.

It should be understood that the terms "a," "an," and "the" mean "one or more," unless expressly specified otherwise.

The foregoing, and other features and advantages of the invention, as well as the invention itself, will be more fully understood from the description, drawings, and claims.

The aspects and embodiments of the invention disclosed herein relate to energy converting apparatuses such as Stirling machines or engines and their constituent components and methods of operation. Without being limited to a particular theory or mechanism, in some embodiments the Stirling engine and related system components use a working fluid (typically air, Helium, Nitrogen or Hydrogen gas) in a closed cylinder containing a piston. As part of its operation, the expansion (heating) and contraction (cooling) of the gas drives the piston back and forth in the cylinder. The work performed by this piston-motion is used to drive a generator (such as linear alternator) and produce electricity or to create pressure waves to drive a compression process. In one embodiment, a plurality of free pistons is used.

In way of further detail, the arrangement of moving masses used in one embodiment of the energy converting apparatus includes an engine case or housing, a mover, which includes a power generating piston, a displacer (which can include a mass used to displace the working fluid), and a passive balancer. All of these various elements are coupled together either directly or indirectly and vibrate and move to varying degrees. A ring frame that includes a support and ring portion through which the engine housing is suspended along its longitudinal axis, an axis parallel to the longitudinal axis or an axis equivalent thereto, is described in more detail below.

In some embodiments, the Stirling machines and related technologies are configured to collect solar energy and convert it to electricity or useful work as part of an energy converting apparatus. Since the Stirling engines described herein use a closed system containing a fluid, electrical subsystems, cooling subsystems, and other elements that are subjected to significant heating, different embodiments of the invention relating to heat exchangers and over insolation control are beneficial to the device operation. "Insolation" is a measure of solar radiation energy received on a given surface area in a given time. Accordingly, "over-insolation" is an excess of solar radiation energy (i.e., more solar radiation than the system can thermally process) received on a given surface area in a given time.

Figure 1B:
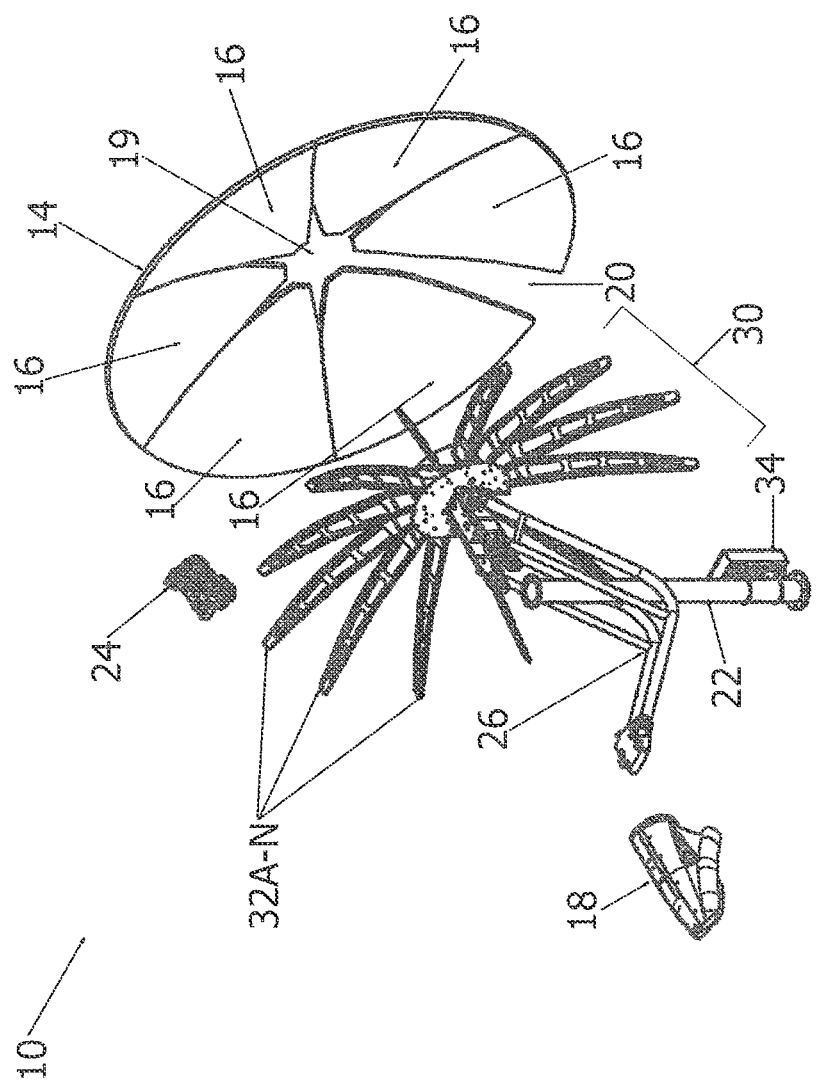

As discussed in more detail below, heat exchangers and over insolation control methods are used to dissipate and otherwise direct the received solar energy to prevent damage to the overall system. In addition, since the energy converting portion of the system includes one or more vibrating free pistons or Stirling engines and a moveable solar energy receiver portion mounted in, an elevated position, controlling vibrations is another feature of the invention. The description that follows provides specific details relating to various energy converting apparatus and components that address these problems and others. Before considering these details, exemplary systems embodiment suitable for converting solar energy into electricity or mechanical work are shown in FIGS. 1A and 1B. Although solar energy, sunlight, thermal energy, and other terms are used throughout, they are not intended to limit the embodiments herein. In general, the invention relates to systems, subsystems, methods, devices, apparatuses, and components, which cooperate to convert or transform one form of energy to another while using the various methods and apparatus described herein.

It will be appreciated that the apparatus described herein and its many components can be sized and scaled according to the desired size of the energy converting apparatus. Thus, while references may be made to the size of the apparatus and/or its individual components, such references are for illustrative purposes only and the sizing or scaling of the apparatus and its components can be altered without departing in any way from the scope and spirit of the invention.

Energy Converting Apparatus and System Overview

As shown in FIGS. 1A and 1B, an embodiment 10 for collecting and converting solar energy is shown. Solar energy from the sun 12 ($\lambda$) impinges upon a collector 14 (alternatively a dish, array of panels, reflector, or concentrator). In one embodiment for use with solar energy collecting, the collector is a mirror or other reflective surface disposed on each panel. As shown, a plurality of substantially identical concentrator panels (reflecting elements) 16 encircle a common center to form a curved surface capable of directing light to the energy converting apparatus 18 (ECA). Each panel has a plurality of edges. A groove or slot 20 can be incorporated in some embodiments of the concentrator to facilitate changing the angle of the concentrator relative to a supporting post or pier 22. Energy collected is redirected to the ECA 18 as shown. The concentrator 14 and energy converting apparatus 18 are designed to slew with the sun by using the drive unit 24. In one embodiment, a biaxial drive unit is used. A boom 26 connects the energy converting apparatus with the concentrator. The boom 26 is configured to accommodate the pier 22 as the concentrator 14 is articulated about its rotational axis.

In other embodiments, the same shaped collector can be utilized to concentrate other forms of energy, for example radio or microwave transmissions. Such collectors or dishes are frequently used to collect transmissions from geostationary or orbiting satellites. In such cases, the surface of the concentrator panels is made of a material which reflects the energy waves of interest. In one embodiment, the surface is made of a metallic mesh to reflect microwaves. In one embodiment, the diameter of the collector or dish ranges from about 4.7 m to about 6 m. In another embodiment, the collector or dish is between about 1 m and about 50 m in diameter. As discussed in more detail below, in one embodiment, the collector or concentrator includes a plurality of components that each have a flat or low profile such that the components have an optimized packing density and a size/shape profile that are amenable to conventional shipping on transport. Thus, as shown in FIGS. 7, 9, 11, 14 and others, the components of the chassis and/or collector can be sent in one or more conventional boxes, such as a flat box, and rapidly assembled in the field to quickly install an energy converting apparatus and collector system. The use of flat elements to build the chassis which receives the panels is one feature of the invention.

As shown, in FIGS. 1A and 1B, a biaxial drive unit (or drive) 24 is configured to move the concentrator 14 and the energy converting apparatus 18, in accordance with one embodiment. The concentrator and the energy converting apparatus can rotate through a full 360 degrees. In addition, for compass direction (azimuth), elevation can be adjusted up to about 162 degrees. In addition, the concentrator can be parallel to the ground while facing skyward or slant towards the ground during a non-operative or stow mode. Since the systems shown in FIGS. 1A and 1B are typically used for electricity generation, an electronics package 34 or an AC power output 28 are present in some embodiments.

As shown in FIG. 1B, a boom 26 is operatively coupled by a weld or other fastener to a chassis 30, which includes a plurality of elongate radial projections, elongate members, structural members, panel arms, or ribs 32a-n. These members are flat or narrow along one dimension to facilitate flat packing and shipment. In some embodiments, the panel arms 32 are about 2 m long, about 0.25 m high, and about 0.035 m wide. The concentrator panels 16 are affixed to the panel arms 32. In one embodiment, the concentrator panels 16 possess a substantially identical geometry. This offers advantages when assembling the concentrator to direct incident solar energy into the energy converting apparatus. When assembled, a star-shaped hole 19 is formed in one embodiment. As shown in FIG. 1B, the groove or slot 20 in the concentrator is sized relative to the diameter of the pier or post 22 to allow for the concentrator 14 to move through a wide range of motion. Thus, one embodiment of the invention relates to a concentrator that includes a plurality of substantially identical panels, such that when combined, the plurality of panels form a three-dimensional surface with a slot that is sized to accommodate clearance to the pier for given a range of motion of the concentrator. In one embodiment, each panel has two pairs of edges, each pair of edges radially oriented to a different pair of nonconcentric circles.

The energy converting apparatus (alternatively referred to in one embodiment as a heat drive or Stirling machine/engine) includes a free piston Stirling engine and various cooling, sensing, heat exchanging, vibration balance, and other subsystems. The energy converting apparatus receives the solar energy and produces useful work or electricity as well as waste heat. The pier or post supports the collector, biaxial drive, and energy converting apparatus. The pier and a portion of the drive assembly that is collinear with one rotational axis of the biaxial drive are also hollow in one embodiment to facilitate the routing of wire or cables. In other embodiments, the energy converting apparatus include solar photovoltaic converters or radio and microwave detectors. The use of a biaxial drive also facilitates advantageous routing of power or fluid delivery cabling. Specifically, the use of an offset drive mechanism allows cabling to be centrally routed through the post or pier used to support the energy converting apparatus.

Figure 1C:
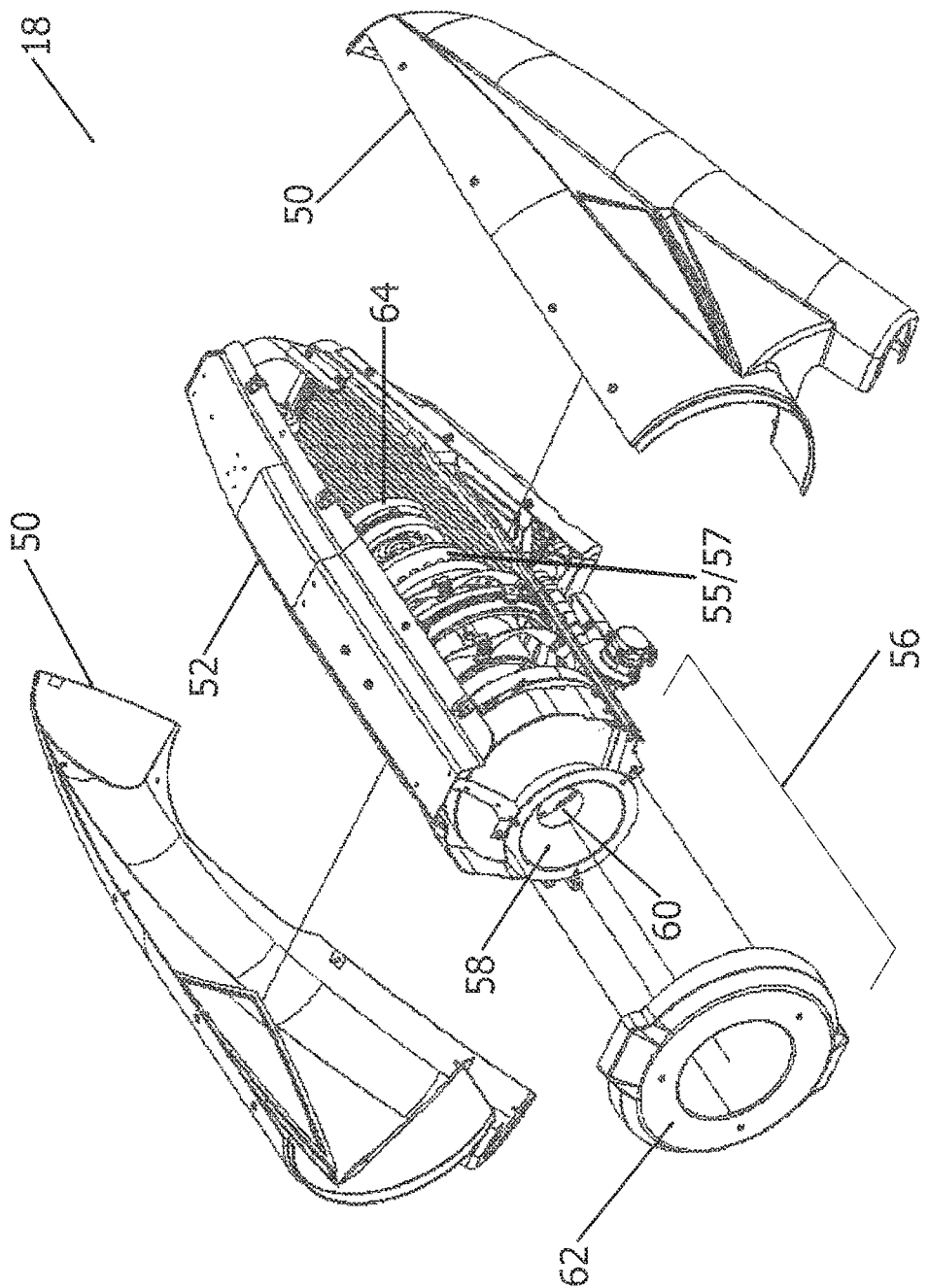
FIG. 1C is a schematic diagram illustrating an energy converting apparatus, in accordance with an illustrative embodiment of the invention.

In FIG. 1C, the outer skin, housing or cover 50 of the energy converting apparatus 18 is shown. As part of the operation of the device, the cover 50 is designed to satisfy certain conditions. Specifically, the cover must not burn or melt and it also must hold up to snow, ice, rain and hail or any other foreseeable weather event. In order to achieve some of these objectives, in one embodiment the cover is made from a sheet molding compound (SMC). Other suitable materials for the cover include, for example, steel, aluminum, plastic, and/or fiberglass.

Figure 1E:
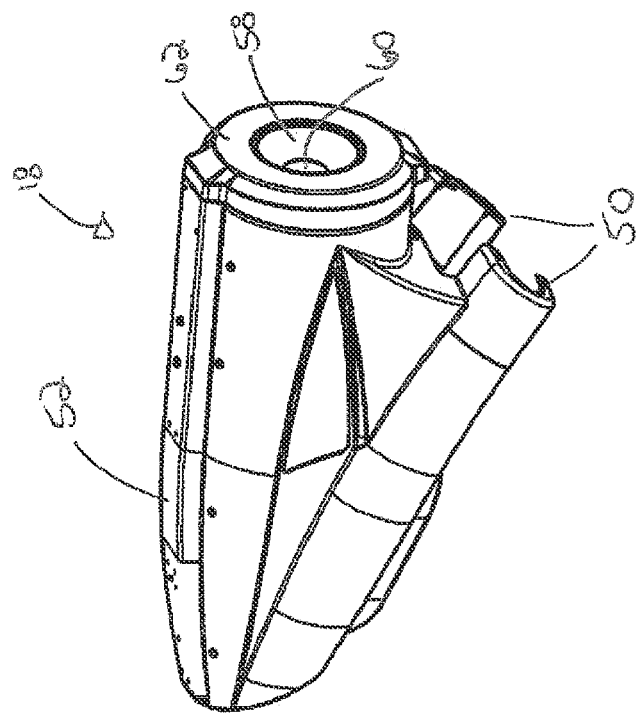
FIG. 1E is a diagram of an assembled energy converting apparatus, in accordance with an illustrative embodiment of the invention.
Figure 1D:
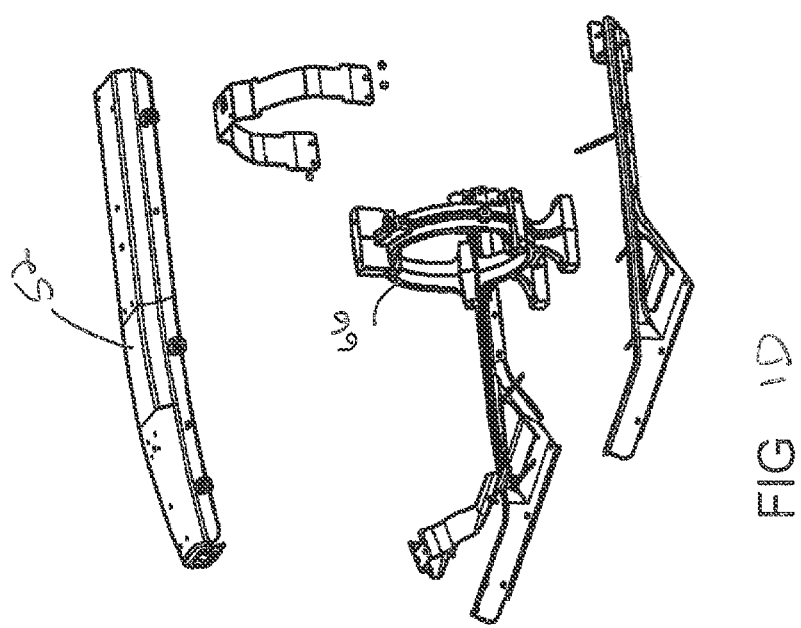
FIG. 1D is a schematic diagram of a frame with a top slew plate (heat shield), in accordance with an illustrative embodiment of the invention.

Further, with respect to FIGS. 1C and 1D, the connection of the outer cover 50 with the frame represents another design feature of the energy converting apparatus. As shown, the two cover portions connect relative to the top spar or slewplate 52 of the frame such that the top spar of the frame forms the central spine of the top of cover. This design of the frame allows the top spar of the frame to shield the internal Stirling engine portion and receiver components of the energy converting apparatus 18. If a plastic or other covering were used, instead of using a portion of the frame as a heat shield, the plastic could melt or catch fire, thereby resulting in damage to the energy converting apparatus. This melting would occur during the process where the device articulates with the sun. Thus, a beam of concentrated light moving along the spar 52 is prevented from damaging engine components by the additional shielding of the spar.

Thus, in part, one embodiment of the invention relates to using a component of the frame to provide heat shielding, such as by a slew plate on the top of the energy converting apparatus, with respect to the engine or receiver portion. Although the top portion of the frame is used as a radiation shield, another part of the frame could be used as a shield in other embodiments. Thus, a heat shield formed from a frame portion can be used on the top, side, or bottom or any portion of the energy converting apparatus.

As shown in FIGS. 1D-E, the heat shield or slew plate 52 also can be used for the frame. Another approach is to use a separate plate on the top of the engine housing in addition to a separate frame system. However, this is inefficient and adds weight to the apparatus. As shown, the slew plate 52 portion of the frame acts to protect the engine and other components from the intense beam of sunlight, which in some embodiments passes over (under or to the side) the engine housing when tracking on sun or off sun. This design embodiment combines the slew cone 58 having aperture 60, the faceplate 62, and the engine housing frame into one piece. The frame and slew cone 58 and faceplate 62 act as a combination heat protection system when the beam is moved in and out of the aperture 60.

Figure 2A:
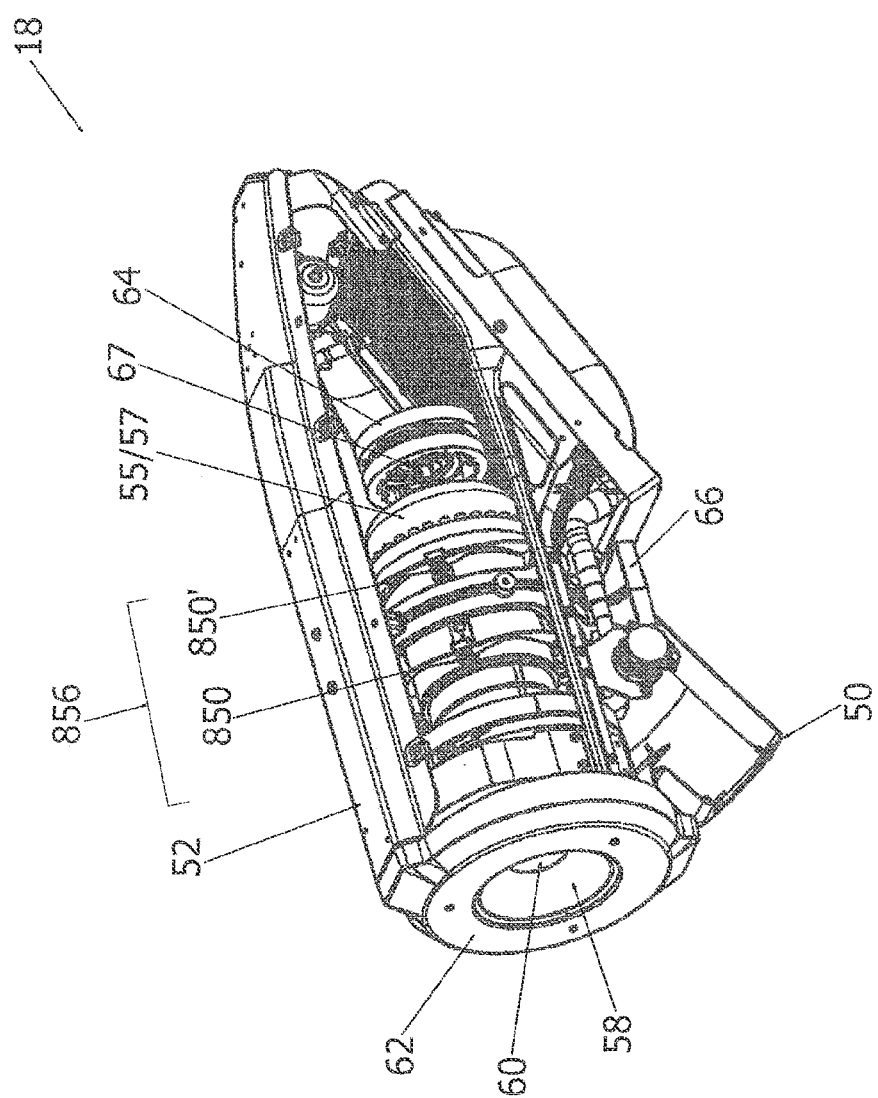
FIGS. 2A and 2B are interior views of energy converting apparatuses, FIG. 2B showing an interior view of the engine and related components, in accordance with an illustrative embodiment of the invention.
Figure 2B:
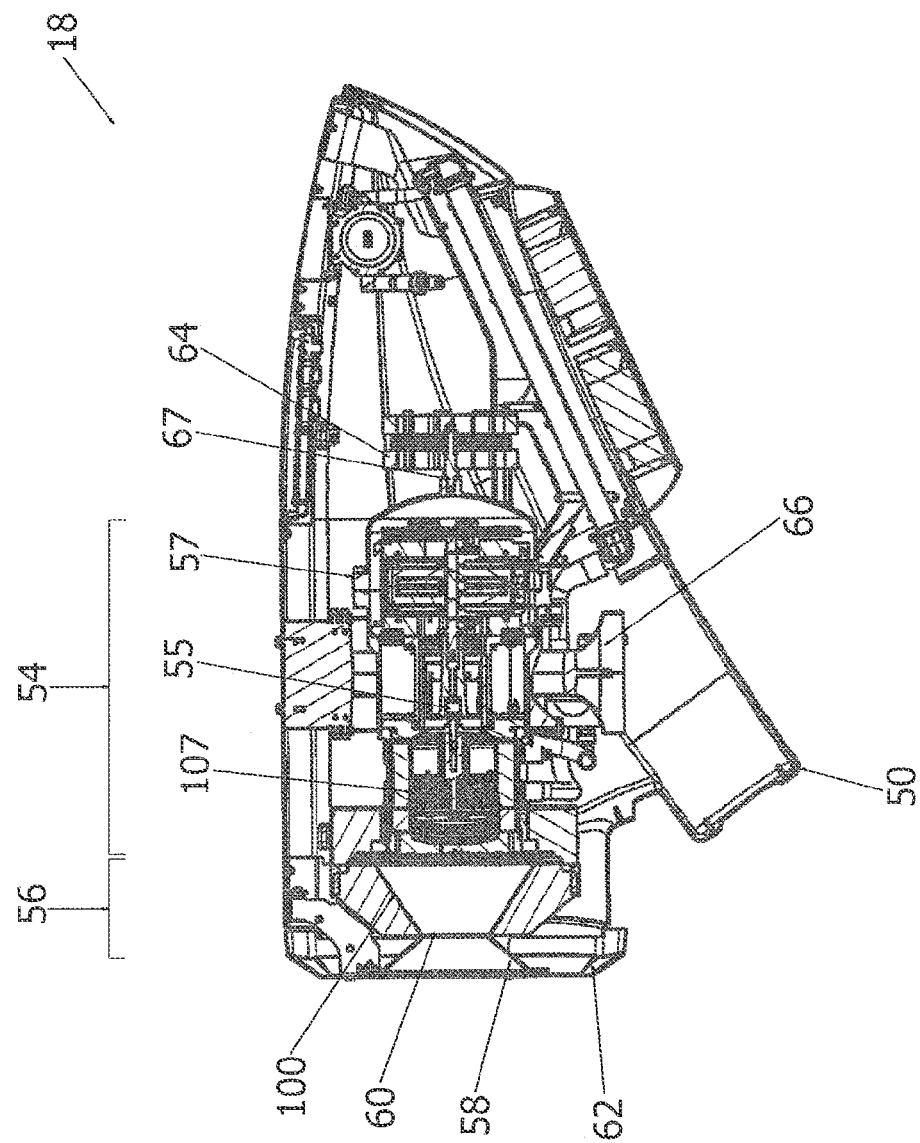
Figure 2C:
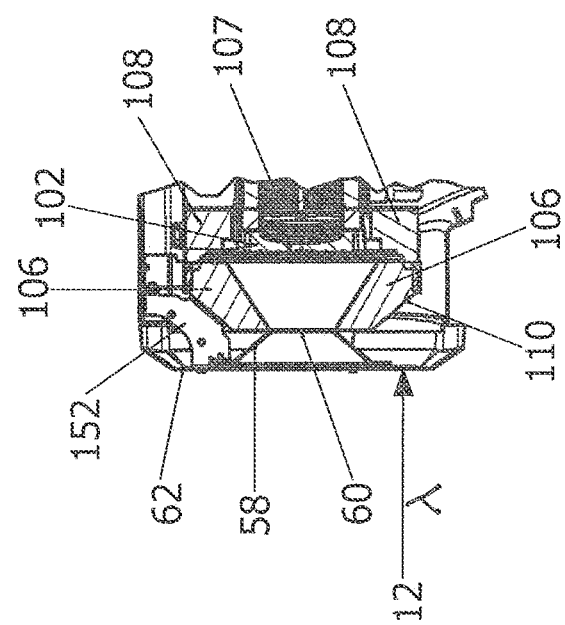

Since managing heat within the various energy converting apparatus embodiments is important to viable device operation, it useful to consider the embodiments shown in FIGS. 2A, 2B, and 2C. From these views of the energy converting apparatus 18, it is significant that the overall apparatus is divided into a receiver portion 56 and a Stirling engine portion 54. Referring to FIG. 2C, in one embodiment, the receiver portion 56 includes the faceplate 62, the slew cone 58, the receiver cone 100, and associated components. Referring to FIG. 2B, in one embodiment, the engine portion 54 includes the heater head 102, engine 55, and engine housing 57, and associated components. In one embodiment, such as that shown in FIG. 2B, the energy converting apparatus 18 includes a receiver assembly 56, onto which light impinges, and an engine portion 54. The engine housing 57 is also shown, and may include several components that form an outer pressure boundary of the Stirling engine 55. In one embodiment, the energy converter is a free piston Stirling engine having an alternator, which generates electricity as the free piston oscillates. In one embodiment, optional fans help to reduce and/or vent excess heat in the energy converter 18.

As shown in FIG. 2C, in some embodiments solar radiation 12 from the collector is initially incident on the face plate 62 or slew cone 58 as the overall system clews to track the sun. During normal operation, solar radiation is directed to a focal point at or near the aperture 60, after which the beam of radiation expands through the receiver cone 100 to impinge on a heater plate 102, which is discussed in more detail below. In one embodiment, such as that shown in FIG. 2F, one or more over-insolation sensors 115 can be used to generate data or detect temperature changes based on excessive solar energy incident upon the ECA, and such that movement of the drive assembly can be triggered to prevent over-insolation.

In general, thermally decoupling the engine assembly and the receiver assembly is one aspect of the invention. In some embodiments, thermal isolation is achieved using a bellows seal or an accordion seal 150, such as that shown in FIGS. 3H-J. As will be appreciated, any seal configuration can be used which results in thermal isolation. In one embodiment, a silica fabric can be used to form a bellows seal between the receiver assembly and the engine assembly. However, the embodiments of the invention are not limited to silica fabric, and any material suitable for shaping into a bellows seal can be used in various embodiments subject to other system parameters.

A related aspect of the invention is isolating the vibrations of the receiver from the vibrations of the Stirling engine. The use of a bellows seal allows the seal to flex and resist tearing during operation. As a result, the bellows seal helps isolate the respective vibrations from the receiver assembly and engine assembly. With that as background, specific details relating to the receiver assembly and its components elements are discussed below.

As shown in FIGS. 3A and 3B, the outer portion of the receiver assembly includes a faceplate 62. The receiver face plate protects the rest of the components from solar energy spilling or otherwise impinging on them from imperfect mirrors, auto-commissioning, over-insolation control, failed sensors and other events. The faceplate 62 also protects the other components when the dish moves the beam of concentrated solar energy into the aperture or out of the aperture.

In addition, the faceplate 62 absorbs and stores the energy before it is emitted by radiation, reflection, conduction, or convection to air or other materials. The receiver faceplate 62 is designed to be easily replaceable in the field in case it becomes damaged from concentrated solar energy. In one embodiment, the faceplate 62 is made out of metal to be impact resistant. In contrast with a ceramic design which could break due to hail or thermal cycling, the faceplate offers many advantages. The faceplate 62 can include a ceramic coating or other suitable thermal treatment to reduce solar energy absorbance.

As shown in FIGS. 2D, 3A and 3C, a receiver slew cone 58 is used in various embodiments. The slew cone 58 is used to protect the thin receiver foil 110, 111, the receiver cone 100, and other components from concentrated solar energy. It also functions to absorb and store energy during different phases of operating the concentrator and energy converting apparatus. Sensors 114 are used to determine how much energy is spilling or impinging upon the slew cone (or other surfaces of the apparatus) (FIG. 3C). Thus, the relevant sensors 114 collect sensor data, such as temperature data. This sensor data can be used to increase the amount of energy entering the receiver, and thus increase system performance. In one embodiment, the diameter of the slew cone ranges from about 24 mm to about 280 mm. Similarly, the diameter of the aperture ranges from about 80 mm to about 120 mm. In a preferred embodiment, the aperture is about 95 mm+/−0.5 mm.

Alternatively, this sensor data can be relayed to the drive unit to cause light from the concentrator to be distributed around the heater plate 102 to reduce the likelihood of overheating the engine or other components of the energy converting apparatus. The sensors 114 used to collect sensor data can be selected from all sensors that can fit within the energy converting apparatus. As an example, suitable sensors can include, but are not limited to, temperature sensors, thermocouples, displacement sensors, accelerometers, radiation sensors, light sensors, or any other sensor.

The slew cone 58 of FIGS. 3C and 3D, and its other, embodiments, is designed to be easily replaceable in the field, in case a temperature sensor fails and the slew cone becomes damaged. As shown in FIG. 3D, the angle 59 of the receiver slew cone also allows for more energy to reflect from the slew cone and into the receiver, though other angles are possible. The slew cone angle 59 can range from about 0 to about 80 degrees. In a preferred embodiment, the slew cone angle 59 is between about 38 to about 41 degrees. In turn, this increases the performance of the energy converting apparatus. In one embodiment, a surface of one or more of the receiver assembly components (e.g., the faceplate, slew cone, receiver cone) is coated with a thermal barrier coating (TBC) or thermal spray (e.g., plasma, flame, cold, electric arc, or HVOF spray). TBC is a metal, ceramic, or cement coating that helps reduce the temperature of a component by reflecting energy from it, and by means of a temperature drop due to conduction across the coating. In one embodiment, a TBC coating is used. However, in other embodiments a TBC coating is not used.

The receiver assembly can also include one or more sensors 114 in various embodiments to collect data that in turn can be used to enhance device operation or to safeguard the energy converting apparatus or its component elements. In one embodiment, temperature sensors are incorporated in the receiver assembly. In one embodiment, such as that shown in FIG. 3C, these sensors are located on the backside (not incident with solar energy) of the faceplate 62 and slew cone 58 to protect them from concentrated solar energy and some environmental elements.

In general, to date, receivers have only been of certain types, such as direct illumination receivers (DIR), reflux, or heat pipe receivers. As depicted in the figures, the receiver assembly embodiments described herein do not use a bank of tubes to transfer energy to the engine like DIR's, and are dissimilar to the other receiver designs mentioned above. The material selection and properties of the receiver assembly embodiments and their constituent parts offer many advantages, one of which is that they are more economical than other designs. The novel receiver design is also complimentary with the Stirling engine's linear arrangement of masses and geometric details.

In one embodiment, as shown in FIG. 3E, the receiver cone 100 is made of metal. Further, the receiver cone lip 101, which is positioned near the aperture 60, aides in preventing the receiver foil 110 from being damaged by incoming solar flux. In one embodiment, the receiver cone 100 is designed to oxidize when concentrated solar energy enters the receiver to improve the receiver performance with a dark surface. The receiver cone 100 is made out of metal to be impact resistant and less costly to manufacture. In one embodiment, the outer receiver cone diameter ranges from about 260 mm to about 280 mm. In one embodiment, the inner receiver cone diameter ranges from about 95 mm to about 105 mm.

Figure 2E:
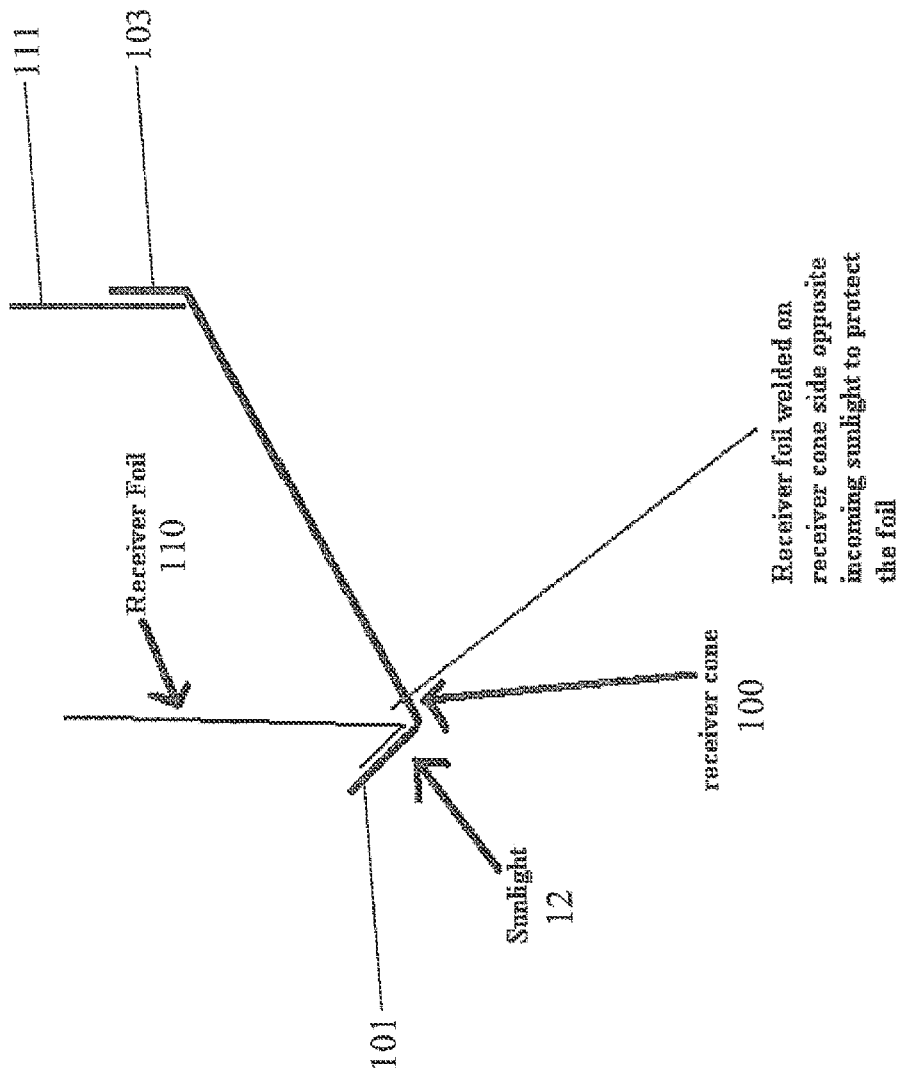
Figure 2F:
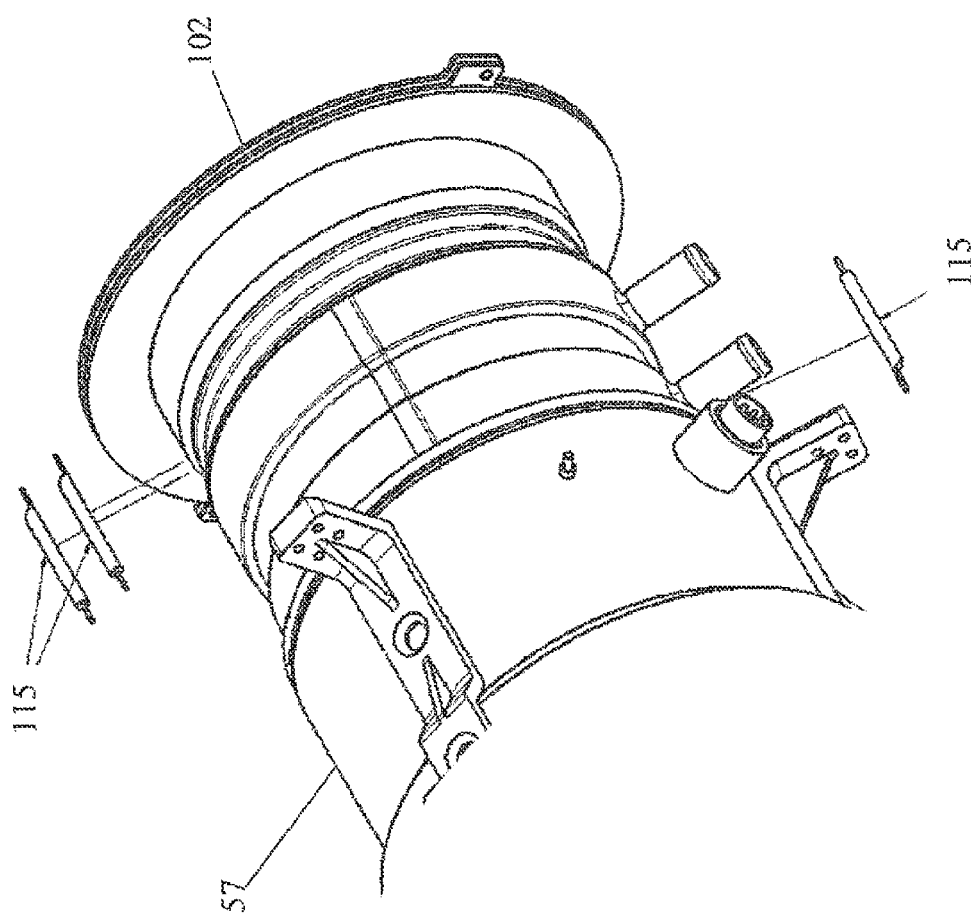
Figure 36:
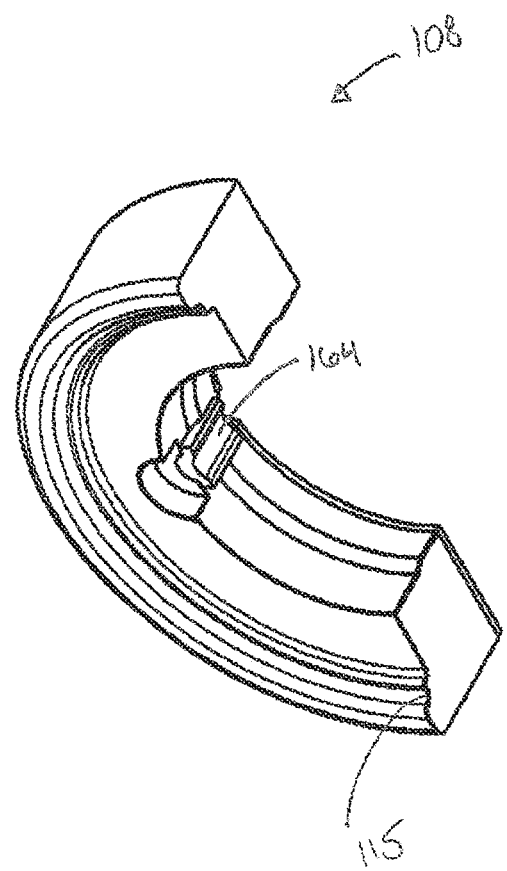

As shown, in FIGS. 2C, 2D, and 2E, there is a single piece of insulation 106 encapsulated between the receiver cone 100 and the receiver foil 110, 111 in one embodiment. Multiple insulation portions can be used in other embodiments. Typically, the insulation 106 is a porous material, such as a silica material. In some embodiments, more than one unitary piece of insulation can be used. In one embodiment, the receiver foil 110 is welded to the thicker receiver cone 100 to encapsulate the insulation 106 to form a receiver pack 100'. In one embodiment, there are two receiver foils 110 and III. Receiver foil 110 is welded to lip 101 and to receiver foil 111, and receiver foil 111 is welded to lip 103.

Further, the receiver pack 100' forms a curve 113 configured to receive a complementary curve 115 formed in the engine insulation 108, thereby forming a seal which prevents hot, buoyant air from escaping the receiver through natural convection. Welding the receiver foil 110 to the lip 101, on the side of the receiver cone 100 which opposes the incident light, helps improve the receiver reliability. This follows because the foil is welded to the receiver cone on the side opposite of incoming sunlight 12 since the thicker receiver cone can handle the greater solar flux (FIG. 2E, showing a partial blowup of FIG. 2D).

As shown in FIG. 3E, there are several receiver support brackets 152. The receiver support brackets allow the receiver assembly to be decoupled from the engine since the receiver assembly is attached to the spars, which constitute part of the frame. Receivers from other companies have failed at times due to the receiver vibrating too much while attached to the engine. PEM® nuts are added to the receiver brackets to allow for more rapid assembly and servicing.

With respect to FIG. 3F, an energy balance for the receiver can be written by either of the two equations:

$$Q9 = Q1 + Q2 + Q4°Q8$$

$$Q7 = Q4 - Q3 - Q5 - Q6$$

Q1: Reflected power from the concentrator incident on the faceplate

Q2: Reflected power from the concentrator incident on the slew cone

Q3: Radiation emitted and reflected from the receiver out of the receiver

Q4: Total power intercepted by the receiver from the concentrator

Q5: Total power from convection leaving the receiver

Q6: Conduction through the receiver insulation before convection and radiation off of the receiver foil Q7: Useful power entering the engine Q8: Total power reflected from the concentrator which does not impinge upon the slew cone or faceplate, or enters the receiver Q9: Total power reflected from the concentrator As shown in FIGS. 3H and J, the engine insulation 108 uses a metal foil 109 that encapsulates the engine insulation 108 and the insulation seal 150. In one embodiment, the seal 150 is attached to the foil 109 with high temperature silicone. Clamp 112 clamps over the metal foil 109, which covers the outer surface of the seal 150 and the engine insulation 108. The insulation 108 is beneficial because it helps reduce thermal losses from the engine, allowing the engine to operate more efficiently. The metal foil 109 helps to give the insulation seal 150 rigid support, in addition to reducing convection should the insulation seal 150 begin to fail. As shown in FIG. 3G, a groove or curve 115 in the engine insulation 108 that helps reduce convection and thermal losses in the receiver is also illustrated. In addition, a groove 164 along the engine-facing surface enables temperature sensors or other sensors to be attached to the engine to monitor temperature to help reduce convection and thermal loses in the receiver.

An exemplary bellow insulation seal 150 for decoupling, both thermally and vibrationally, the receiver assembly from the engine assembly is shown in FIG. 3J. The insulation seal 150 allows the receiver to be decoupled from the engine while sealing the receiver from convection. It is attached on the engine insulation 108 and receiver insulation packs 100'. It is formed from flexible material to accommodate and reduce transmission of vibration from the engine and engine housing.

Collector or Dish Assembly, Stow Position, Panel Geometry and Optical Features

Referring to FIG. 4, the structural unit 10 generally includes a mechanical/structural portion 204 and a receiver or generator portion, such as a Stirling engine/generation portion 18. The mechanical/structural portion 204 includes a collector portion 208 including segments or panels 16 supported by panel arms 32 (elongate member or ribs). In one embodiment, the segments or concentrator have a reflective coating (such as tiles) or are mirrored, and the panels 16 collectively form a solar collector 208, which concentrates and focuses light toward the Stirling engine/generation portion 18. A boom assembly 26 includes two boom arms 228, 228', an engine platform 232, and a chassis anchor 260. The chassis anchor 260 is mounted on a drive assembly 24, which is in turn mounted on a pier 22 which anchors the system 204 to the earth. The pier 22 also supports the system's electronics package 34. In one embodiment, the pier is about 3 m long, and about 0.2 m in diameter.

Two segments 252 and 252' do not touch one another and so form an opening or slot 20, which permits the solar collector 208 to move around pier 22. In addition, in one embodiment, the two boom arms 228, 228' are spaced apart sufficiently to allow the solar collector 208 to point downward when in the stowed position. The collector 208 points about 160 degrees from vertical when in the stowed position.

Referring to FIGS. 5A and 5B, in the stowed position the Stirling engine/generation portion 18 is brought near the ground and the two boom arms 228, 228' pass around the pier 22. This permits the collector 208 not to collect dust and debris or be damaged either when not in use or when faced with the possibility of excessive wind load. In one embodiment, a lock (discussed below) near the base of the pier 22, engages the engine platform 232 and holds the assembly stably in excessive wind conditions.

Figure 7M:
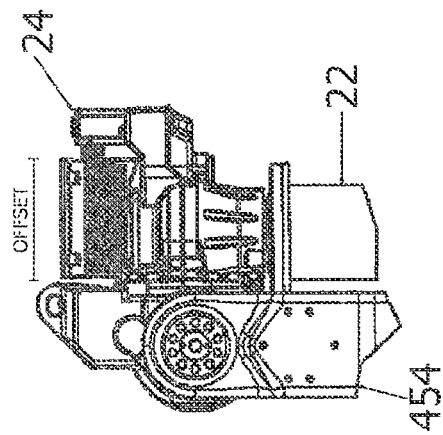
FIGS. 7A to 7N are schematic diagrams illustrating an exemplary boom, chassis, and components for the same, in accordance with an illustrative embodiment of the invention.

In more detail and referring to FIG. 7H, the panel arms 32 are attached to a hub 256, which is in turn attached to the chassis anchor 260. In one embodiment, the hub 256 includes two substantially planar mating surfaces that define a plurality of holes sized to receive pins located on the elongate members 32. The boom arms 228, 228' are also attached to the chassis anchor 260. Additional struts 274, 274' are spaced about the pier 22 and attached to the chassis anchor 260. The struts 274, 274' help support the boom arms 228, 228'. In one embodiment, the chassis is the collection of elements to which the panels attach and receive structural support.

Referring also to FIGS. 7A-1, the engine platform 232 (FIGS. 7B and 7I) is attached to the boom arms 228, 228' by U-brackets 300 (FIG. 7C). The engine platform 232 (FIG. 7B) is offset from the centerline of the collector portion 208 so that when the Stirling engine/generation portion 18 is positioned on the engine platform 232, the focal axis of the collector portion 208 is coincident with the longitudinal axis of the Stirling engine/generation portion 18. The set of panel arms 32 (FIG. 7F) are attached to the hub 256 to form the convex shape of the collector chassis 208. The chassis anchor 260 is attached to the hub 256 concentric with the hub's 256 center. The hub 256 (FIG. 7J) is constructed from two circular plates 258, 258'. The plates 258, 258' include a cut-out 259 into which the chassis anchor 260 is mounted. The plates 258, 258' are separated from each other by the panel arms 32 (FIG. 7N).

Figure 7K:
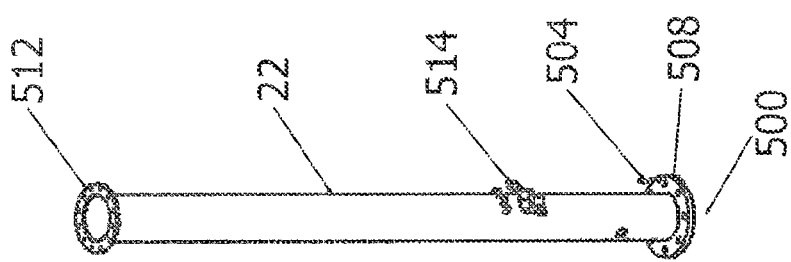
Figure 7J:
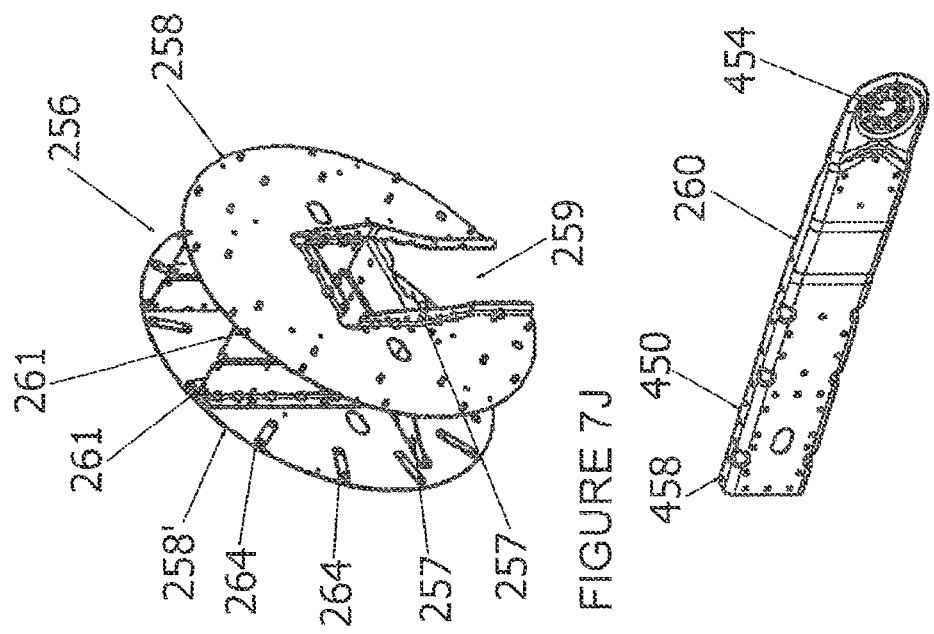
Figure 7L:
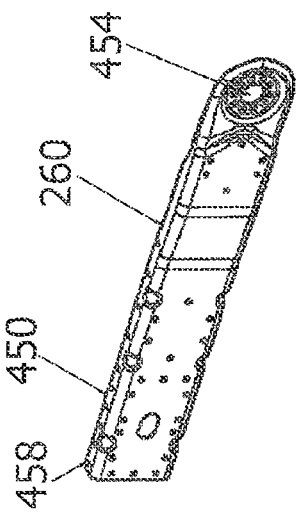
Figure 7N:
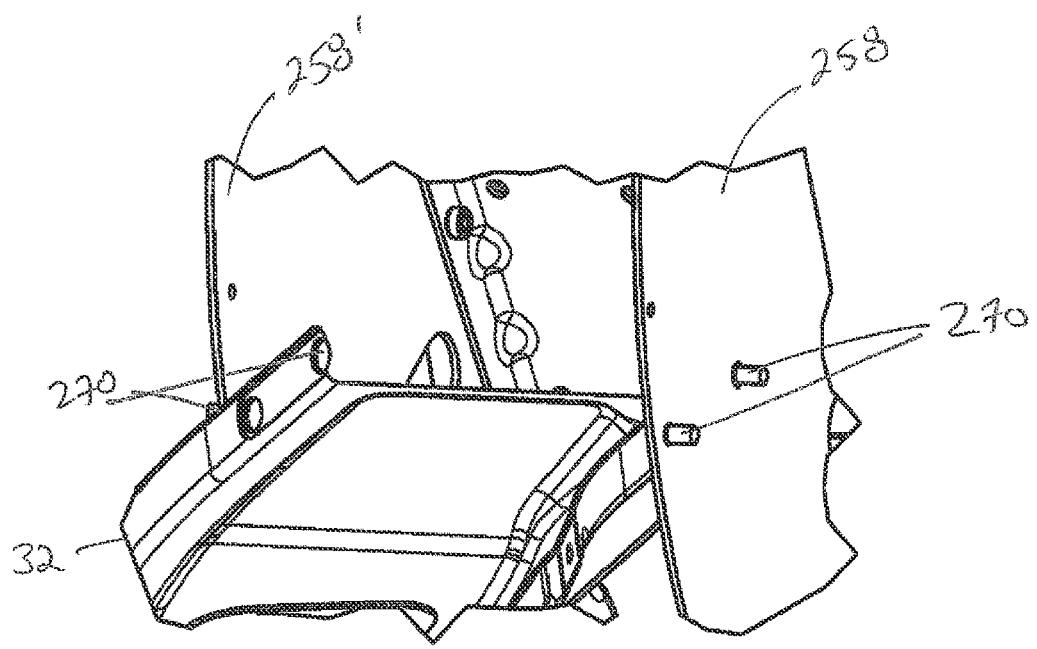

Referring to FIG. 7N, attaching the panel arms 32 to the hub 256 are shoulder bolts 270, which control the lay of the hub plates 258, 258' to a high level of precision. Although reference is made to various bolts throughout, for all of the embodiments described herein, any suitable fastener element can be used. Suitable fasteners include, but are not limited to bolts, screws, rivets, welds, adhesives, and other mechanical, electrical or chemical elements suitable for connecting, attaching, coupling, linking or fusing two objects. The assembly of the hub 256 with the panel arms 32 provides an alignment base to which the panel arms 32 can be quickly and easily attached without requiring additional alignment when the panel segments 16 are attached.

Such a configuration makes it possible to assemble an array of these systems without additional alignments being required. Each hub is a mating surface. The hub is substantially circular with a diameter of about 1 m and a thickness of about 4 mm. A pair of these hub plates 258 (FIG. 9B) sandwich the panel arms between themselves. This results in parallel mating surfaces with radially oriented elongate members. This arrangement of hub plates and elongate members or ribs includes a chassis upon which panels may be disposed, aligned and supported.

With respect to the elongate members (or ribs) described herein, the plurality of structural elongate members radiate out between to common mating surfaces (hub plates). As a result, any surface waviness or other defect on the two common mating surfaces is thereby cancelled out because none of the structural members share parallel paths. In addition, in embodiments relating to the chassis that supports the concentrator panels, upper and lower mating surfaces are forced to be perpendicular to the central axis of the assembly by pinning each structural elongate member (or rib), which radiates outward from both mating planes.

In part, as described herein, one embodiment relates to a method of assembly that through the arrangement and means of attachment of components, coupled with consistent part geometry (minimal part to part variation), results in a quickly constructible chassis and concentrator with negligible deviation from nominal (ideal) on mating surfaces for the solar concentrator. Previous concentrators have relied upon a three point attachment for each panel of the concentrator so as to allow for "tuning" by trained technicians to dial in concentrator optical pointing accuracy. The described embodiment chassis requires no such "tuning", and therefore can be assembled by untrained individuals with a basic construction skill set. With respect to the concentrator and supporting chassis of ribs and hub plates, no tuning is needed. As used in this context, no tuning is defined as an assembly methodology which requires no special measurement equipment or adjustment of assembly. The concentrator and chassis can be quickly assembled based on an ordered sequence of steps followed by torquing fasteners a defined amount. This defined amount typically ranges from about 20 Nm to about 250 Nm.

In one embodiment, panel tilt is controlled by the panel arms (concentrator structure supporting panels) being pinned with shoulder bolts through both upped and lower flange attachment locations to a central hub. The use of shoulder bolts improves optical performance of the concentrator. In general, the benefit of the shoulder bolts is that they cause precise angular alignment of the reflective panels with the receiver. The shoulder bolts precisely align the panel arms to the hub, thus aligning the reflective panels which are mounted to the panel arms.

The shoulder bolts control the tilt of the panel arms with the tangential alignment tool controlling sweep so the fastening holes on the panel arm align with the attachment points on the panels. The combination of the panel arm hub plate and tangential alignment tool forms a triangle, thereby controlling the angle that the panel arms radiate out from the hub. The alignment tool is used at a time in which the panel arms are secured to the hub and is removed after the shoulder bolts (securing fasteners) are tightened.

To ensure alignment of the ribs or panel arms relative to the hub and each other, an alignment tool is used in assembling the ribs to the hub plate. A tangential alignment tool such as that shown in FIG. 8 is utilized where panel arms are installed and fully torqued with the hub before panels are installed. The amount of torque applied to attach and automatically align each panel is about 91 Nm. The hub plate has a series of first alignment points located, in one embodiment, around the periphery of the hub plate. In one embodiment, these first alignment points are studs. Each of the ribs has a hub end for attachment to the hub and a distal end, which has a second alignment point. In one embodiment, the second alignment point is also a stud.

The alignment tool 400 (FIG. 8) is an elongate body 404 having a first end 408 and a second end 408'. A first attachment unit 412 is located at the first end 408 of the elongate body portion 404 and a second attachment unit 412' is located at the second end 408' of the elongate body portion 404. In use, the first attachment unit 412 is for attaching the alignment tool 400 to a first alignment point on the distal-most point (with respect to the hub) on the panel arm, and the second attachment unit 412' for attaching the alignment tool 400 to a second alignment point on the hub plate to thereby align each panel arm with respect to the hub plate prior to fixation of the panel arm to the hub plate.

Upon tightening of the assembly a predetermined amount, the alignment, which is within a predetermined specification, is achieved. The chassis anchor 260 (FIG. 7L) is constructed of two anchor arms 450. Referring to FIG. 9C, one end of each anchor arm 450 includes a circular engagement portion 454. The circular engagement portion 454 bolts to the drive assembly 24. The other end 458 of each arm 450 fits within the notch 259 of the hub 256 and is bolted to the hub 256. Referring to FIG. 9E, two hub closure plates 255 are secured between each of the anchor arms 450, as shown in FIG. 7H.

Referring to FIGS. 7J and 9A-F, in some embodiments, the chassis assembly includes a plurality of panel arms 32, two hub plates 258, 258', two anchor arms 450, two hub braces 257, two hub closure plates 255, and four hub side braces 261.

Figure 6:
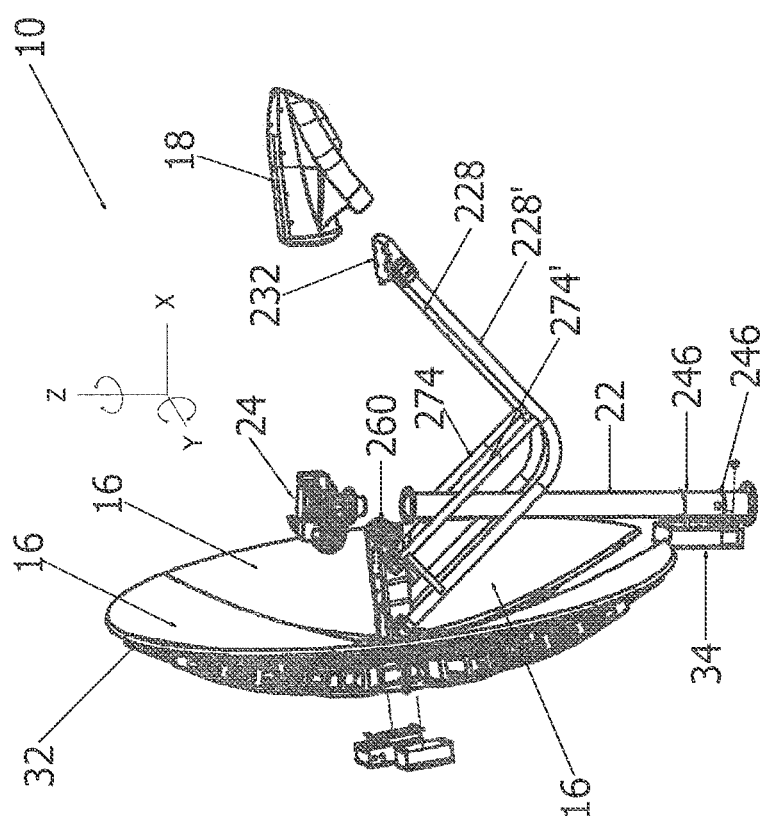
FIG. 6 is a schematic diagram illustrating a system, in accordance with an illustrative embodiment of the invention.

Referring to FIGS. 6 and 7K, the pier 22 is anchored to a concrete base 500 by a plurality of bolts 504, which protrude through a pier base flange 508. The electronics package 34 is bolted to the pier 22 using U-bolts 246. The pier has a drive flange 512 on the opposite end, onto which the drive assembly 24 is attached. In one embodiment, near the pier base flange 508 is positioned a self centering pier lock 514. The pier lock 514 engages with a saddle portion of the engine platform 232 when the device is in the stowed position.

The chassis anchor 260 is attached to the pier 22 by way of the drive assembly 24. The drive assembly 24 provides two degrees of rotational freedom to the collector portion 208. The drive assembly 24 permits the collector portion 208 to rotate about the vertical (azimuth or z-axis) of the pier 22. The drive assembly 24 also allows the collector portion 14 to rotate about one of the horizontal axes (elevation or y-axis) and thereby change the vertical direction in which the boom arms 228, 228' point. Referring also to FIG. 10, the drive assembly 24 attaches to a second pier flange 512 by way of a plurality of bolts 550, which engage a drive flange 554. The anchor arms 450 engage both sides of the vertical drive 558. In this way, when the collector 208 is pointed straight up, the anchor arms 450 are located parallel to and adjacent to the pier 22.

The drive assembly includes two axes of rotation. These axes are offset and are such that the rotational axis for rotation in the vertical direction and the rotational axis for rotation about the pier 22 do not intersect. The rotational axis about the pier 22 is coincident with the axis of the pier 22 itself. The vertical rotation axis is off-set from the axis of the pier 22, such that when the concentrator is pointed straight up, the axis of symmetry from the concentrator 208 is co-parallel with the axis of the pier 22, but not coincident (FIG. 6). This arrangement allows the wiring from the generator to pass into the pier without tangling with the drive units. In addition, since each of the two axes associated with the biaxial drive unit are offset, each drive unit has its own origin and coordinate system. In light of the known offset values and relative spacing between the origins (0, 0, 0) and (a, b, c), it is possible to transform between each of the two spatial coordinate systems.

The drive assembly, drive unit, or biaxial drive unit is a compact self contained unit, which provides all the required degrees of freedom for tracking the sun with the solar concentrator. These degrees of freedom include an axis which is normal to level ground for compass direction (azimuth axis), and another which is orthogonal to the first for establishing elevation of the dish (elevation axis).

The elevation axis is set behind the azimuth axis so as to expose the top of the azimuth axis and a hole or slot defined in the drive housing. When coupled with a hollow shaft or pier for the azimuth axis, this allows for system wire or cable routing directly down through the center of the drive. This addresses the need for a separate wire management scheme.

With respect to the drive unit, an elevation axis, which is set behind the azimuth axis when the dish is pointed up in the zenith position, allows for the use of a hub, which is offset from the post and thus has built in clearance between these two structural components. The benefit of this arrangement is a smaller structural cross section for the hub.

Figure 13:
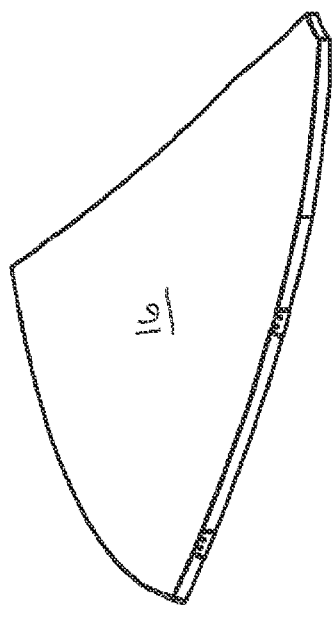
FIG. 13 is a schematic diagram illustrating a panel segment, in accordance with an illustrative embodiment of the invention.

Referring to FIG. 11A, in one embodiment, the panels 16 that make up the collector 208 are non-radial segments. That is, inner portion 600 of panel 16 has a different angular width than outer portion 604 of the same segment 16. As shown in FIG. 12A, the segment shape permits six identical segments 16 to be used to form or comprise the collector 208 while permitting the opening or slot 20 to be formed with two parallel, non-radial edges. A further embodiment of a concentrator panel having non-radial segments is shown in FIG. 13. In one embodiment, the panels are about 2 m long, about 2.2 m wide, and about 50 mm thick. In one preferred, but non-limiting embodiment, each panel segment is made up of a structural substrate (sheet molded compound or stamped steel) with attachment bosses and a reflective surface (thin glass mirror tiles deformed into a 3 dimensional surface or reflective film), which is bonded in place with a pressure adhesive.

Referring back to FIG. 12A, the inner portions 600 form triangular-shaped openings 608 between adjacent panels near the center 619 of the collector 208, except between panels 252 and 252', which are adjacent to the groove 20. This configuration maximizes the reflective area by not allowing the opening 20 to taper outward toward the outer circumference. This shape makes the manufacturing and assembly of the collector easier, since only one segment shape need be manufactured, stored and used. The panel arms, hub plates (or substantially planar mating surfaces), and other elements having a flat or partially flat profile can be stored and shipped with greater ease to remote locations for in field assembly.

In one embodiment, each segment 16 includes a solid polymeric glass resin having a ribbed curved backing, which includes bolting bosses 654 that correspond the bolt locations on the panel arms 32. The glass resin is used because of its strength, non-shrinkage, UV and heat resistant properties. These bolting bosses 654 permit the segments 16 to be bolted to the panel arms 32 using spherical washers to reduce deformation of the surface as a result of bolting the surface to the panel arms 32. The segment 16 itself is non-planar, but is curved so as to form, when assembled with other segments 16, a focal point at the correct distance from the collector 208. In one embodiment, the top surface of each panel has a reflective surface. For example, the reflective surface can be formed using a plurality of reflective tiles. In one embodiment, the front surface of each of the plurality of panels is made reflective by attaching a plurality of about 1 mm thick silvered glass tiles using adhesive. The reflective or mirrored surface of the collector 208 can be formed using various suitable reflective or partially reflective materials.

Upon assembly, the mirror segments or panels 16 are installed in a manner to form a precision shell that is utilized as a fixture to locate the radial position of the panel arms 32 with respect to the chassis anchor 260. Each mirror segment or panel 16 has two linear sets of three bolting supports 654, as shown in FIG. 11A-B and FIG. 14. Each linear set of connection points is attached to one panel arm 32. There is an interface at each location where a bolting support 654 of a panel 16 meets a corresponding bolt location on a panel arm 32.

In one embodiment, the concentrator is comprised of six identical panel segments. The geometry of each panel is such that when assembled onto the chassis, a slot is left in the dish through which the supporting post translates and that dish is articulated from tracking the sun to stowing the dish. In one embodiment, individual panel geometry balances the ability to use a common identical panel segment for all six locations on the dish while at the same time maximizing reflective surface area. This results in open star pattern at the center of the dish as discussed above and shown in various figures.

Figure 15A:
FIGS. 15A to 15D are schematic diagrams illustrating collector dish assembly hardware, in accordance with an illustrative embodiment of the invention.
Figure 15B:

As shown in FIG. 12B, in one embodiment, the assembly procedure starts with the first panel 252' to the left of the opening 20 between segments 252 and 252' when facing the mirrors. The panels 16 are attached to the panel arms 32 starting with the first panel and the first and second panel arms, and continuing in a clockwise direction. In particular, the first panel is installed onto the first 32a and second panel 32b arms using a fastener. In one embodiment, the fastener is a bolt 700 (FIG. 15A) and nut 704 (FIG. 15B), although any suitable fastener can be used. In one embodiment, at each interface, the panel arm 32 includes a bolt 700 that extends both above and below the panel arm 32 as shown in FIG. 16.

Referring to FIG. 16, attachment of a panel to a panel arm 32 at an attachment boss 654 of the panel is shown, in accordance with an embodiment of the invention. The panel is bolted to the panel arm using a bolt 700 which passes through a hole in the panel arm pad (i.e., the portion of the panel arm to which the panel attaches) and threads into the attachment boss 654. Below the panel arm pad, the bolt 700 secures a convex/concave washer pair 714. Above the panel arm pad, the bolt 700 secures a convex washer 706 and a panel concave boss 710.

Figure 15C:
Figure 15D:

In another embodiment, on the bolt 700 above the panel arm 32, the panel 16 is secured to the bolt location (e.g., a panel arm pad) on the panel arm 32 with a flanged hex bolt head 700, a concave spherical washer 706 (FIG. 15C) and a convex spherical washer (or convex insert) 708 (FIG. 15D), with the concave surface facing up. In some embodiments, a convex/concave spherical washer set is used. On the bolt above the panel arm 32, the panel arm is secured using a concave spherical washer 706, with the concave surface facing up. A nut 704 secures the washers 706, 708 on the bolt 700. In general, the use of convex and concave mating surfaces substantially prevents or reduces localized panel distortion. The amount of torque applied to attach each panel is about 25 Nm.

In use, the drive assembly 24 keeps the collector 208 pointed at the sun while the boom arms 228, 228' keep the Stirling engine/generation portion 18 positioned properly from the collector 208.

Over Insolation Control

Embodiments of the invention also provide for the prevention and control of over-insolation, i.e., an excess of solar radiation energy received on a given surface area in a given time. According to one embodiment, the energy converting apparatus' dish or collector is sized so that the system can produce about 3 $kW_e$ when the solar insolation is about 850 W/m². In one embodiment, the system is not sized to produce more than about 3 $kW_e$ when the insolation is greater than about 850 W/m²; thus, solar energy must be rejected or the system will overheat and/or over-stroke. In general, the embodiments described herein relating to controlling over-insolation can be used with any system or device that includes a heat exchanger. In general, a heat exchanger refers to a device that receives incident energy and actively or passively transfers it for energy generation. As a result, in various embodiments, the redirection of concentrated beams of energy can be used with various energy converting apparatuses including chemical energy conversion, thermal energy storage, gas turbine, multi-cylinder or multi-piston engines, steam turbine, steam power towers, fuel cell, water-based energy generation systems and other systems.

Conventional approaches attempting to prevent over-insolation involve mechanical shading of a portion of the dish, mechanically blocking a portion of the focused light before it enters the cavity receiver, and venting heat from the cavity receiver via fans and ventilation pathways.

Embodiments of the invention solve the over-insolation problem with an approach that purposefully misaligns the dish with the sun in a controlled fashion so that a portion of the concentrated beam 'spills' out of the absorber surface by, for example, spilling or redirecting out of the receiver aperture. The misalignment of the dish forces a portion of the beam to intersect with the slew-cone instead of entering the cavity receiver. As the energy content of the spilled or redirected light is potentially sufficient to damage the slew-cone and other components (e.g., the face plate), the spilled or redirected light is rotated around the circumference of the aperture opening so that the slew-cone is able to cool down before the spilled or redirected light makes another pass.

In some embodiment relating to over-insolation control for ECAs, instead of the incident beam of concentrated thermal energy being transmitted through an aperture, it contacts a heat exchanger or other surface of interest at a point or region. Under these circumstances, rather than redirecting concentrated relative to an aperture, the energy is initially directed along or through a substantially linear electromagnetic radiation path. In turn, this path can be moved to change the hot spot or point (or region) of concentrated thermal energy on a heat exchanging surface of an ECA.

According to one embodiment, the rotational speed of the solar energy beam is between about 0 to about 180 revolutions per minute (rpm). More preferably, the rational speed is between about 1 to about 30 rpm. In one embodiment, a minimum rotational speed of about 11 rpm prevents the slew-cone from being damaged. However, it will be appreciated that a variety of rotational speeds may be suitable, depending on the particular configuration of the system and the ambient conditions. The degree of spillage (or misalignment) determines how much heat is rejected by this method.

Should circular-tracking (or any other tracking pattern) or other over-insolation controls (e.g., fans, partial spillage, etc.) be insufficient to adequately lower temperatures, the dish may be elevated such that the focused sun spot is above the heat drive until temperatures are acceptable to resume operation.

Referring to FIG. 17A, as light from the sun is incident upon or impinges on the collector 208, the collector 208 focuses the sun toward the Stirling engine/generation portion assembly 18. The Stirling engine/generation portion 18 is positioned such that the focal point 800 of the collector 208 is not at the heater plate 102 of the engine, but is forward of the heater plate 102. This allows the beams of light to diverge again before interacting with the heater plate 102. This is done to prevent the heater plate 102 from experiencing the intense sunlight concentrated at the focal point 800 of the collector 208. By having the beam expand before impinging upon the heater plate 102, a larger area of the heater plate 102 can absorb the heat without melting, as shown in FIGS. 17B-17C. In some embodiments, the beam spills outside the edges of the heater plate. In some embodiments, the light or electromagnetic radiation follows a substantially linear path or a non-linear (i.e., converging on a focal point, then diverging) path.

Solar radiation is reflected off of the mirrored dish. The solar radiation forms two cones, as shown. In one embodiment, every conic section that is normal to the cone's axis is called a heat-flux profile. The heat flux profile that impinges on the heater head of the engine is a function of dish distance. The heat flux profile is not uniform. The heat flux towards the outer diameter of the profile is larger than That towards the middle. The arrangement described above was chosen so that an insulative receiver could be used. The collector reflects more energy than is necessary to heat the plate under optimal sun conditions. In this way, when the conditions of sunlight are less than optimal, for example during sunrise and sunset, the collector still focuses enough energy on the heater plate to cause the system to produce useable power or initiate an engine cycle. The end result is that when the sun light approaches an upper limit or threshold as a result of the sizing of the concentrator, there is too much energy focused on the heater plate 102, and the engine can overheat.

If the Stirling engine/generation portion 18 experiences too high of a temperature, the drive assembly 24 moves the collector 208 to reduce the amount of or prevent solar energy from entering the aperture. In this way, the concentrated sunlight then transfers less power to the heater plate 102, and the heater plate 102 temperature is reduced. Because this causes the faceplate 62 and slew cone 58 to become heated by the portion of the solar light that does not impinge on the heater plate 102, the drive assembly 24 may not let the concentrated sunlight image remain on an area of faceplate 62 or slew cone too long. Instead, the drive assembly 24 oscillates so that the concentrated sunlight image oscillates on and off the faceplate 62 and slew cone 58 to allow time for them to cool. In one embodiment, shown in FIG. 17C, the drive assembly 24 moves so that the concentrated sunlight image 13 traces a circle around the periphery of the heater plate 102 and the slew cone. As will be appreciated, a circular track is only exemplary, and the system can track any pattern or can be randomized.

Referring back to FIG. 3F, during over-insolation conditions, the power Q4 into the receiver 60 is decreased while the power incident on the faceplate 62 (Q1) and slew cone 58 (Q2) are increased. During over-insolation conditions, some of the power Q1 and Q2 is absorbed with radiation and convection dissipating the absorbed power. This process allows the concentrator to be sized larger, which improves the yearly energy production, and the excess power is dissipated by, for example, the faceplate 62, slew cone 58, or any material outside the engine. The concentrated light can also be aimed entirely off the energy converting apparatus so that the beam diffuses into the air.

During periods of higher solar intensities, fans can be used cool the receiver. Although this is one approach, in a preferred embodiment, spilling or redirecting the excess solar energy onto the slew cone and faceplate is preferred. However, excess solar energy can be spilled or redirected onto any material or component outside the engine. Thus, the front parts of the receiver assembly absorb and store the excess thermal energy before dissipating it from conduction, convection, and radiation. The faceplate and slew cone increase in temperature and dissipate more power to the environment through conduction, convection, and radiation. During over-insolation control, the concentrator drive unit moves the concentrator so that the concentrated light moves in a circular pattern to spill or redirect on the slew cone and faceplate. However, other movement patterns are possible, such as, for example, back-and-forth, triangular, square, or randomized.

In some embodiments, during over-insolation control, some concentrated light still reaches the heat exchanger. In another embodiment, the drive unit is set to automatically engage when the engine is at maximum power and the heater head temperature rises above a temperature set point to redirect or spill or redirect excess solar radiation on the face plate and slew conc. These features also allow less expensive metal face plates to be used, since focused heating in one region of the face plate is avoided by the movement pattern. Thermal spray (cold, flame, plasma, electric arc, HVOF, etc.) which is a ceramic, metal or cement coating, can also be used on the face plate, slew cone, or other materials to reflect more energy and thus reduce the amount of thermal energy absorbed.

In certain embodiments, the invention enables the use of an oversized solar concentrator. An oversized solar concentrator (e.g., a dish or mirror) is capable of collecting and/or concentrating more solar radiation than the system is capable of thermally processing without overheating or damaging the system. If a larger solar concentrator is selected, such a device allows for greater energy production over the course of the year. This follows because more energy is realized during non-peak solar conditions. Non-peak solar conditions can be seasonally-related, such as when the daylight hours are shorter and/or solar radiation is less intense, or weather-related such as during cloudy weather. However, during peak solar conditions, an oversized solar collector can collect and/or concentrate more solar radiation than the system components can thermally process. As described in more detail below, the invention provides methods for reducing over-insolation, which can occur with an over-sized dish. As a general principle, the over-insolation or insolation control and regulation techniques described herein are not limited to Stirling cycle energy converting apparatus, but can also be used with existing reflector based arrays used to heat water or generate steam. For example, many of the issues relating to hot spot movement can also be used with other non-Stirling energy converting systems that use solar energy.

Therefore, in certain embodiments the invention provides methods for reducing over-insolation. In some embodiments, this is accomplished by reducing the amount of solar radiation that passes through the aperture of the slew cone. For example, during peak solar conditions, excess solar radiation can be spilled or redirected onto, for example, the slew cone or face plate rather than on the heat exchanger. Reducing over-insolation allows the system to continue producing power on hot days when the coolant, heat exchanger, or engine would otherwise overheat. In one embodiment, when the direct normal insolation (DNI) (which is the direct intensity of sunlight) becomes too high, over-insolation control is engaged.

In some embodiments, reducing over-insolation enables the engine to perform better during normal operation by spreading out temperature flux on the engine or other thermal components. Hot spots can form as a result of imperfections in the solar concentrator and can contribute to reduced performance and reliability. Implementing over-insolation methods during normal operation can spread any hot spots around and potentially improve performance and reliability, and can extend the use-life of the system. The lifespan and reliability of an engine and other thermal components can be reduced if they are heated too rapidly over repeated cycles. Moreover, the impact of thermal transients can be reduced by slowing the rate at which the engine and other components are heated. For example, sensor feedback might indicate that the engine is heating too rapidly, and the over-insolation methods taught herein can be used to reduce the amount of solar radiation impinging on the heat exchanger or other energy converting apparatus components.

Moreover, over-insolation control can be used during commissioning—the first days and weeks of installing or initializing the system—or after replacing components to prevent hot spots from being oxidized, which could lead to premature damage or reduced reliability and/or lifespan. Hot spots caused from an imperfect solar concentrator can also cause the heat exchanger to absorb more solar energy in the hot spots, which would cause the hot spots to become even hotter and could lead to premature failure. Thus, the methods for controlling over-insolation taught herein can move the hot spots around during the first day/weeks of bringing the system or replacement parts on-sun to minimize formation of hotspots and damage caused by imperfections in the solar concentrator.

In addition, the over-insolation control can reduce hot spot impact on a material sensitive to high peak fluxes or hot spots. For example, a heat pipe sodium vapor chamber or thermal energy storage module can have burnouts and certain materials, and system components can be damaged if peak flux is too great. Moving the hot spots around would help prevent high peak fluxes from damaging these parts sensitive to high peak fluxes.

In certain embodiments, over-insolation methods can reduce the thermal load on the coolant system, which would allow for better system performance. For example, over-insolation methods can be used to keep the coolant maintained below an acceptable temperature if the cooling system cannot tolerate the high ambient conditions on a given day or if cooling system performance degrades over time. In preferred embodiments, the coolant is maintained below a given temperature (e.g., about 80° C.). If the coolant overheats, the system can go into over-insolation to ensure the coolant temperature stays cool enough. If over-insolation is not engaged, the system would have to be brought off-sun, and would thus lead to a costly reduction in performance and energy realization.

Over-insolation methods can also be used so that the engine does not overheat during thermal (or solar) transients when the head temperature climbs past its temperature set point (e.g., a normal operating temperature of the engine). The heater head control is configured to maintain the head temperature at a specific temperature, but during a thermal or solar peak it is possible that the heater head control and/or system will overshoot the temperature set point. If this occurs, over-insolation control can be used to reduce thermal input and therefore reduce the chance of a significant temperature overshoot, which will reduce the lifespan and/or reliability of the engine. Generally, temperature overshoot is a rise in temperature of the engine well beyond the temperature at which it is intended to operate. In one embodiment, the preferred operating temperature of the ECA is about 600 degrees Celcius. When a temperature sensor detects temperatures is about 15 degrees above the preferred operating temperature, the drive assembly is automatically engaged to spill excess solar radiation to lower the operating temperature closer to the preferred operating temperature.

In certain embodiments, one or more components (e.g., the heat exchanger) are modified to absorb more solar radiation. Absorbance can be increased, for example, by using thermal spray or by texturing component surfaces. Oxidizing also thermally stabilizes components such as the slew cone, receiver cone, or heater plate and is yet another approach to safeguarding the ECA from overinsolation.

In another embodiment relating to insolation control, cloud cover control is used to protect the receiver and engine from solar thermal transients. When the engine turns off due to clouds midday, it is susceptible to overheating or excessive thermal cycling when the clouds part. This occurs from the time it takes to sense a temperature rise in the engine temperature sensors. To overcome this, when the engine turns off and the concentrator continues tracking the sun, the concentrator beam can be moved in the direction of a sensor on the slew cone. When the sun comes out from behind a cloud, a temperature sensor, such as a thermocouple, senses that the solar intensity has increased and the concentrator is moved back to being centered in the aperture and the engine 'bumps.' Bumping the engine entails passing the working fluid in the engine back and forth, which enables the engine to turn on before the receiver or engine overheats. Moving the piston in this way, in response to sun sensor detection of insolation, helps circulate the working fluid in the engine (Helium, in one embodiment). This serves to distribute heat, which diminishes hot spots that can thermally fatigue the engine and limit its life.

As described above, various over-insolation control methods and devices may be implemented that uses sensors to trigger a change in the amount of solar energy that reaches a heat exchanger or other surface suitable for transporting thermal energy for use in a Stirling cycle. These over-insolation control methods may be embodied in may different forms, including, but in no way limited to, computer program logic for use with a processor (e.g., a microprocessor, microcontroller, digital signal processor, or general purpose computer), programmable logic for use with a programmable logic device, (e.g., a Field Programmable Gate Array (FPGA) or other PLD), discrete components, integrated circuitry (e.g., an Application Specific Integrated Circuit (ASIC)), or any other means including any combination thereof. In a typical embodiment of the present invention, some or all of the processing of the sensor data collected is implemented as a set of instructions or signals that are processed by a computer, circuit, processor, board, or other electronic device.

Programmable logic suitable for implementing overinsolation control may be fixed either permanently or transitorily in a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), or other memory device. The programmable logic may be fixed in a signal that is transmittable to a computer using any of various communication technologies, including, but in no way limited to, analog technologies, digital technologies, optical technologies, wireless technologies (e.g., Bluetooth), networking technologies, and internetworking technologies. Computers and computer systems described herein may include operatively associated computer-readable media such as memory for storing software applications used in obtaining, processing, storing and/or communicating data. It can be appreciated that such memory can be internal, external, remote or local with respect to its operatively associated computer or computer system.

Memory may also include any means for storing software or other instructions including, for example and without limitation, a hard disk, an optical disk, floppy disk, DVD (digital versatile disc), CD (compact disc), memory stick, flash memory, ROM (read only memory), RAM (random access memory), DRAM (dynamic random access memory), PROM (programmable ROM). EEPROM (extended erasable PROM), and/or other like computer-readable media.

In general, computer-readable memory media applied in association with embodiments of the invention described herein may include any memory medium capable of storing instructions executed by a programmable apparatus. Where applicable, method steps described herein may be embodied or executed as instructions stored on a computer-readable memory medium or memory media. These instructions may be software embodied in various programming languages such as C++, C, Java, and/or a variety of other kinds of software programming languages that may be applied to create instructions in accordance with embodiments of the invention.

Vibration Control

The free piston Stirling engine operation is based on moving components operating with no direct rigid mechanical connection between each other. Each moving part is equivalent to a mass in a system of masses that are linked to each other via gas or springs. There are different components within the energy generating apparatus and the Stirling engine, and all the components interact as they move to contribute to the vibrations of the system (receiver, pistons, engine, and balancer). Avoiding this interaction is one purpose of an isolation suspension system.

As shown in various figures, such as FIG. 18A, in one preferred embodiment, a balancer 64 in communication with the engine housing 57 reduces vibration caused by the internal components. In one embodiment, the balancer 64 is a passive balancer. Typically, this balancer 64 is a passive balancer in that it undergoes oscillation in response to other initiating forces within the energy converting apparatus. Balancers such as passive balancers are well known in the art. See, e.g., U.S. Pat. No. 5,895,033. The receiver portion 56, engine housing 57, and balancer 64 are supported by a ring frame 66. Various aligned and coupled masses within the energy converting apparatus are maintained in alignment while suspended by the ring frame 66. For example, various subsystems such as the receiver portion 56, engine portion 54, and passive balancer 64 are all supported and aligned by isolation springs 850, 850', which attach to the ring frame 66. As shown in FIG. 18C, the ring frame has a plurality of supporting members 860 onto which a structural supporting ring or loop is attached with various holes 858 and attachment points.

In accordance with one embodiment, the passive balancer is a subsystem for counterbalancing vibrations of the energy converting apparatus. Referring back to FIGS. 2A and 2B, in one embodiment, the passive balancer 64 is in mechanical communication with the engine housing 57 via support member 67. The engine housing 57 in turn is carried by flexure assembly 856, which is connected to the ring frame 66 (FIG. 18A). The flexure assembly 856 is in the form of at least one flat spring 850 including connections along a central portion 852. In one embodiment, the geometry of the flexure spring 850 used can include a plurality of springs as shown in FIG. 18A. The central portion 852 of each spring is fixedly mounted to the ring frame support mount 860, and an outer peripheral portion 853 of the flat flexure spring 850 is fixedly mounted to support member 857. The flexure assembly 856 functions, in part, as an isolation suspension that allows the engine 55 and engine housing 57 to move relative to the ring frame 66 to reduce the amount of vibration transmitted to the ring frame 66. This spring compliance isolates a great deal of the force created within the energy converter 54 from being fully transmitted to the ring frame 66. The passive balancer 64 resonantly responds to base motion of engine portion 54 in order to provide further force cancellation to the internal forces of the engine portion 54. Thus, in one embodiment, the flexure assembly 856 and balancer 64 act together to minimize force transmitted to ring frame 66.

As shown in FIG. 18A, a heater head or heater plate element 102 receives or absorbs solar radiation, which is first focused toward and then which diverges at or near the aperture. In one embodiment, two isolation plate springs 850, 850' or flexures mount to a portion of the engine 55 or its housing 57 to reduce vibrations on the engine side of the energy converting apparatus. These isolation springs maintain the engine's cylindrical axis concentric to the axis of the ring frame 66, and these isolation springs 850, 850' provide a tailored axial compliance to keep the heater head 102 within an anticipated range of collector engine motions. The isolation spring's compliance reduces the dynamic vibration load transmitted to the ring frame 66. Additional details relating to a constituent element of the isolation spring are shown in FIG. 18B. In one embodiment, the ring frame is selected such that the structural vibration modes of this component is different from vibration frequencies created by the Stirling engine used in embodiments of the energy converting apparatus.

The isolation springs 850, 850' in FIG. 18B mount the engine to the ring frame 66. Holes 854 in the isolation springs 850, 850' allow the isolation springs to orient relative to holes 858 in the support mounts 860 of ring frame 66. The geometry of the springs 850, 850' results in springs which are compliant in the axial direction while also being relatively very stiff in the radial and circumferential directions of the ring frame's cylindrical coordinate reference system. Referring to FIG. 18A, the ability of the springs 850, 850' to flex reduces the transmission of vibrations between the engine 55 or its housing 57 and the ring frame 66. The two isolation springs 850, 850' are shown mounted to a ring frame 66, which is a portion of the frame upon which the outer cover is attached.

Figure 19C:
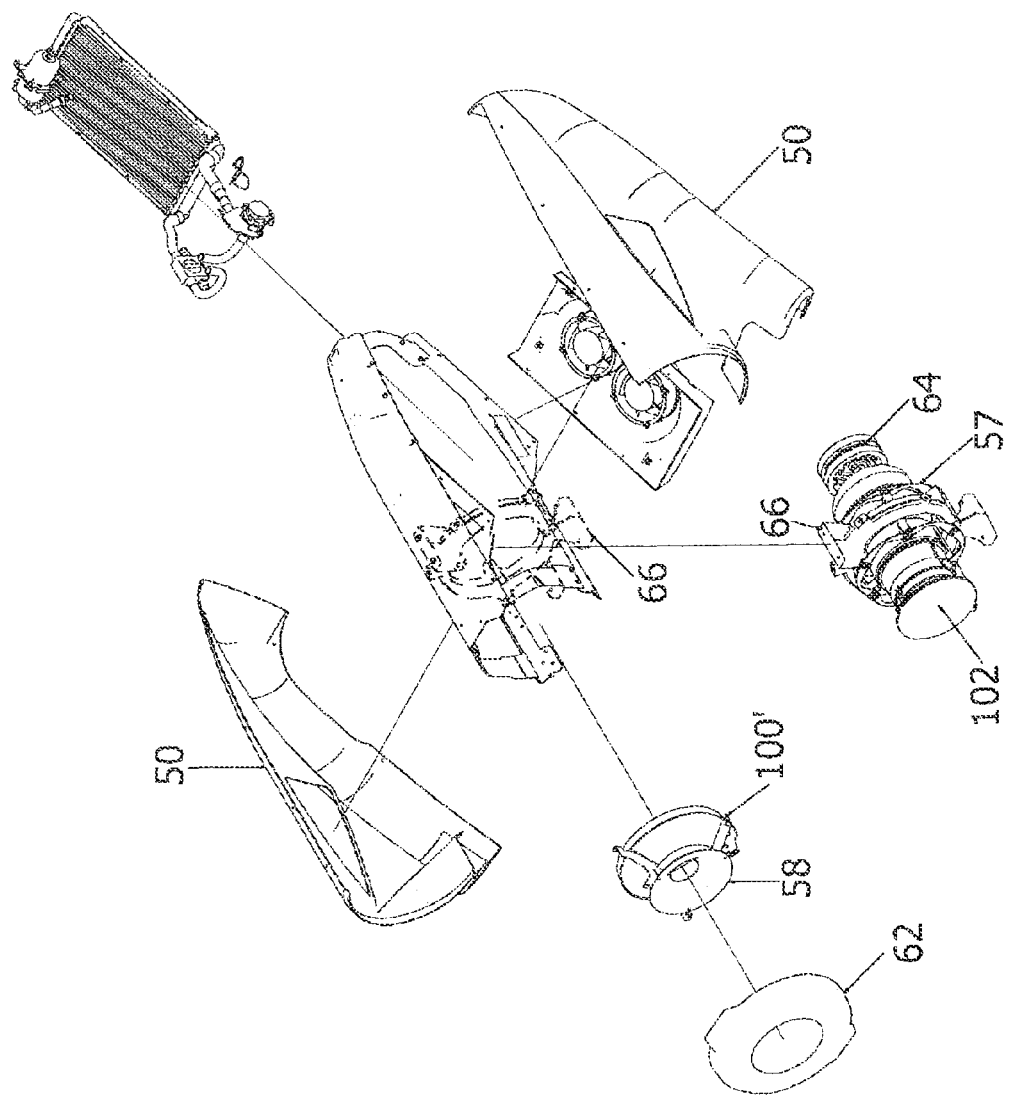

In one embodiment, a single isolation spring 850 includes individual spring plates. The two spring assemblies separate to provide a force couple to resist any rotation of the engine off the ring frame central axis. As shown in this embodiment, there are six spring plates, three of which are combined together in a plane, forming a complete ring that defines one isolation spring 850. FIGS. 18C and 18D show additional details relating to the ring frame 66. In one embodiment, the ring frame 66 is a single piece of cast aluminum or is machined from a single piece of aluminum. The ring frame 66 can also be cast, stamped, or machined as separate components, which are joined together. The ring frame 66 forms a plurality of support mounts 860, which are evenly spaced around the ring frame 66 and serve as attachment points for the isolation springs 850. Isolation springs 850 can be mounted on both sides of the ring frame 66, (see FIG. 2B). The ring frame support mounts 860 can include a plurality of holes 858 for attaching the isolation springs 850. FIGS. 19A, 19B and 19C show additional details relating to the frame. In one embodiment, the ring frame is about 150 mm to about 160 mm long, about 500 mm to about 510 mm high, about 400 mm to about 410 mm wide, and is about 350 mm in diameter at the outer mounting bolt circle.

In one embodiment, the engine mounting and suspension system includes a ring-shaped ring frame 66 and substantially planar springs 850, 850'. The angle that the clamp line makes relative to the flexure arm geometry is intended to be normal to the vector of maximum principal stress. The mounting is designed to be a high precision and inexpensively mass-producible component with a service life as long as 75,000 hours.

The passive balancer 64 is engineered to minimize transmitted load to the ring frame 66 within the tolerances and constraints of the engine operating conditions. The balancer 64 resonates near the operating frequency and can reduce or partially-balance the fundamental frequency vibration force of the energy converting apparatus or a subsystem or mass disposed therein. In one embodiment, the passive balancer operates to reduce the transmission of vibration load to the ring frame that would otherwise occur because of free piston oscillations.

The springs flex due to gravity loads from orientation of the concentrator during the day, and the springs flex in response to axial vibration forces that occur due to operation of the Stirling. The gravity load is one constraint that can be addressed by increasing the axial spring stiffness to ensure the heater head stays in the desired axial tolerance band. In one embodiment, this tolerance band ranges from about 0 mm to about 3 mm. In turn, the axial vibration forces determine how much balancer force is needed to protect the remainder of the concentrator from damage due to high-cycle fatigue due to engine vibration.

In general, the embodiments of the invention reduce the transmission of vibrations from vibrating subsystems, such as the engine assembly by determining the appropriate mounting, balancing, and suspension conditions: Maintaining the transmitted force from the engine to the concentrator structure at or below an acceptable level allows the system to reach reliability, performance, and product cost targets.

In part, the inclusion of a collinear suspended arrangement of masses in the form of a receiver portion 56, engine portion 54, and passive balancer 64 helps reduce transmission of unwanted vibrations and forces. Thus, in one embodiment, elements of the energy converting apparatus operate as a multiple degree of freedom resonant system (i.e., piston, displacer, engine housing, and balancer.) In one embodiment, the boom and the ring frame can also provide additional degrees of freedom. The mounting or frame of the casing (or engine housing) 57, which includes the engine, provides one degree of freedom. The engine housing responds to forces from the power piston, which causes the alternator to move, and the displacer (that displaces fluid in the machine) (107 in FIGS. 2B and 2C) and the passive balancer (each with its own degree of freedom) to provide a total of four degrees of freedom. This mounting or ring frame and isolation suspension provide further reaction forces to the housing. These various elements, which vibrate while suspended by flexures in the ring frame, represent a tunable mass system. In one embodiment, this suspend mass system can be tuned to meet various dynamic constraints. In one specific embodiment, the constraint is to limit the range of dynamic axial movement (or predetermined axial tolerance band) from about 0.1 mm to about 0.6 mm with respect to a fixed reference point, such as the ring frame, for a total range of about 1.2 mm. In one preferred embodiment, the axial constraint in movement (such as an axial deflection of the engine housing measured relative to the ring frame) is about 0.3 mm, for a total range of about 0.6 mm. Thus, in one embodiment, a predetermined axial tolerance band ranges from about 0 min to about 0.3 mm in one embodiment. Further, in another embodiment a predetermined axial tolerance band range from about 0 mm to about 0.6 mm.

This system of masses, a frame, and flexures has a distinct advantage over other mounting approaches. For example, the flexures on the ring frame allow the engine to be positioned relative to the sun while remaining constrained within the ring frame inside the energy converting apparatus. Coil springs have no lateral stiffness and are not suitable to meet the goal of this suspension without other features for lateral motion control. The lateral stiffness of the flexures keeps the energy converting apparatus internal subsystems substantially fixed when moving the apparatus and tracking the sun. In addition, the lateral stiffness maintains the location of the ECA when it is subjected to gravitational loads from different orientations during device operation.

Heater Head/Heat Exchanger

Figure 20:
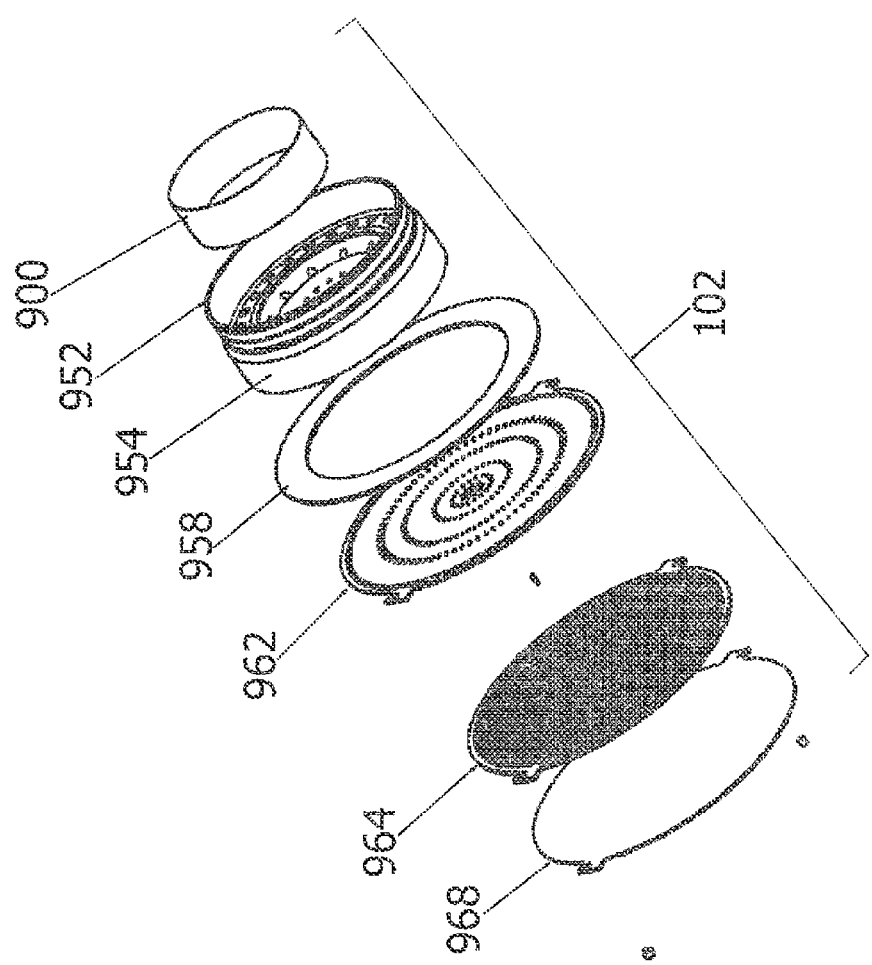
FIG. 20 is a schematic diagram of a heater head, in accordance with an illustrative embodiment of the invention.
Figure 2C:
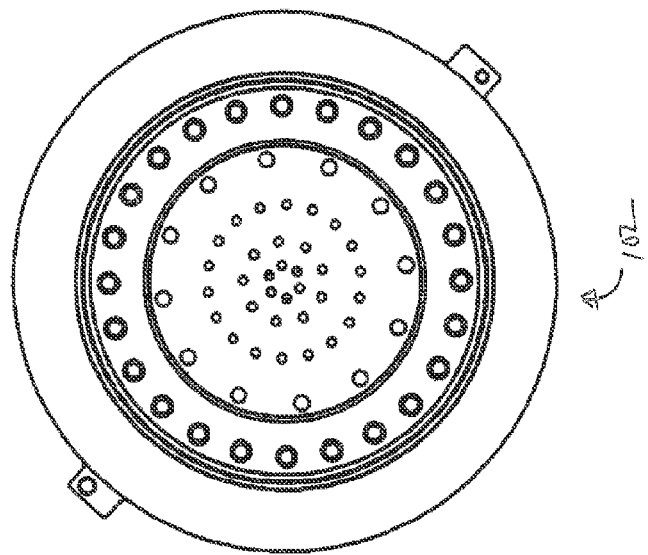

As shown in FIG. 20, the heat exchanger 102 (alternatively heater plate, flat hot heat exchanger (FHHX), or heater head) is a novel multi plate brazement that includes a manifold 954, manifold plate 962, channel plate 964, and top plate 968 in one embodiment. The heater head 102 shown in FIG. 20 receives the solar radiation or other heat to begin the engine's Stirling cycle. The material selection of the components is important in balancing the operating pressure, operating temperature, longevity, and cost. The architecture of this component allows for the easy adaptation of the Stirling engine, of which it is a component, to any potential heat source, including solar, bio gas, radioisotope, diesel fuel, natural gas, etc.

The multi-plate brazement architecture helps create a heat absorber surface ideally suited to long-life, mass-producible, multi-market, heat exchanger components. The heat exchanger 102 transfers thermal power from the absorber surface 968 to the engine working fluid via convective heat transfer. The desire to have a high fluid velocity needed to assure sufficient heat exchange must be tempered with minimizing the fluidic back pressure associated with internal tubular flow. The optimization of channel geometry within the one-piece channel plate assures excellent heat transfer with a minimum of flow losses while adequately covering the entire absorbing surface, negating heat transfer dead zones.

In various embodiments of the present teachings, the heater head 102 (see FIG. 18A) interfaces with a heat engine, such as, for example, a Stirling engine 55. The heater head 102 transfers thermal energy from a heat source to the heat engine 55. The heater head 102 can interface with any suitable heat source, such as, for example, heat generated from solar energy and/or a combustion burner (e.g., a JP-8 diesel burner).

Figure 21A:
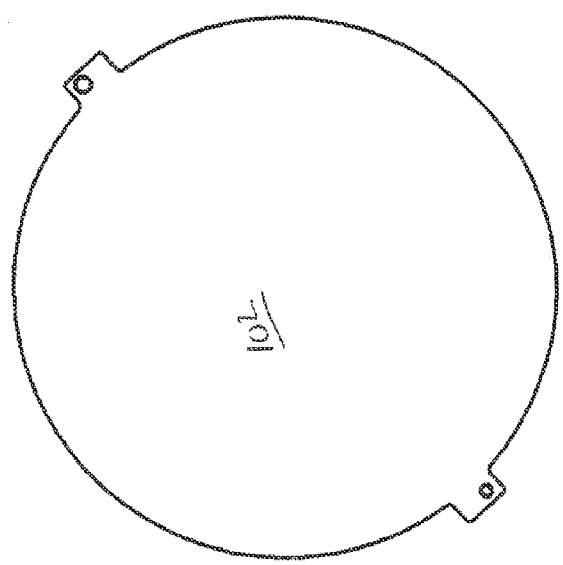
Figure 21B:
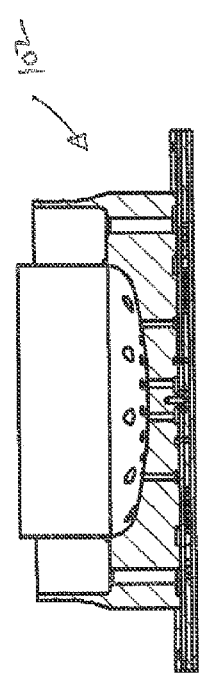

Referring to FIG. 20, in various embodiments, the heater head can be formed from a plurality of components. The components can include a top plate 968, a channel plate 964, a flow distributor 962, a cold side flange 958, a manifold block 954, a heater head wall 952, and a displacement cylinder 950. In some embodiments, the individual components can be joined to form an integral heater head such as that depicted in FIGS. 21A-C.

In some embodiments, the heater head can be formed from a plurality of components that can include one or more sacrificial plates. One or more sacrificial plates can be interpolated between any or all of the components which form the heater head. For example, one or more sacrificial layers can be interpolated between the top plate and the channel plate, one or more sacrificial layers can be interpolated between the channel plate and flow distribution plate, and/or one or more sacrificial layers can be interpolated between the flow distribution plate and the manifold block.

The sacrificial layers can be composed of any suitable low-melting point material or materials, such as a metal alloy. In some embodiments, the individual components can be joined together to form an integral heater head, such as that depicted in FIGS. 21A-C, while the sacrificial layers are substantially converted into platelets or tubes that allow heat exchange through the holes and channels in the final brazed heater head assembly. The sacrificial layers typically include a low melting point metal that liquefies during in the brazing process.

The components of the heater head can be composed of any suitable material that can withstand high thermal temperatures and large thermal gradients in long life design applications. In various embodiments, the top plate, channel plate, flow distribution plate, manifold block, heater head wall, cold side flange, and displacement cylinder are made from solution annealed Inconel® 625 or Haynes® 230 alloys. This particular material choice can be made from a class of metals called super-alloys, high thermal-performance alloys, or any other descriptor of a metal that is designed or is innately inclined to have appropriate structural and heat-transfer performance at a high temperature. In some embodiments, the cold side flange is made from a 300 series stainless steel, such as 304, for ease of machining. One of skill in the art will appreciate that many other suitable materials can be used in accordance with the present teachings.

The heater head can include two major subassemblies, a pressure vessel subassembly and a hot heat exchange subassembly. The pressure vessel subassembly can include the cold side flange, heater head wall, displacer cylinder, and manifold block.

The manifold block acts as an end cap for the pressure vessel subassembly. The manifold block is substantially torispherical in shape. The top of the manifold (i.e., the surface which faces the hot heat exchanger) can include an asymmetric hub which facilitates alignment of the manifold block, the flow distributor plate, the channel plate, and/or the top plate. The central hub can have one or more asymmetric notches that are positioned such that it is impossible to align the plates incorrectly. The manifold block can be roughly sized using the ASME boiler and pressure vessel code and then refined using finite element analysis (FEA) modeling. In some embodiments, the manifold block contains porting features to allow for the communication of helium between the expansion space and the compression space by way of the hot heat exchanger. The manifold block can be formed by, for example, machining or investment casting.

Figure 22:
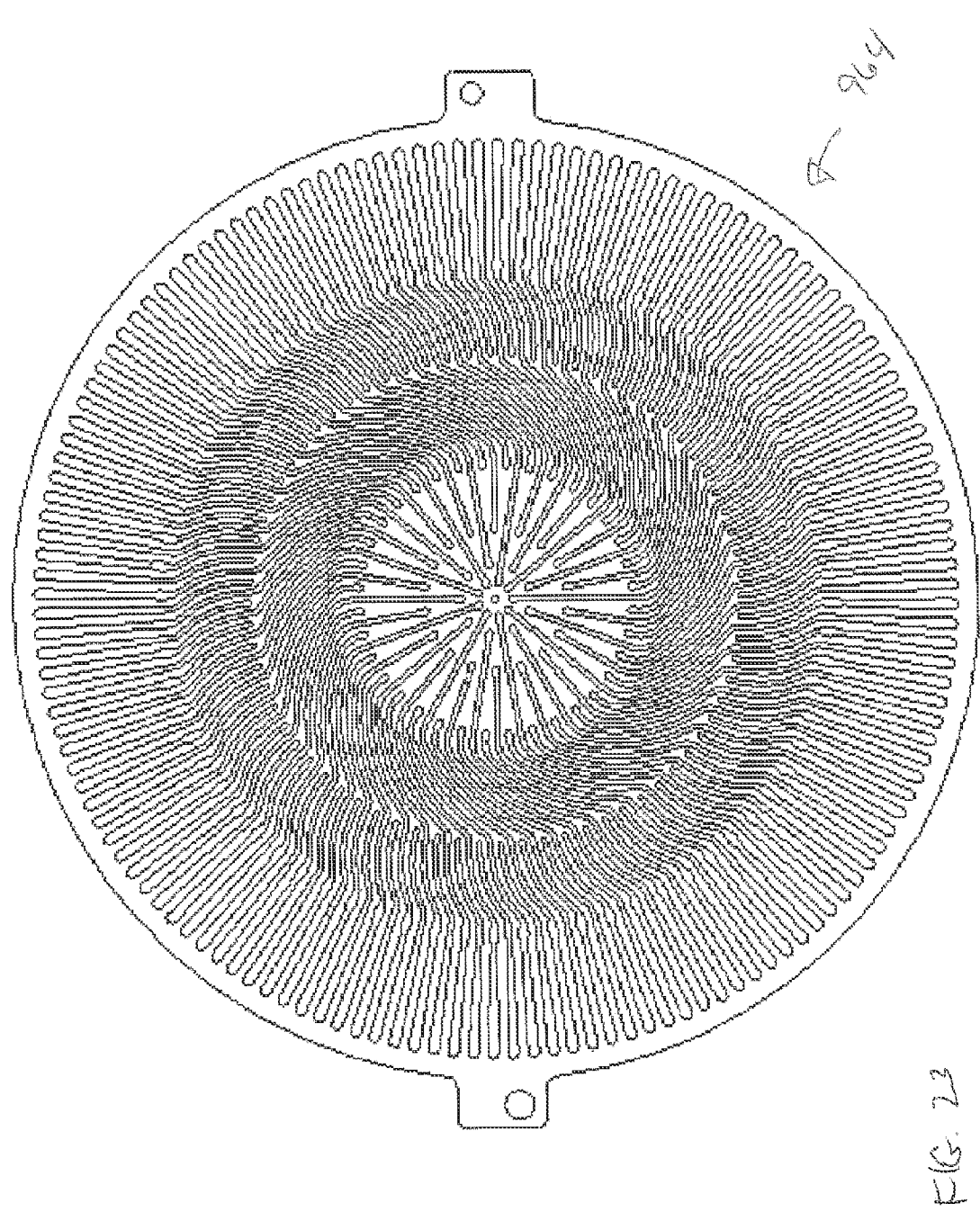
FIG. 22 is a schematic diagram depicting a cross-sectional view of a heater head, in accordance with an illustrative embodiment of the invention.

Referring to FIG. 22, the heater head wall profile is optimized for structural efficiency and thermal loss reduction. The heater head wall 952 can have a tailored wall profile. The heater head wall can be made from Inconel® 625 or Haynes® 230 by, for example, a flow forming process or by machining. This particular material choice can be made from a class of metals called super-alloys, high thermal-performance alloys, or any other descriptor of a metal that is designed or is innately inclined to have appropriate structural and heat-transfer performance at a high temperature. The heater head wall can be welded to the manifold block using a laser weld or other suitable welding process. A brazing process is also acceptable.

Referring to FIG. 20, in some embodiments, the cold side flange 958 provides a mount on the heater head for the heat engine. The cold side flange can be a substantially planar ring. The cold side flange can also have a plurality of holes for reversibly attaching the heater head to the heat engine using, for example, screws or bolts. The cold side flange can be joined to the heater head wall using a braze joint, such as an annular seat located on the inside diameter of the cold side flange, which scat is configured to receive the heat head wall. In other embodiments, the cold side flange can be replaced with a bimetallic joint from the aluminum engine housing to the Inconel® heater head. The cold side flange can be milled from either a plate or a casting.

Referring to FIG. 20, the displacer cylinder 900 is a thin-walled structure and is used to create the annular cavities which form an expansion space and a regenerator space. In various embodiments, the displacer cylinder 900 is made of Inconel® 625 or Haynes® 230, to minimize stresses caused by differential thermal expansion, which could occur if other materials were used. This particular material choice can be made from a class of metals called super-alloys, high thermal-performance alloys, or any other descriptor of a metal that is designed or is innately inclined to have appropriate structural and heat-transfer performance at a high temperature. The cylinder can be rolled and welded from sheet material and/or can be machined, drawn or flow formed. The cylinder can be brazed into the manifold block.

The second major subassembly of the heater head is the hot heat exchanger (HHX). In some embodiments, the hot heat exchanger subassembly is formed from three different plates that, when joined, form the helium flow passages. The three plates include the top plate 968, the channel plate 964, and the flow distribution plate 962, each of which can be made of Inconel® 625 or Haynes® 230. This particular material choice can be made from a class of metals called super-alloys, high thermal-performance alloys, or any other descriptor of a metal that is designed or is innately inclined to have appropriate structural and heat-transfer performance at a high temperature.

In various embodiments, the top plate is the heat-absorbing surface of the hot heat exchanger. The top plate can be substantially disc shaped and/or can be substantially planar. The top plate can have a locating feature in the center of the plate, which receives the central hub of manifold plate, and thereby facilitates alignment of the top plate with the manifold block, the flow distribution plate, and/or the channel plate. In some embodiments, the locating feature can include one or more asymmetric tabs, which are configured to interact with one or more asymmetric notches in the central hub such that the plates cannot be aligned incorrectly.

The top plate can be, for example, between about 0.1 and about 0.001 inches thick and, more preferably, between about 0.050 and about 0.01 inches thick. In some embodiments, the top plate is about 0.040 inches in thickness. The plate can be formed by stamping or machining. In embodiments where the heater head is used with a combustion burner, metal fins can be used as extended surface area to enhance heat transfer between the top plate and the combustion burner. The heat exchanger fins can be formed from sheet metal or can be cast or machined.

Referring to FIG. 23, in various embodiments, the channel plate 964 contains a plurality of arcuate finned channels which radiate from the central region of the channel plate. The channels both expand the available surface area on the helium side of the heat exchanger and direct helium flow across the top plate surface. Channels may be staggered in location allowing for the entire absorbing surface to participate in active heat transfer. The shape of the finned channels can be a substantially elongated S-shape, which shape provides for normal entry into the inside diameter plenum space of the manifold block and the turnaround plenum in the distribution plate, thereby reducing flow losses in those regions.

The channel plate can be substantially disc shaped and/or can be substantially planar. The channel plate can have a locating feature in the center of the plate, which receives the central hub of manifold plate, and thereby facilitates alignment of the channel plate with the manifold block, the flow distribution plate, and/or the top plate. In some embodiments, the locating feature can include one or more asymmetric tabs, which are configured to interact with one or more asymmetric notches in the central hub such that the plates cannot be aligned incorrectly. The channel plate can be, for example, between about 0.5 and about 0.01 inches thick and, more preferably, between about 0.25 and about 0.1 inches thick. In some embodiments, the channel plate is about 0.187 inches in thickness. The channel plate can be laser-cut from sheet material.

The flow distribution plate distributes helium flow from the manifold plenums and through each of the finned channels of the channel plate. Referring to FIG. 24, the flow distribution plate 962 can have a plurality of holes arranged in substantially concentric circles around the center of the plate. In some embodiments, the flow distribution plate can have a turnaround plenum on the outside diameter of the plate. The turnaround plenum functions to transfer helium from the finned channel connecting the inside diameter manifold plenum to the outside diameter of the absorber, to the channel connecting the outside diameter of the absorber to the outside diameter manifold plenum. In this way, the fins in the channel plate are able to be supported at both the inside diameter and outside diameter of the channel plate, thereby making the channel plate easier to manufacture. The flow distribution plate can be substantially disc shaped and/or can be substantially planar.

The flow distribution plate can have a locating feature in the center of the plate, which receives the central hub of manifold plate, and thereby facilitates alignment of the flow distribution plate with the manifold block, the top plate, and/or the channel plate. In some embodiments, the locating feature can include one or more asymmetric tabs, which are configured to interact with one or more asymmetric notches in the central hub such that the plates cannot be aligned incorrectly. The flow distribution plate can be, for example, between about 0.5 and about 0.001 inches thick and, more preferably, between about 0.25 and about 0.01 inches thick. In some embodiments, the flow distribution plate is about 0.030 inches in thickness.

The components of the heater head can be joined together using one weld and a single inert gas belt braze. In some embodiments, the heater head wall is first welded to the manifold block. The weld can be accomplished by, for example, a single sided, butt-joint, laser weld with a backing plate. Once the manifold block and heat head wall are welded, the remaining components can be stacked and readied for the braze process. In various embodiments, the top plate, the channel plate, and the flow distributor plate can be aligned to the manifold block using a central hub located on the top of the manifold block.

The central hub can have one or more asymmetric notches that are positioned such that it is impossible to align the plates incorrectly. A solid ring braze alloy pre-form is placed between each component and covers all surfaces to be brazed. Excess braze may coat the helium flow channels, but will be insufficient to cause blockages. The braze alloy pre-forms can have tabs on their outside diameter that protrude past the outside diameter of the hot heat exchanger to give visual confirmation that braze alloy pre-forms have been inserted. The cold side flange and the displacer cylinder can be fixtured to allow proper alignment with the engine cylinder. Braze paste can be manually applied to each of these parts in some embodiments. Visual post-braze inspection will insure that proper wetting of the alloy has occurred.

Any suitable braze alloy can be used to braze the heater head components together. The braze alloy can be, for example, a copper, Nicrobraz® 51, or gold-based alloy. Copper is particularly suitable as a braze alloy, as it can be used in the form of a clad sheet, which avoids the expense of placing braze alloy pre-forms between the plates of the hot heat exchanger.

The manifold block is configured to divorce the structural requirements of the pressure vessel from the heat transfer requirements of the hot heat exchanger. By minimizing the contact surfaces between the manifold block and the hot heat exchanger, the hot heat exchanger is allowed greater freedom to grow and relieve stresses built up by thermal expansion. A further advantage is a reduction in the amount of stress imposed on the top plate of the hot heat exchanger by the deformation of the manifold block.

In some embodiments, the duty life of the heater head exceeds 60,000 hours. In various embodiments, the heater head can tolerate internal pressures of up to about 1000 psig peak. In addition, the heater head can tolerate a maximum hot side temperature of about 825° C., corresponding to a cold side temperature of about 87° C. (rejection temperature), in various embodiments.

The methods and systems described herein can be performed in software on general purpose computers, servers, or other processors, with appropriate magnetic, optical or other storage that is part of the computer or server or connected thereto, such as with a bus. The processes can also be carried out in whole or in part in a combination of hardware and software, such as with application specific integrated circuits. The software can be stored in one or more computers, servers, or other appropriate devices, and can also be kept on a removable storage media, such as a magnetic or optical disks.

Subsystems and Other Embodiments

In part, there are certain hardware and software implementations that enhance device operation and safety. One such approach uses data from the receiver assembly to calibrate and commence device operation after installation. This auto-commissioning process helps the energy converting apparatus locate the sun. Auto-commissioning is a way to automatically predict where the receiver aperture is located without user interaction. This is accomplished by using the sensors on the slew cone to determine the location of the aperture (any sensor located anywhere may be able to accomplish this). Auto-commissioning enables a large field of systems to be aligned with respect to the sun without a user observing where the concentrated solar energy is located when locating the sun. The method of auto-commissioning observes when the receiver temperature sensors rise in temperature while passing the concentrated solar energy over the front of the system. The system makes a plurality of vertical or horizontal passes (or both) to collect the necessary data.

Various exemplary parameters relating to system, method, and device embodiments are provided below. These examples are not meant to limit the scope of the invention, but only to provide details relating to certain embodiments.

Ambient Design Exemplary Parameters
(Non-Limiting Example)

Operating temperature range=about −20° C. to about +55° C. (about −4° F. to about 131° F.)
Operating elevation range=up to about 1,890 m (about 6,200 feet) above sea level
Operating humidity level=0 to 100%
Wind speed (maximum)=about 100 mph
Snow load (maximum, stowed)*=about 1 kN/m2 (20.9 pfs) on inverted dish
Ice load (maximum, stowed)*=about 5.0 cm (1.97") on one side Exemplary System Parameters (Non-Limiting Example)

Focal Length: about 2.68 m
Aperture Diameter: about 95 mm
Absorber & receiver wall temperature: about 700° C.
Ambient temperature: about 25° C.
Receiver insulation thermal conductivity: about 0.06 W/m–K
Receiver efficiency: about 90%
Thermal power into receiver: about 10,000 W
45 degree angle should be assumed for the cover diameter away from the aperture
about 8,000 kW/m2 peak at 2.68 m focal length, about 1,000 kW/m2 peak at 2.56 m (use linear correlation)

In the description, the invention is discussed in the context of Stirling engines; however, these embodiments are not intended to be limiting and those skilled in the art will appreciate that the invention can also be used for many types of energy converting systems including multi-cylinder engines, whether Stirling cycle based or otherwise, kinematic engines, steam and water based solar energy converting and storages systems, and other types of energy converting apparatus wherein useful work or electricity is produced.

It should be appreciated that various aspects of the claimed invention are directed to subsets and substeps of the techniques disclosed herein. Further, the terms and expressions employed herein are used as terms of description and not of limitation, and there is no intention, in the use of such terms and expressions, of excluding any equivalents of the features shown and described or portions thereof, but it is recognized that various modifications are possible within the scope of the invention claimed. Accordingly, what is desired to be secured by Letters Patent is the invention as defined and differentiated in the following claims, including all equivalents.

What is claimed is:

1. A method for reducing over-insolation of a heat exchanger, the method comprising the steps of:
providing a heat exchanger having a surface area for absorbing solar radiation;
concentrating solar radiation on the surface area of the heat exchanger such that the concentrated solar radiation impinges on a portion of the entire surface area of the heat exchanger; and
moving the concentrated solar radiation about the surface area of the heat exchanger in a substantially circular pattern at about 1 to about 30 revolutions per minute.

2. A method for reducing over-insolation of a heat exchanger, the method comprising the steps of:
providing a heat exchanger having a surface area for absorbing solar radiation;
concentrating solar radiation on the surface area of the heat exchanger such that the concentrated solar radiation impinges on a portion of the entire surface area of the heat exchanger; and
moving the concentrated solar radiation about the surface area of the heat exchanger in a randomized movement of the concentrated solar radiation.

3. A method for reducing over-insolation of a heat exchanger, the method comprising the steps of:
providing a heat exchanger having a surface area for absorbing solar radiation;
concentrating solar radiation on the surface area of the heat exchanger such that the concentrated solar radiation impinges on a portion of the entire surface area of the heat exchanger;
moving the concentrated solar radiation about the surface area of the heat exchanger in a pattern; and
reducing the portion of the surface area onto which concentrated solar radiation impinges when the temperature of the heat exchanger reaches a predetermined limit, thereby reducing thermal input.

4. A method for reducing over-insolation of a heat exchanger, the method comprising the steps of:
providing a heat exchanger having a surface area for absorbing solar radiation;
concentrating solar radiation on the surface area of the heat exchanger such that the concentrated solar radiation impinges on a portion of the entire surface area of the heat exchanger;
moving the concentrated solar radiation about the surface area of the heat exchanger in a pattern; and
reducing the portion of the surface area onto which concentrated solar radiation impinges when the temperature of the heat exchanger reaches a predetermined limit, thereby reducing thermal input, wherein the heat exchanger is in thermal communication with an energy converting apparatus, the energy converting apparatus selected from the group consisting of a Stirling engine, chemical energy conversion device, a thermal energy storage device, a gas turbine, a multi-cylinder engine, a multi-piston engine, a steam turbine, a steam power tower, a fuel cell, and a water-based energy generation systems.

5. A method for reducing over-insolation of a heat exchanger, the method comprising the steps of:
- providing a solar concentrator;
- providing a Stirling engine;
- providing a heat exchanger having a surface area, the heat exchanger being in thermal communication with the Stirling engine;
  - providing an aperture between the heat exchanger and the solar concentrator;
  - aligning the solar concentrator and the aperture such that a fraction of the solar radiation from the solar concentrator passes through the aperture, wherein the fraction of solar radiation impinges on a portion of the surface area of the heat exchanger; and
- moving the solar radiation about the surface area of the heat exchanger.

6. The method of claim 5, comprising the step of reducing the portion of the surface area onto which concentrated solar radiation impinges when the temperature of the heat exchanger reaches a predetermined limit, thereby reducing thermal input.

7. The method of claim 6, comprising the step of moving the concentrated solar radiation such that substantially no concentrated solar radiation impinges on the heat exchanger when a predetermined maximum temperature, power, pressure, swept volume, resistance, current, or position, is reached.

8. The method of claim 5, further comprising the steps of during non-peak solar conditions, directing most of the solar radiation from the solar concentrator through an electromagnetic radiation path; and
during peak solar conditions, reducing the amount of solar radiation which passes through the electromagnetic radiation path and moving the solar radiation about the surface area of the heat exchanger, thereby reducing thermal input, spreading hot spots, reducing the rate at which the heat exchanger heats, and/or maintaining coolant temperature.

9. The method of claim 5, further comprising the step of when the heat exchanger reaches a predetermined temperature limit, reducing the amount of solar radiation which passes through the aperture, thereby reducing the amount of solar radiation impinging on the heat exchanger.

10. The method of claim 9, wherein the step of reducing the amount of solar radiation comprises misaligning the solar concentrator and the aperture.

\* \* \* \* \*